US009946997B1

(12) United States Patent
Bent et al.

(10) Patent No.: US 9,946,997 B1
(45) Date of Patent: *Apr. 17, 2018

(54) METHOD AND SYSTEM FOR ALLOCATING DEPOSITS OVER A PLURALITY OF DEPOSITORY INSTITUTIONS

(71) Applicant: Island Intellectual Property LLC, Manhasset, NY (US)

(72) Inventors: Bruce Bent, Manhasset, NY (US); Bruce Bent, II, New York, NY (US); Rebecca Gareis Bent, New York, NY (US); David Edgar Gareis, Carlsbad, CA (US)

(73) Assignee: Island Intellectual Property LLC, Manhasset, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/602,916

(22) Filed: May 23, 2017

Related U.S. Application Data

(63) Continuation of application No. 13/841,778, filed on Mar. 15, 2013, now Pat. No. 9,811,811, which is a
(Continued)

(51) Int. Cl.
*G06Q 40/00* (2012.01)
*G06Q 20/10* (2012.01)

(52) U.S. Cl.
CPC .............. *G06Q 20/10* (2013.01); *G06Q 40/00* (2013.01)

(58) Field of Classification Search
CPC ............................... G06Q 40/00; G06Q 40/02
See application file for complete search history.

(56) References Cited

U.S. PATENT DOCUMENTS

| 4,232,367 A | 11/1980 | Youden et al. |
| 4,346,442 A | 8/1982 | Musmanno |

(Continued)

FOREIGN PATENT DOCUMENTS

| JP | 10-049590 A | 2/1998 |
| WO | WO-95/23379 A1 | 8/1995 |

(Continued)

OTHER PUBLICATIONS

The Merrill Lynch Cash Management Account—Financial Service; Jan. 1985, 18 pages.
(Continued)

*Primary Examiner* — Kirsten S Apple
*Assistant Examiner* — Mike Anderson
(74) *Attorney, Agent, or Firm* — Amster, Rothstein & Ebenstein LLP

(57) ABSTRACT

Computer system, computer-implemented method, and program product for managing transactions that include administering clients' deposits to and withdrawals from client transaction accounts; determining a client available deposit amount, $D_i$, determining, for $D_i$, a value of $N_i$ banks for the respective client transaction account, wherein $N_i$ is a whole number and (X) times ($N_i$) is equal to or less than 100, where X is a distribution percent value to be distributed to each of the $N_i$ banks; allocating, the percentage, X, multiplied by the client deposit amount, $D_i$, calculating, for the banks a respective net deposit amount; generating instructions to transfer funds; and updating.

18 Claims, 17 Drawing Sheets

Related U.S. Application Data continuation of application No. 12/638,544, filed on Dec. 15, 2009, now Pat. No. 8,781,931.

(60) Provisional application No. 61/246,840, filed on Sep. 29, 2009, provisional application No. 61/181,109, filed on May 26, 2009.

(56) References Cited

U.S. PATENT DOCUMENTS

| | | |
|---|---|---|
| 4,375,978 A | 3/1983 | Musmanno |
| 4,400,017 A | 8/1983 | Pendergrass |
| 4,597,046 A | 6/1986 | Musmanno et al. |
| 4,674,044 A | 6/1987 | Kalmus et al. |
| 4,694,397 A | 9/1987 | Grant et al. |
| 4,700,297 A | 10/1987 | Hagel et al. |
| 4,751,640 A | 6/1988 | Lucas et al. |
| 4,774,653 A | 9/1988 | Musmanno et al. |
| 4,953,085 A | 8/1990 | Atkins |
| 4,985,833 A | 1/1991 | Oncken |
| 5,093,787 A | 3/1992 | Simmons |
| 5,126,936 A | 6/1992 | Champion et al. |
| 5,206,803 A | 4/1993 | Vitagliano et al. |
| 5,220,501 A | 6/1993 | Lawlor et al. |
| 5,235,507 A | 8/1993 | Sackler et al. |
| 5,262,942 A | 11/1993 | Earle |
| 5,270,922 A | 12/1993 | Higgins |
| 5,291,398 A | 3/1994 | Hagan |
| 5,297,032 A | 3/1994 | Trojan et al. |
| 5,424,938 A | 6/1995 | Wagner et al. |
| 5,630,073 A | 5/1997 | Nolan |
| 5,631,828 A | 5/1997 | Hagan |
| 5,644,727 A | 7/1997 | Atkins |
| 5,649,116 A | 7/1997 | McCoy et al. |
| 5,671,363 A | 9/1997 | Cristofich et al. |
| 5,684,965 A | 11/1997 | Pickering |
| 5,689,650 A | 11/1997 | McClelland et al. |
| 5,710,889 A | 1/1998 | Clark et al. |
| 5,765,144 A | 6/1998 | Larche et al. |
| 5,774,880 A | 6/1998 | Ginsberg |
| 5,781,654 A | 7/1998 | Carney |
| 5,802,499 A | 9/1998 | Sampson et al. |
| 5,806,048 A | 9/1998 | Kiron et al. |
| 5,806,049 A | 9/1998 | Petruzzi |
| 5,812,987 A | 9/1998 | Luskin et al. |
| 5,826,241 A | 10/1998 | Stein et al. |
| 5,826,243 A | 10/1998 | Musmanno et al. |
| 5,848,400 A | 12/1998 | Chang |
| 5,852,811 A | 12/1998 | Atkins |
| 5,864,685 A | 1/1999 | Hagan |
| 5,875,437 A | 2/1999 | Atkins |
| 5,878,258 A | 3/1999 | Pizi et al. |
| 5,878,405 A | 3/1999 | Grant et al. |
| 5,884,285 A | 3/1999 | Atkins |
| 5,890,141 A | 3/1999 | Carney et al. |
| 5,893,078 A | 4/1999 | Paulson |
| 5,903,881 A | 5/1999 | Schrader et al. |
| 5,905,974 A | 5/1999 | Fraser et al. |
| 5,940,809 A | 8/1999 | Musmanno et al. |
| 5,941,996 A | 8/1999 | Smith et al. |
| 5,946,667 A | 8/1999 | Tull et al. |
| 5,950,175 A | 9/1999 | Austin |
| 5,974,390 A | 10/1999 | Ross |
| 5,978,779 A | 11/1999 | Stein et al. |
| 6,012,048 A | 1/2000 | Gustin et al. |
| 6,014,642 A | 1/2000 | El-Kadi et al. |
| 6,016,482 A | 1/2000 | Molinari et al. |
| 6,026,438 A | 2/2000 | Piazza et al. |
| 6,041,314 A | 3/2000 | Davis |
| 6,044,371 A | 3/2000 | Person et al. |
| 6,047,324 A | 4/2000 | Ford et al. |
| 6,049,782 A | 4/2000 | Gottesman et al. |
| 6,052,673 A | 4/2000 | Leon et al. |
| 6,088,685 A | 7/2000 | Kiron et al. |
| 6,088,686 A | 7/2000 | Walker et al. |
| 6,092,056 A | 7/2000 | Tull et al. |
| 6,105,005 A | 8/2000 | Fuhrer |
| 6,108,641 A | 8/2000 | Kenna et al. |
| 6,112,191 A | 8/2000 | Burke |
| 6,119,093 A | 9/2000 | Walker et al. |
| 6,128,603 A | 10/2000 | Dent et al. |
| 6,131,810 A | 10/2000 | Weiss et al. |
| 6,154,732 A | 11/2000 | Tarbox |
| 6,154,770 A | 11/2000 | Kostakos |
| 6,164,533 A | 12/2000 | Barton |
| 6,189,785 B1 | 2/2001 | Lowery |
| 6,192,347 B1 | 2/2001 | Graff |
| 6,226,623 B1 | 5/2001 | Schein et al. |
| 6,317,783 B1 | 11/2001 | Freishtat et al. |
| 6,324,353 B1 | 11/2001 | Laussermair et al. |
| 6,324,523 B1 | 11/2001 | Killeen et al. |
| 6,363,360 B1 | 3/2002 | Madden |
| 6,374,231 B1 | 4/2002 | Bent et al. |
| 6,408,336 B1 | 6/2002 | Schneider et al. |
| 6,513,020 B1 | 1/2003 | Weiss et al. |
| 6,970,843 B1 | 11/2005 | Forte |
| 7,089,202 B1 | 8/2006 | McNamar et al. |
| 7,103,556 B2 | 9/2006 | Del Rey et al. |
| 7,124,101 B1 | 10/2006 | Mikurak |
| 7,133,840 B1 | 11/2006 | Kenna et al. |
| 7,203,845 B2 | 4/2007 | Sokolic et al. |
| 7,206,761 B2 | 4/2007 | Colvin |
| 7,216,100 B2 | 5/2007 | Elliott |
| 7,313,543 B1 | 12/2007 | Crane et al. |
| 7,321,874 B2 | 1/2008 | Dilip et al. |
| 7,321,875 B2 | 1/2008 | Dilip et al. |
| 7,328,179 B2 | 2/2008 | Sheehan et al. |
| 7,366,695 B1 | 4/2008 | Allen-Rouman et al. |
| 7,376,606 B2 | 5/2008 | Jacobsen |
| 7,383,223 B1 | 6/2008 | Dilip et al. |
| 7,383,227 B2 | 6/2008 | Weinflash et al. |
| 7,392,222 B1 | 6/2008 | Hamilton et al. |
| 7,401,037 B2 | 7/2008 | Arena et al. |
| 7,440,914 B2 | 10/2008 | Jacobsen |
| 7,502,758 B2 | 3/2009 | Burke |
| 7,505,937 B2 | 3/2009 | Dilip et al. |
| 7,509,286 B1 | 3/2009 | Bent et al. |
| 7,519,551 B2 | 4/2009 | Bent et al. |
| 7,536,340 B2 | 5/2009 | Dheer et al. |
| 7,536,350 B1 | 5/2009 | Bent et al. |
| 7,596,522 B1 | 9/2009 | Jacobsen |
| 7,603,307 B2 | 10/2009 | Jacobsen |
| 7,640,199 B1 | 12/2009 | Hyland |
| 7,657,761 B2 | 2/2010 | Sokolic et al. |
| 7,668,771 B1 | 2/2010 | Bent et al. |
| 7,668,772 B1 | 2/2010 | Bent et al. |
| 7,672,886 B2 | 3/2010 | Bent et al. |
| 7,672,901 B1 | 3/2010 | Bent et al. |
| 7,672,902 B1 | 3/2010 | Bent et al. |
| 7,680,716 B1 | 3/2010 | Bent et al. |
| 7,680,734 B1 | 3/2010 | Bent et al. |
| 7,707,106 B1 | 4/2010 | Swanson et al. |
| 7,716,131 B2 | 5/2010 | Bent et al. |
| 7,720,755 B1 | 5/2010 | Coyle |
| 7,729,987 B1 | 6/2010 | Wakim et al. |
| 7,752,107 B1 | 7/2010 | Bent et al. |
| 7,752,129 B2 | 7/2010 | Bent et al. |
| 7,756,767 B2 | 7/2010 | Cluse et al. |
| 7,769,688 B1 | 8/2010 | Bent et al. |
| 7,788,235 B1 | 8/2010 | Yeo |
| 7,797,207 B1 | 9/2010 | Dilip et al. |
| 7,809,640 B1 | 10/2010 | Bent et al. |
| 7,814,017 B2 | 10/2010 | Vancini et al. |
| 7,837,100 B2 | 11/2010 | Bonalle et al. |
| 7,849,003 B2 | 12/2010 | Egnatios et al. |
| 7,860,771 B2 | 12/2010 | Colvin |
| 7,865,435 B1 | 1/2011 | Medina, III |
| 7,873,571 B1 | 1/2011 | Wehmer |
| 7,873,677 B2 | 1/2011 | Messing et al. |
| 7,886,969 B2 | 2/2011 | Antoo et al. |
| 7,890,424 B1 | 2/2011 | Wakim et al. |
| 7,895,098 B2 | 2/2011 | Beard |
| 7,895,099 B2 | 2/2011 | Whiting et al. |
| 7,899,743 B2 | 3/2011 | Jacobsen |

(56) References Cited

U.S. PATENT DOCUMENTS

| | | |
|---|---|---|
| 7,899,745 B1 | 3/2011 | Jacobsen |
| 7,899,746 B1 | 3/2011 | Jacobsen |
| 7,899,747 B1 | 3/2011 | Jacobsen |
| 7,904,372 B2 | 3/2011 | Whiting et al. |
| 7,917,433 B2 | 3/2011 | Jacobsen |
| 7,921,057 B1 | 4/2011 | Jacobsen |
| 7,933,821 B1 | 4/2011 | Bent et al. |
| 7,945,511 B2 | 5/2011 | O'Brien et al. |
| 7,996,308 B1 | 8/2011 | Bent et al. |
| 8,015,084 B1 | 9/2011 | Hirka et al. |
| 8,015,085 B2 | 9/2011 | Blagg et al. |
| 8,019,657 B2 | 9/2011 | Bent et al. |
| 8,019,668 B1 | 9/2011 | Bent et al. |
| 8,032,456 B1 | 10/2011 | Bent et al. |
| 8,036,984 B2 | 10/2011 | Elterich |
| 8,036,986 B2 | 10/2011 | Jacobsen |
| 8,051,004 B2 | 11/2011 | Jacobsen |
| 8,051,005 B2 | 11/2011 | Jacobsen |
| 8,055,557 B2 | 11/2011 | Sorbe et al. |
| 8,069,113 B2 | 11/2011 | Elterich |
| 8,086,508 B2 | 12/2011 | Dheer et al. |
| 8,090,651 B2 | 1/2012 | Winslow et al. |
| 8,095,446 B2 | 1/2012 | Green et al. |
| 8,103,582 B1 | 1/2012 | Zettner |
| 8,108,272 B2 | 1/2012 | Sorbe et al. |
| 8,121,943 B2 | 2/2012 | Elterich |
| RE43,246 E | 3/2012 | Bent et al. |
| 8,150,766 B1 | 4/2012 | Bent et al. |
| 8,191,156 B2 | 5/2012 | Kubo |
| 8,200,554 B1 | 6/2012 | Foss et al. |
| 8,234,188 B1 * | 7/2012 | Phillips ................ G06Q 40/12 705/30 |
| 8,239,321 B1 | 8/2012 | Bent et al. |
| 8,244,611 B2 | 8/2012 | Galit |
| 8,260,697 B1 | 9/2012 | Bent et al. |
| 8,260,705 B1 | 9/2012 | Bent et al. |
| 8,275,703 B1 | 9/2012 | Billman |
| 8,290,859 B1 | 10/2012 | Bent et al. |
| 8,290,860 B1 | 10/2012 | Bent et al. |
| 8,290,861 B1 | 10/2012 | Bent et al. |
| 8,306,912 B2 | 11/2012 | Galit |
| 8,311,916 B1 | 11/2012 | Bent et al. |
| 8,311,939 B1 | 11/2012 | Bent et al. |
| 8,326,766 B2 | 12/2012 | Hirka et al. |
| 8,352,342 B1 | 1/2013 | Bent et al. |
| 8,355,985 B1 | 1/2013 | Bent et al. |
| 8,359,267 B1 | 1/2013 | Bent et al. |
| 8,364,586 B1 | 1/2013 | Medina, III |
| 8,370,236 B1 | 2/2013 | Bent |
| 8,380,621 B1 | 2/2013 | Bent et al. |
| 8,386,382 B1 | 2/2013 | Bent |
| 8,386,383 B1 | 2/2013 | Bent |
| 8,392,299 B2 | 3/2013 | Sorbe et al. |
| 8,392,304 B1 | 3/2013 | Phillips et al. |
| 8,392,330 B2 | 3/2013 | Sorbe et al. |
| 8,401,962 B1 | 3/2013 | Bent |
| 8,429,074 B2 | 4/2013 | Galit |
| 8,452,702 B1 | 5/2013 | O'Donnell |
| 8,458,089 B1 | 6/2013 | Gareis |
| 8,498,933 B1 | 7/2013 | Bent et al. |
| 8,521,569 B1 | 8/2013 | Bent |
| 8,560,442 B1 | 10/2013 | Bent et al. |
| 8,566,200 B1 | 10/2013 | Bent et al. |
| 8,566,201 B1 | 10/2013 | Bent et al. |
| 8,571,960 B1 | 10/2013 | Bent et al. |
| 8,571,984 B1 | 10/2013 | Bent et al. |
| 8,583,515 B2 | 11/2013 | Sorbe et al. |
| 8,583,545 B1 | 11/2013 | Bent et al. |
| 8,589,289 B1 | 11/2013 | O'Donnell et al. |
| 8,589,295 B2 | 11/2013 | Sorbe et al. |
| 8,606,676 B1 | 12/2013 | Bent et al. |
| 8,612,324 B1 | 12/2013 | Bent et al. |
| 8,630,943 B2 | 1/2014 | Maricondi |
| 8,645,244 B2 | 2/2014 | Fanous et al. |
| 8,655,689 B1 | 2/2014 | Gareis |
| 8,660,928 B2 | 2/2014 | Green |
| 8,666,887 B2 | 3/2014 | Elterich |
| 8,682,730 B2 | 3/2014 | Hirka et al. |
| 8,688,577 B1 | 4/2014 | Bent |
| 8,712,911 B1 | 4/2014 | Bent et al. |
| 8,719,062 B1 | 5/2014 | Bent et al. |
| 8,719,157 B1 | 5/2014 | Bent et al. |
| 8,781,931 B1 | 7/2014 | Bent et al. |
| 8,788,409 B1 | 7/2014 | Souza |
| 8,788,414 B2 | 7/2014 | Sorbe et al. |
| 2001/0023414 A1 | 9/2001 | Kumar et al. |
| 2001/0032182 A1 | 10/2001 | Kumar et al. |
| 2002/0007330 A1 | 1/2002 | Kumar et al. |
| 2002/0023055 A1 | 2/2002 | Antognini et al. |
| 2002/0046144 A1 | 4/2002 | Graff |
| 2002/0069147 A1 | 6/2002 | Sheehan et al. |
| 2002/0082981 A1 | 6/2002 | Madden |
| 2002/0087454 A1 | 7/2002 | Calo et al. |
| 2002/0091637 A1 | 7/2002 | Bent |
| 2002/0095592 A1 | 7/2002 | Daniell et al. |
| 2002/0128951 A1 | 9/2002 | Kiron et al. |
| 2002/0161707 A1 | 10/2002 | Cole et al. |
| 2002/0165757 A1 | 11/2002 | Lisser |
| 2002/0174048 A1 | 11/2002 | Dheer et al. |
| 2002/0178098 A1 | 11/2002 | Beard |
| 2002/0194099 A1 | 12/2002 | Weiss |
| 2003/0023529 A1 | 1/2003 | Jacobsen |
| 2003/0041003 A1 | 2/2003 | Kayser, III |
| 2003/0065642 A1 | 4/2003 | Zee |
| 2003/0080185 A1 | 5/2003 | Werther |
| 2003/0135437 A1 * | 7/2003 | Jacobsen ................ G06Q 20/02 705/35 |
| 2003/0149646 A1 | 8/2003 | Chen et al. |
| 2003/0163403 A1 | 8/2003 | Chen et al. |
| 2003/0177092 A1 | 9/2003 | Paglin |
| 2003/0191702 A1 | 10/2003 | Hurley |
| 2003/0200174 A1 | 10/2003 | Star |
| 2003/0208438 A1 | 11/2003 | Rothman |
| 2003/0225642 A1 | 12/2003 | Baker et al. |
| 2003/0236728 A1 | 12/2003 | Sunderji et al. |
| 2004/0039674 A1 | 2/2004 | Coloma |
| 2004/0107157 A1 | 6/2004 | Bleunven et al. |
| 2004/0111361 A1 | 6/2004 | Griffiths et al. |
| 2004/0128229 A1 | 7/2004 | Raines et al. |
| 2004/0128235 A1 | 7/2004 | Kemper et al. |
| 2004/0138974 A1 | 7/2004 | Shimamura et al. |
| 2004/0153398 A1 | 8/2004 | Baumgartner et al. |
| 2004/0153400 A1 | 8/2004 | Burke |
| 2004/0162773 A1 | 8/2004 | Del et al. |
| 2004/0177036 A1 | 9/2004 | Nutahara et al. |
| 2004/0249741 A1 | 12/2004 | Understein |
| 2005/0044035 A1 | 2/2005 | Scott |
| 2005/0044036 A1 | 2/2005 | Whiting et al. |
| 2005/0091137 A1 | 4/2005 | Woeber |
| 2005/0102225 A1 | 5/2005 | Oppenheimer et al. |
| 2005/0102226 A1 | 5/2005 | Oppenheimer et al. |
| 2005/0108120 A1 | 5/2005 | Malka et al. |
| 2005/0108149 A1 | 5/2005 | Bent et al. |
| 2005/0114246 A1 | 5/2005 | Coloma |
| 2005/0149436 A1 | 7/2005 | Elterich |
| 2005/0154662 A1 | 7/2005 | Langenwalter |
| 2005/0177496 A1 | 8/2005 | Blagg et al. |
| 2005/0228733 A1 | 10/2005 | Bent et al. |
| 2006/0004655 A1 | 1/2006 | Alexander et al. |
| 2006/0047593 A1 | 3/2006 | Naratil et al. |
| 2006/0106703 A1 | 5/2006 | Del et al. |
| 2006/0155644 A1 | 7/2006 | Reid et al. |
| 2006/0167773 A1 | 7/2006 | Yang et al. |
| 2006/0212385 A2 | 9/2006 | Bent et al. |
| 2006/0212389 A2 | 9/2006 | Bent et al. |
| 2006/0213980 A1 | 9/2006 | Geller et al. |
| 2006/0273152 A1 | 12/2006 | Fields |
| 2006/0282356 A1 | 12/2006 | Andres et al. |
| 2007/0043666 A1 | 2/2007 | Burdette |
| 2007/0083938 A1 | 4/2007 | Aoki et al. |
| 2007/0118449 A1 | 5/2007 | De La Motte et al. |
| 2007/0130065 A1 | 6/2007 | Staab et al. |
| 2007/0143196 A1 | 6/2007 | Colvin |
| 2007/0198404 A1 | 8/2007 | Hirka et al. |

(56) References Cited

U.S. PATENT DOCUMENTS

| | | |
|---|---|---|
| 2007/0233590 A1 | 10/2007 | Hardison |
| 2007/0255655 A1 | 11/2007 | Kemper et al. |
| 2007/0271174 A2 | 11/2007 | Bent et al. |
| 2007/0276752 A1 | 11/2007 | Whiting et al. |
| 2007/0288400 A1 | 12/2007 | Menon |
| 2008/0015985 A1 | 1/2008 | Abhari et al. |
| 2008/0046358 A1 | 2/2008 | Holm-Blagg et al. |
| 2008/0065532 A1 | 3/2008 | De La Motte |
| 2008/0077996 A1 | 3/2008 | Kubo |
| 2008/0097899 A1 | 4/2008 | Jackson et al. |
| 2008/0120228 A1 | 5/2008 | Bent et al. |
| 2008/0133280 A1 | 6/2008 | Ziegler |
| 2008/0133396 A1 | 6/2008 | De La Motte |
| 2008/0195534 A1 | 8/2008 | Landis et al. |
| 2008/0222053 A1 | 9/2008 | Jacobsen |
| 2008/0243666 A1 | 10/2008 | Rowan |
| 2008/0288398 A1 | 11/2008 | Maricondi |
| 2009/0006985 A1 | 1/2009 | Fong et al. |
| 2009/0012899 A1 | 1/2009 | Friesen |
| 2009/0024496 A1 | 1/2009 | Balachandran et al. |
| 2009/0043699 A1 | 2/2009 | Elterich |
| 2009/0043701 A1 | 2/2009 | Elterich |
| 2009/0055313 A1 | 2/2009 | Elterich |
| 2009/0119227 A1 | 5/2009 | Green et al. |
| 2009/0138412 A1 | 5/2009 | Jacobsen |
| 2009/0150284 A1 | 6/2009 | Burke |
| 2009/0164320 A1 | 6/2009 | Galit |
| 2009/0164350 A1 | 6/2009 | Sorbe et al. |
| 2009/0164351 A1 | 6/2009 | Sorbe et al. |
| 2009/0164352 A1 | 6/2009 | Sorbe et al. |
| 2009/0164353 A1 | 6/2009 | Sorbe et al. |
| 2009/0164368 A1 | 6/2009 | Galit |
| 2009/0164370 A1 | 6/2009 | Sorbe et al. |
| 2009/0241197 A1 | 9/2009 | Troyansky |
| 2009/0281936 A1 | 11/2009 | Fanous et al. |
| 2009/0327154 A1 | 12/2009 | Van Vooren et al. |
| 2010/0241559 A1 | 9/2010 | O'Connor et al. |
| 2010/0268668 A1 | 10/2010 | Burdette |
| 2010/0274687 A1 | 10/2010 | Ghosh et al. |
| 2010/0274718 A1 | 10/2010 | Ghosh et al. |
| 2011/0078073 A1 | 3/2011 | Annappindi |
| 2011/0106703 A1 | 5/2011 | Jay et al. |
| 2011/0131103 A1 | 6/2011 | Hirka et al. |
| 2011/0208640 A1 | 8/2011 | Geoghegan et al. |
| 2011/0246359 A1 | 10/2011 | O'Brien et al. |
| 2011/0270720 A1 | 11/2011 | Manohar |
| 2011/0276473 A1 | 11/2011 | Blok |
| 2012/0016782 A1 | 1/2012 | Hardison, III |
| 2012/0041875 A1 | 2/2012 | Sorbe et al. |
| 2012/0047066 A1 | 2/2012 | Sorbe et al. |
| 2012/0078750 A1 | 3/2012 | Watkins |
| 2012/0179628 A1 | 7/2012 | Green |
| 2013/0030971 A1 | 1/2013 | Weiss et al. |
| 2013/0030974 A1 | 1/2013 | Casey et al. |
| 2013/0054429 A1 | 2/2013 | Minor et al. |
| 2013/0066702 A1 | 3/2013 | Galit |
| 2013/0151433 A1 | 6/2013 | Hicks |
| 2013/0159152 A1 | 6/2013 | Minor et al. |
| 2013/0179339 A1 | 7/2013 | Sorbe et al. |
| 2013/0232080 A1 | 9/2013 | Galit |
| 2013/0238505 A1 | 9/2013 | Hirka et al. |
| 2014/0012726 A1 | 1/2014 | Kruse |
| 2014/0052625 A1 | 2/2014 | Sorbe et al. |
| 2014/0143140 A1 | 5/2014 | Elterich |
| 2014/0180962 A1 | 6/2014 | Fiala et al. |
| 2014/0188737 A1 | 7/2014 | Salah et al. |

FOREIGN PATENT DOCUMENTS

| | | |
|---|---|---|
| WO | WO-99/18529 A1 | 4/1999 |
| WO | WO-02/42952 A1 | 5/2002 |
| WO | WO-03/012580 A2 | 2/2003 |
| WO | WO-2005/006111 A2 | 1/2005 |

OTHER PUBLICATIONS

U.S. Appl. No. 14/179,096, filed Feb. 12, 2014, Island Intellectual Property LLC.
U.S. Appl. No. 14/074,219, filed Nov. 7, 2013, Island Intellectual Property LLC.
U.S. Appl. No. 14/268,479, filed May 2, 2014, Island Intellectual Property LLC.
U.S. Appl. No. 12/794,448, filed Jun. 4, 2010, Bruce Bent et al.
U.S. Appl. No. 12/638,544, filed Dec. 15, 2009, Bruce Bent.
U.S. Appl. No. 12/794,448, filed Jun. 4, 2010, Bruce Bent.
U.S. Appl. No. 13/710,999, filed Dec. 11, 2012, Bruce Bent II.
U.S. Appl. No. 13/715,370, filed Dec. 14, 2012, Bruce Bent.
U.S. Appl. No. 13/733,645, filed Jan. 3, 2013, Bent.
U.S. Appl. No. 13/736,515, filed Jan. 8, 2013, Bent.
U.S. Appl. No. 13/801,501, filed Mar. 13, 2013, Bent.
U.S. Appl. No. 13/801,874, filed Mar. 13, 2013, Bent.
U.S. Appl. No. 13/828,468, filed Mar. 14, 2013, Gareis.
U.S. Appl. No. 13/828,929, filed Mar. 14, 2013, Gareis.
U.S. Appl. No. 13/829,309, filed Mar. 14, 2013, O'Donnell.
U.S. Appl. No. 13/829,747, filed Mar. 14, 2013, O'Donnell.
U.S. Appl. No. 13/829,974, filed Mar. 14, 2013, Bent.
U.S. Appl. No. 13/830,143, filed Mar. 14, 2013, Bent.
U.S. Appl. No. 13/839,890, filed Mar. 15, 2013, Bent.
U.S. Appl. No. 13/840,685, filed Mar. 15, 2013, Bent.
U.S. Appl. No. 13/841,778, filed Mar. 15, 2013, Bent.
U.S. Appl. No. 13/828,929, filed Mar. 14, 2013, Gareis
U.S. Appl. No. 13/842,360, filed Mar. 15, 2013, Bent.
U.S. Appl. No. 14/074,219, filed Nov. 7, 2013, Bent.
Memorandum from Ken Johnson re: Insured Deposit Products, Aug. 18, 1992, 3 pgs.
Memorandum from John E. Oncken re: Insured Savings Update, Jun. 15, 1990, 7 pgs.
Memorandum from John E. Oncken re: Brokered Deposit Issue vs. Insured Savings, Mar. 22, 1990, 8 pgs.
Memorandum from Ed Piner re: Insured Savings Product Update, Feb. 1, 1990, 4 pgs.
Insured Savings Correspondent Agreement with Exhibits A-D, 28 pgs.
First City, Texas Insured Savings Agency Agreement with Exhibits A-B and Insured Savings Program, 1996 or earlier; 10 pgs.
Product Bulletin from Bill McCain, Subject: Insured Savings Product Announcement, May 8, 1989, 7 pgs.
Insured Savings Project Team Meeting, Feb. 2, 1989, 16 pgs.
Insured Savings Product Description, Product Name: Insured Savings, Product Description: U.S. Pat. No. 4,985,833, 3 pgs.
Letter to Tim C. Lear, Sep. 20, 1988, 1 pg., with Memorandum from Ed Piner, re: Insured Savings Product, Nov. 9, 1988, and Letter from Tara L. Cyr, Dec. 9, 1988, 1 pg.
Automatic Insured Deposit Method, Patent Application Information, Jul. 11, 1988, 17 pgs.
Insured Savings, Overview & Marketing Plan, Dec. 6, 1988, 23 pgs.
Memorandum from Dick Zinser, re: A First City-Austin deposit program to hold existing customers' deposits, Mar. 17, 1988, 7 pgs.
Insured Savings Remote Site Sweep Procedures, 1996 or earlier; 3 pgs.
Letter to Malcolm L. Duke, Dec. 27, 1989 with Insured Savings Correspondent Agreement, Exhibits A-D, and Letter to Malcolm L. Drake, Nov. 21, 1989, 37 pgs.
Memorandum from Ken Johnson, re: Attached Insured Savings Letters, Jul. 5, 1990, 1 pg.
Letter to Jerry Crutsinger, Jul. 3, 1990, 1 pg.
Letter to Bill Goertz, Jul. 3, 1990, 1 pg.
Letter to Susan Goodwin, Jul. 3, 1990, 1 pg.
Insured Savings Rate Change Notice, Jul. 17, 1990; 1 pg.
Addendum to Insured Savings Agency Agreement, Jul. 17, 1990; 1 pg.
Letter to Paula Martin, Jul. 3, 1990, 1 pg.
Letter to John Lovell, Jul. 3, 1990, 1 pg.
Insured Savings Balance Limits form, 1996 or earlier; 1 sheet.
Email from John Oncken re: Depository Levels at Insured Savings Depositories, Nov. 2, 1989, 1 pg.

(56) References Cited

OTHER PUBLICATIONS

Cash Management Balance Monitoring Agreement Form; 1996 or earlier; 1 sheet.
Memorandum from Ed Piner, Subject: Discontinuation of Automatic Balance Monitoring in conjunction with Insured Savings Accounts, May 21, 1991, 1 pg.
Blank form letter from Edward N. Piner, May 24 1991, 1 pg.
Letter from First City National Bank of Austin, Sep. 20, 1982, 5 pgs.
First City, Texas—Austin, Special Products, Feb. 20, 1992, with Schedule A & Schedule B, 6 pgs.
Letter From William W. Wiles, Secretary of the Board, Board of Governors of the Federal Reserve System, Jun. 22, 1983, 6 Sheets.
Letter From Oliver I. Ireland, Associate General Counsel, Board of Governors of the Federal Reserve System, Jun. 22, 1988, 5 Sheets.
Alliance Insured Account, Information Statement, Sep. 1999, 6 sheets.
Lawsuit by Carlo DeBlasio et al. and Merrill Lynch & Co., Inc. et al., Opinion and Order, Jul. 27, 2009, Civil Action No. 07 Civ. 318, 47 pgs.
Lawsuit by Carlo DeBlasio et al. and Merrill Lynch & Co., Inc. et al., Second Amended Class Action Complaint, Jury Trial Demanded, Jun. 11, 2007, Civil Action No. 07 cv 318, 137 pgs.
Investors MoneyAccount[SM] and Insurance Plus Service Agreement, Schedule A, Mar. 1994; 3 sheets.
Investors MoneyAccount[SM] (an FDIC-insured money market account), Apr. 1996; 4 sheets.
Investors MoneyAccount[SM] The FDIC-Insured Money Market with an Important Plus., Apr. 1996; 2 sheets.
Investment Company Act of 1940—Section 3(a)(1), 2(a)(36); Securities Act of 1933—Section 2(1), Nov. 29, 1985, Kempter Financial Services, Inc., 9 pgs.
Insured Money Account Program Agreement and Disclosure Statement, Mar. 2000; 11 sheets.
First National Bank in Brookings, Certificates of Deposit, Jul. 17, 2009 5 sheets.
Summary of Commentary on Current Economic Conditions by Federal Reserve Districts, Jan. 1985, 44 pgs.
Board of Governors of the Federal Reserve System, Blank Form Letter, Apr. 22, 2004, 8 pgs.
FDIC Law, Regulations, Related Acts, 4000—Advisory Opinions, FDIC-93-35, Jun. 28, 1993, 2 sheets.
§204.134, 12 CFR Ch. 11 (Jan. 1, 2009 Edition), 2 sheets.
Money Fund $$ Moving to Bank Deposits, 6 *FRC Monitor*, Dec. 2003, 2 sheets.
Crane, P. & Krasner, Mike, *An iMoney Net Special Report*™, "Brokerage Cash Sweep Options: The Shift from Money Funds to FDIC-Insured Bank Deposit Accounts", Nov. 2004, 64 pgs.
The May 1998 Senior Financial Officer Survey, *Board of Govenors of the Federal Reserve System*, with Appendix A, 48 pgs.
Interest Rate Review © A Publication of *Meyer Weekly Interest Rate Survey*, A Look at Tiers, vol. II, No. 4, Apr. 1987, 6 pgs.
Interest Rate Review © A Publication of *Meyer Weekly Interest Rate Survey*, A Study of Historical Rates and Yields, vol. II, No. 6, Jun. 1987, 8 pgs.
Blank form letter to Oliver Ireland, Oct. 7, 1994, 1 pg.
Letter to L.P. Fleming, Jr. Esq., Feb. 7, 1995, 3 pgs.
Letter to James E. Creekman, Aug. 1, 1995, 4 pgs.
Letter to Brenda L. Skidmore, Aug. 30, 1995, 4 pgs.
Merrill Lynch & Co., Inc. Form 10-K405 (Annual Report (Regulation S-K, item 405)), Filed Mar. 14, 2002 for the Period Ending Dec. 28, 2001, with Schedules, Exhibits, and 2001 Annual Report, 248 pgs.
Merrill Lynch & You, "Financial Services the Way You Want, When You Want Them," Jan. 2000 4 Sheets.
Merrill Lynch, Pierce, Fenner & Smith Incorporated, "Information Statement," 2000, 12 Sheets.
Merrill Lynch, Information Statement Regarding Changes to Interest Rates on Deposits in the Merrill Lynch Banks, Document 64-14, Nov. 12, 2007, Case 1:07-cv-00318, 2 sheets.
Street Talk, "Merrill Moves CMA Cash to Bank", *On Wall Street*, Nov. 2000, 1 sheet.
Quest Insured Account, *QUESTessentials*, May 17, 1994; 3 sheets.
Quest Insured Account, *Information Statement*, 5 sheets.
OCC Insured Bank Deposit Account, Jun. 1993; 3 sheets.
Insured Bank Deposit Account, *Information Statement*, Jul. 1, 2000, 2 sheets.
Letter from Marilyn J. Hensle, announcing Salomon Smith Barney Bank Deposit Program.[SM], with Q&A, Aug. 16, 2000; 14 sheets.
Bank Deposit program Disclosure Statement, *Salomon Smith Barney*, 3 sheets.
FDIC Law, Regulations, Related Acts, 4000—Advisory Opinions, FDIC-87-25, Oct. 22, 1987, 1 sheet.
FDIC Law, Regulations, Related Acts, 4000—Advisory Opinions, FDIC-86-21, Jul. 23, 1986, 2 sheets.
The Merrill Lynch Cash Management Account, Financial Service, 1982; 18 pgs.
The Insured Savings Account, Issuer Guide to Offering MMDAs through Merrill Lynch, Jul. 1986; 27 pgs.
Insured Savings Account Fact Sheet, The Merrill Lynch Cash Management Account Financial Service, Apr. 1987, 11 pgs.
CMA Insured Savings Account Fact Sheet, Jul. 1994, 9 pgs.
A Guide to Your CMA Account, 1995, 19 pgs.
Insured Savings Account Fact Sheet, The Merrill Lynch Cash Management Account Financial Service, 1985, 4 pgs.
CMA Insured Savings Account Fact Sheet, 1997, 13 pgs.
Blackwell, Rob, Salomon's Sweep Plan Raises FDIC Fund Alarm, *American Banker*, Dec. 6, 2000, 2 pgs.
Insured Deposit Account (IDA), May 21, 1996, 11 pgs.
An Introduction to the Smith Barney *Insured Deposit Account*, 1995, 8 pgs.
Memorandum from Ted Hamilton re: Insured Deposit Account, Oct. 10, 1995, 13 pgs.
The Insured Deposit Account: "*Money in the Bank*", 1997, 2 sheets.
Merrill Joins Money Market Account, CMA; Broker Begins Testing With 12 Institutions, *Lexis Nexis*, Sep. 23, 1983, 4 pgs.
Form 8-K Merill Lynch & Co Inc—MER, Filed: Mar. 7, 2002, Report of unscheduled material events or corporate changes, 41 pgs.
Lawsuit by Island Intellectual Property LLC and Intrasweep LLC against Deutsche Bank Trust Company Americas and Total Bank Solutions, Complaint for Patent Infringement, Jury Trial Demanded, Feb. 23, 2010, Case No. 10 CV 1518, (Document 1).
Lawsuit by Island Intellectual Property LLC and Lids Capital LLC against Deutsche Bank Trust Company Americas and Total Bank Solutions, Complaint for Patent Infringement, Jury Trial Demanded, Mar. 16, 2010, Case No. 10 CV 2268.
Quest Cash Management Services Memorandum to Tom Duggan, Re: Quest Insure Account, Nov. 16, 1993.
Bank Services, AMVest Financial agility for banker's and their clients, 6 pgs.
Federally "Insured Deposit Program", AmVest Capital, 1 sheet.
Federally Insured Deposit Program for Banks, AmVest capital, Jan. 15, 2010, 2 sheets.
Flow Chart, AmVest Capital, Dec. 9, 2009, 1 sheet.
Flow of Business for Federally Insured Deposit Program "FIDP", Deutsche Bank & Trust Company of the Americas, 1 sheet.
Participation Criteria for the FIDP, Federally Insured Deposit Program Participation Criteria, AmVest Capital, Jan. 15, 2010, 4 pgs.
Federally Insured Deposits/FAQ, Frequently Asked Questions on the Federally Insured Deposit Program, AmVest Capital, Jan. 15, 2010, 2 sheets.
Money Market Rates, Jan. 18, 2010, 2 sheets.
Money Market Rates, Jan. 6, 2010, 3 pgs.
Money Market Rates, Nov. 12, 2009, 3 pgs.
Scott & Stringfellow starts correspondent clearing business, News Release BB&T, Nov. 13, 2007, 2 sheets.
Curian Capital Introduces Custom Wealth Platform, Market Watch, Aug. 18, 2009, 3 pgs.
Ellie Behling, Curian Capital Introduces Custom Wealth Platform, Nov. 10, 2009, 3 sheets.
Curian Capital Introduces Custom Wealth Platform, Reuters, Aug. 18, 2009, 3 pgs.

(56) References Cited

OTHER PUBLICATIONS

Curian Capital Introduces Custom Wealth Platform, WSJ.com, Aug. 18, 2009, 3 pgs.
Curian Capital, LLC: Private Company Information, Business Week, Nov. 10, 2009, 3 pgs.
Curian Capital Introduces Custom Wealth Platform, Yahoo! Finance, Aug. 18, 2009, 3 pgs.
Bank Insured Deposit Program, D.A. Davidson & Co., Jan. 15, 2010, 2 sheets.
Bank Insured Deposit Program, D.A. Davidson & Co. Nov. 2, 2009, 2 sheets.
D.A. Davison & Co., Bank Insured Deposit Program, Disclosure Statement, 4 sheets.
First Southwest Company, First Southwest Company Bank Insured Deposit Program, Sep. 28, 2009, 11 pgs.
Manage Cash in an Online Stock Portfolio: Folio Investing, Jan. 15, 2010, 2 sheets.
Folio Investing: Brokerage Features >> Cash Investments>> FDIC. PLUS Program, Jan. 14, 2010, 3 pgs.
Folio Investing: Brokerage Features >> Cash Investments>> Cash Seep Rates, Jan. 14, 2010, 2 sheets.
Folio Investing: Brokerage Features >> Cash Investments>> Cash Seep Banks, Jan. 15, 2010, 3 pgs.
Folio Investing: Brokerage Features >> Cash Investments>> Cash Sweep FAQ, Jan. 14, 2010, 3 pgs.
Folio Investing: Brokerage Features >> Cash Investments>> Cash Sweep FAQ, Jan. 18, 2010, 2 sheets.
Folio Investing: Brokerage Features >> Cash Investments>> Cash Sweep FAQ, Jan. 15, 2010, 2 sheets.
Folio Investing: Brokerage Features >> Cash Investments>> Sweep Terms & Conditions, Jan. 14, 2010, 2 sheets.
H.C. Denison Company, Sheboygan, WI, retrieved from internet Nov. 2, 2009; 1 sheet.
The LYRA Program with H.C. Denison Company, Sheboygan Wisconsin, Jan. 15, 2010, 2 sheets.
Current LYRA Program Rates, H.C. Denison Co., Jan. 15, 2010, 1 sheet.
Current LYRA Program Rates, H.C. Denison Co., Nov. 2, 2009, 1 sheet.
Current LYRA Program Banks, H.C. Denison Co. LYRA Program, Nov. 2, 2009, 1 sheet.
Authorization Form, H.S. Denison Company's Liquidity Insured Reserve Access Program (LYRA Program), Oct. 2009, 1 sheet.
Frequently Asked Questions for the LYRA Program, H.C. Denison Co., Jan. 15, 2010, 3 pgs.
Terms & Conditions for H.C. Denison Company's Liquidity Insured reserve Access Program (LYRA Program), Jan. 15, 2010, 4 pgs.
Terms & Conditions for H.C. Denison Company's Liquidity Insured reserve Access Program (LYRA Program), Nov. 2, 2009, 4 pgs.
The Hilliard Lyons Insured Deposit Program Disclosure Document, Hilliard Lyons, 10 pgs.
Current Rates, http://currentrates.hillard.com/ Jan. 6, 2010, 1 sheet.
Current Rates, http://currentrates.hillard.com/ Nov. 2, 2009, 1 sheet.
Current Rates, Market Info, Hilliard Lyons, Nov. 2, 2009, 4 pgs.
Legent Insured Deposit, www.legentclearing.co/mmf/phf, Nov. 2, 2009, 2 sheets.
Legent Insured Deposit Program—Summary of Terms and Conditions, Nov. 2008, 4 pgs.
Investment Account Application, Cleared Through Legent Clearing, May 2006; 2 sheets.
Customer Agreement, Cleared Through Legent Clearing, May 2006; 3 pgs.
Cash Management, Mesirow Financial—B/D and IA Services, www.mesirowfinancial.com/bdia/cas_mgmt.jsp, Jan. 15, 2010, 2 sheets.
Frequently Asked Questions: FDIC Sweep Program, optionsXpress, retrieved from internet Jan. 6, 2010; www.optionsxpress.com/welcom/faq/aq/fdc.aspx#rate.
Terms & Conditions for optionsXpress' Bank Insured Deposit Program, optionsXpress, Oct. 14, 2009; 6 pgs.
Frequently Asked Questions: FDIC Sweep Program, optionsXpress, www.optionsxpress.com/welcom/faq/fdic.aspx, Jan. 6, 2010, 3 pgs.
Frequently Asked Questions: FDIC Sweep Program, www.optionsxpress.com/welcom/faq/fdic.aspx, Nov. 12, 2009, 2 sheets.
Money Fund and FDIC-Insured Bank Programs, Pershing, www.pershing.com/money_fund.htm, Jan. 15, 2010, 1 sheet.
Money Market Mutual Fund & FDIC-Insured Deposits Program Rates & Bank Lists, www.pershing.com/rates.html, Jan. 6, 2010m 6 pgs.
Money Market Mutual Fund and FDIC-Insured Deposit Program Rates & Bank List, Jan. 5, 2010; www.pershing.com/rates.html, 1 sheet.
Clearing firms used by the top independent broker-dealers, Investment News, www.investmentnews/article/20081214/CHART/812119919, Jan. 15, 2010, 4 sheets.
Objective investment advice Building trust, Wayne Strout, www.waynestrout.com/more)info, Jan. 18, 2010, 5 pgs.
Eagle sweep disclosure, first republic Securities Company, Jun. 1, 2009, 12 pgs.
The financial organizer, ProCash Plus, Apr. 2007; 12 pgs.
Insured deposit account program disclosure booklet, 16 pgs.
Update New FDIC product at IPI: Deutsche Bank Insured Deposit Program, Investment Professionals Inc, Feb. 4, 2009, 11 pgs.
Insured cash account, , http://lplfinancial.lpl.com/x68.xml, with LPL Financial insured cash account program disclosure booklet, LPL Financial Jan. 15, 2010, 23 pgs.
FAQs about the Deutsche Bank insured deposit program, Securities America, Jul. 17, 2009; 3 pgs.
Insured deposit program, www.aigadvisorgroup.com/fdic/03.04.09.htm, Jan. 15, 2010, 3 pgs.
FlexInsured Account$^{SM}$, PrimeVest, http://primevest.com/flexInsured_account.asp, Jan. 14, 2010, 1 sheet.
FlexInsured$^{SM}$ Account disclosure statement, PrimeVest, 2009, 5 pgs.
An independent broker-dealer, Royal Alliance, http://www.royalalliance.com, Jan. 15, 2010, 1 sheet.
Brokerage products and services, www.steerneagee.com/sali/pcg/pages/products-services.aspx, Nov. 4, 2009, 2 sheets.
Terms and conditions for cash sweep, sterne agee, 2 sheets.
Client account agreement to Sterne Agee Clearing, Inc, Sterne, Agee & Leach, Inc and its authorized agents, Feb. 3, 2009, 5 pgs.
Valet a full service asset management account, http://valetaccount.com/visaTerms.php, Nov. 12, 2009, 6 pgs.
A sweet suite of business products brings our bank to you, AndroscogginBank, www.androscogginbank.com, 1 sheet.
We have your banking needs covered!, Greater Franklin, 2009, 2 sheets.
Insured MMA Seep Program, Circle Bank, www.circlebank.com/personalbanking)mma.aspx, Jan. 14, 2010, 2 sheets.
Insured MMA agency sweep agreement with rate sheet, Circle Bank, Dec. 3, 2009, 6 pgs.
Personal Banking—East West student plus program, East West Bank, www.eastwestbank.com/english/FDIC.asp, Nov. 10, 2009, 1 sheet.
Safe sound secure insured deposit programs, East West Bank, www.eastweatbank.com/English/SS_SIDPrograms.asp, Jan. 15, 2010, 2 sheets.
Money market insured deposit program, East West Bank, www.eastweatbank.com/English/MMarket_Insured.asp, Nov. 10, 2009, 1 sheet.
Insured deposit program bank list, www.eastweatbank.com/English/IDPB_list.htm, Nov. 10, 2009, 1 sheet.
FDIC information ofr United Commercial Ban, San Francisco, UCB, www.ibankunited.com/home.html, Nov. 12, 2009, 1 sheet.
Money market insured deposit program, Desert Community Bank, www.dck.org/MMarket_insured.html, Nov. 12, 2009, 1 sheet.
Insured deposit program bank list, www.dcbk.org/IDPB_list.htm, Nov. 12, 2009, 1 sheet.
Evolve and others team up with Deutsche Bank to provide higher FDIC coverage limits, www.insureddeposd online.com/content/view/31/86/, Nov. 12, 2009, 1 sheet.
Protect your cash portfolio!, http://insureddepositsonline.com, Jan. 15, 2010, 1 sheet.

(56) References Cited

OTHER PUBLICATIONS

Protect your cash portfolio!, www.insureddepositsonline.com/component/option.com_frontpage/Itemid,1/, Nov. 2, 2009, 1 sheet.
Participating bank analysis, Insured Deposit Program, Evolve Bank & Trust, www.insureddepositsonline.com/content/view/45/113/, Nov. 15, 2010, 1 sheet.
Frequently asked questions, Evolve Bank & Trust, www.insureddepositsonline.com/content/view/38/120/, Jan. 15, 2010, 3 pgs.
Strategic Partners, Insured Deposit Program, Evolve Bank & Trust, www.insureddepositsonline.com/content/view/37/114/, Jan. 15, 2010, 1 sheet.
Who the program Benefits, Insured Deposit Program, Evolve Bank & Trust, www.insureddepositsonline.com/content/view/43/115/, Jan. 15, 2010, 1 sheet.
How the program works, Insured Deposit Program, Evolve Bank & Trust, www.insureddepositsonline.com/content/view/47/112/, Jan. 15, 2010, 1 sheet.
This new bank is over 80 years old, Insured Deposit Program, Evolve Bank & Trust, www.insureddepositsonline.com/content/view/44/116/, Nov. 2, 2009, 1 sheet.
Temporary liquidity guarantee program, Evolve Bank & Trust, www.getevolved.com/index.php?option=com_content &task=view& id=67&itemid=263, Nov. 2, 2009, 1 sheet.
Contact us, Insured Deposit Program, Evolve Bank & Trust, www.insureddepositsonline.com/content/view/40/119/, Nov. 2, 2009, 1 sheet.
Over $12,5 million of FDIC deposit insurance available, Insured Deposit Program, Deutsche Bank, Apr. 2009; www.insureddepositsonline.com, 1 sheet.
How the program works, Insured deposit program, Evolve Bank & Trust, www.insureddepositsonline.com/content/view/47/112/, Nov. 4, 2009, 11 pgs.
Over $11 million of FDIC deposit insurance available, Insured Deposit Program, Deutsche Bank, www.insureddepositsonline.com, 1 sheet.
Bank insured agency deposit account program custodial account agreement, Evolve Bank & Trust, 8 pgs.
Insured deposit online, Deutsche Bank Insured Deposit Program, list of program banks, retrieved from internet May 14, 2009; 2 sheets.
Insured deposit online, the Insured Deposit Program, Evolve Bank & Trust, retrieved from internet Apr. 3, 2009; 2 sheets.
Insured deposit online, Frequently asked questions, Evolve Bank & Trust, www.insureddepositsonline.com/content/section/3/71, May 14, 2009, 3 pgs.
Insured deposit online, the Insured Deposit Program, Evolve Bank & Trust, Apr. 3, 2009, 2 pgs.
Personal Banking, Insured Deposit Program, , www.pulaskibankstl.com/personal/checking-personalinsured.htm, Jan. 26, 2010, 1 sheet.
Personal Banking, Insured Deposit Program, Pulaski Bank, www.pulaskibankstl.com/personal/currentrates.htm, Jan. 26, 2010, 2 sheets.
Up to $10 million of FDIC deposit insurance available, Insured Deposit Program, Pulaski Bank, 1 sheet.
Personal Banking, Insured Deposit Program, Pulaski Bank, www.pulaskibankstl.com/personal/checking-personalinsured.htm, Dec. 8, 2009, 1 sheet.
Personal Banking, Insured Deposit Program, Pulaski Bank, www.pulaskibankstl.com/personal/checking-personalinsured.htm, May 14, 2009, 1 sheet.
Up to $12.5 million of FDIC deposit insurance available, Insured Deposit Program, Pulaski Bank, 1 sheet.
Who can benefit from the insured deposit program?, Insured Deposit Program, Pulaski Bank, Apr. 2009; 2 sheets.
Insured agency deposit account terms and conditions, Pulaski Bank, 1 sheet.
Banks for DBTCA, 2 sheets.
Total Bank Solutions, Corporate overview, 1 sheet.
Total Bank Solutions, Deposit Institutions, www.totalbanksolutions.com/deposit.cfm, Jan. 15, 2010, 2 sheets.
Total Bank Solutions, Insured Deposit Program, www.totalbanksolutions.com/insured-deposit.cfm, Jan. 15, 2010, 3 pgs.
Total Bank Solutions, Source Institutions, www.totalbanksolutions.com/source.cfm, Jan. 15, 2010, 3 pgs.
Total Bank Solutions, FAQs, www.totalbanksolutions.com/faqs.cfm, Jan. 15, 2010, 2 sheets.
Total Bank Solutions, Insured Deposit Program, TBS overview, www.totalbanksolutions.com/overview.htm, Nov. 3, 2009, 1 sheet.
Total Bank Solutions, Insured Deposit Program, Total Bank Solutions, www.totalbanksolutions.com, Nov. 3, 2009, 1 sheet.
Total Bank Solutions, Insured Deposit Program, Bank Sweep Program, www.totalbanksolutions.com/insured-deposit.cfm, Jan. 15, 2010, 3 pgs.
Total Bank Solutions, Insured Deposit Program, Bank Sweep Program, www.totalbanksolutions.com/banksweep.htm, Nov. 3, 2009, 2 sheets.
Total Bank Solutions, Insured Deposit Program, Brokerage Sweeps, www.totalbanksolutions.com/brokersweep.htm, Nov. 3, 2009, 2 sheets.
Total Bank Solutions, Insured Deposit Program, Deposits, www.totalbanksolutions.com/Deposits.htm, Nov. 3, 2009, 1 sheet.
Total Bank Solutions, Insured Deposit Program, Bank Sweep Program, www.totalbanksolutions.com/banksweep.htm, Mar. 6, 2009, 2 sheets.
Total Bank Solutions, Insured Deposit Program, Broker Sweep Program, www.totalbanksolutions.com/brokersweep.htm, Mar. 6, 2009, 2 sheets
Total Bank Solutions, Insured Deposit Program, Deposit, www.totalbanksolutions.com/deposit.htm, Mar. 6, 2009, 2 sheets.
Total Bank Solutions, Insured Deposit Program, www.totalbanksolutions.com, Mar. 6, 2009, 2 sheets.
Total Bank Solutions, Insured Deposit Program, Partners & Affiliates, www.totalbanksolutions.com/partners.htm, Sep. 11, 2009, 2 sheets.
Total Bank Solutions, TBS Bank Deposit Account, 7 pgs.
Christopher McCrum, LinkedIn, http://74.125.93.132/search?=cache:5hs9cebUSjgJ:www.linkedin.com/pub/christopher-mccrum/ . . . , Nov. 2, 2009, 2 sheets.
Kentucky Bankers Association, Alternative for excess deposit coverage Free Webiners, http://209.235.145/cgi-bin/websuite/tcsassnwebsuite.pl?. . . , Nov. 2, 2009, 2 sheets.
Kentucky Bankers Association Detailed listening, http://member.kybanks.com/source/members . . . , Nov. 2, 2009, 1 sheet.
Letter from Ballard W. Cassady, Jr. President and Chief Executive Officer, Kentucky Bankers Association, Mar. 31, 2009, 1 sheet.
Oklahoma bankers association seeks extra security for deposits, http://findarticles.com/p/articles/mi_qn4182/is_20081128/ai_n31055289/, Nov. 2, 2009, 2 sheets.
Fast fax-back reply, Kentucky Bankers Association, 1 sheet.
Deutsche Bank, Deutsche Bank insured deposit program, Dec. 18, 2009; 3 pgs.
Deutsche Bank Insured Deposits, Bank list as of Dec. 18, 2009, 1 sheet.
DB Advisors, Deutsche Bank Group, Insured Deposit Program, 1 sheet.
Letter to Robert E. Feldman, Federal Deposit Insurance Corporation, re: Proposed rule on risk-based assessments (RIN#3064-AD35), Dec. 17, 2008, 4 pgs.
Deutsche Bank Alex. Brown insured deposit program (IDP), Dec. 1, 2009, 10 pgs.
CD's pass agencies as largest holding in MMFs: Repo plunges in sept., www.cranedata.us/archives/news/2009/10/, Nov. 3, 2009, 14 pgs.
Lawsuit by Island Intellectual Property LLC, Lids Capital LLC, Double Rock Corporation, and Intrasweep LLC against Deutsche Bank Trust Company Americas, and Total Bank Solutions, LLC, Defendants' Preliminary Invalidity Contentions, Mar. 12, 2010, Civil Action No. 09 Civ. 2675 (VM) AJP).
Lawsuit by Island Intellectual Property LLC and Intrasweep LLC against Institutional Deposits Corp., Defendant Institutional Deposits Corp.'s Preliminary Invalidity Contentions, Mar. 15, 2010; Case No. 09-CV-03079-JEC.

(56) References Cited

OTHER PUBLICATIONS

Exhibit 1, Invalidity Chart: IMA and Insurance Plus Service Agreement, U.S. Pat. No. 7,509,286, 21 pgs.
Exhibit 2, Invalidity Chart: Investors Money AccountSM System, U.S. Pat. No. 7,509,286, 26 pgs.
Exhibit 3, Invalidity Chart: Insured Money Account System, U.S. Pat. No. 7,509,286, 26 pgs.
Exhibit 4, Invalidity Chart: U.S. Pat. No. 4,985,833 (Oncken), U.S. Pat. No. 7,509,286, 21 pgs.
Exhibit 5, Invalidity Chart: First City Bank of Texas' Insured Savings Program, U.S. Pat. No. 7,509,286, 39 pgs.
Exhibit 6, Invalidity Chart: Quest Insured Account, U.S. Pat. No. 7,509,286, 19 pgs.
Exhibit 7, Invalidity Chart: CIBC World Markets—Insured Bank Deposit Account, U.S. Pat. No. 7,509,286, 16 pgs.
Exhibit 8, Invalidity Chart: Merrill Lynch CMA/ISA Service, U.S. Pat. No. 7,509,286, 72 pgs.
Exhibit 9, Invalidity Chart: 1983 Fed Letter, U.S. Pat. No. 7,509,286, 16 pgs.
Exhibit 10, Invalidity Chart: Merrill Lynch Banking Advantage Program ("MLBA Program"), U.S. Pat. No. 7,509,286, 22 pgs.
Exhibit 11, Invalidity Chart: Merrill Lynch & You + MLBA Information Statement, U.S. Pat. No. 7,509,286, 18 pgs.
Exhibit 12, Invalidity Chart: Smith Barney Insured Deposit Account, U.S. Pat. No. 7,509,286, 22 pgs.
Exhibit 13, Invalidity Chart: Smith Barney Bank Deposit Program, U.S. Pat. No. 7,509,286, 18 pgs.
Exhibit 14, Invalidity Chart: Alliance Insured Account, U.S. Pat. No. 7,509,266, 16 pgs.
Exhibit 15, Invalidity Chart: Reserve's American Express Presentation, U.S. Pat. No. 7,509,286, 16 pgs.
Exhibit 16, Invalidity Chart: U.S. Pat. No. 7,376,606 (Jacobsen), U.S. Pat. No. 7,536,350, 6 pgs.
Exhibit 17, Obviousness Combinations Chart, U.S. Pat. No. 7,509,286, 351 pgs.
Lawsuit by *Island Intellectual Property LLC, et al.* v. *Deutsch Bank Trust Company Americas, et al.*; Defendant Deutsche Bank Trust Company Americas' Second Supplemental Responses to Double Rock's Interrogatories Nos. 2, 8 and 9, Jul. 2010, 65 pages.
Exhibit 2, Invalidity Chart: U.S. Pat. No. 4,985,833 (Oncken)—U.S. Pat. No. 7,668,771, Jul. 2010, 14 pages.
Exhibit 5, Invalidity Chart: Merrill Lynch Business Advantage Program—U.S. Pat. No. 7,668,772, Jul. 2010, 7 pages.
Exhibit 8, Invalidity Chart: Harken Financial Services Sweep Product—U.S. Pat. No. 7,668,771, Jul. 2010, 9 pages.
Exhibit 9, Invalidity Chart: Wayne Hummer—Insured Bank Deposit Program—U.S. Pat. No. 7,668,771, Jul. 2010, 12 pages.
Exhibit 10, Invalidity Chart: U.S. Patent Application Publication No. 2007/0043666 (Burdette), U.S. Pat. No. 7,668,771, Jul. 2010, 9 pages.
Letter to R.M. Zaitzeff, from W.W. Wiles, dated Jun. 22, 1983 (response to May 10, 1983 letter re: offering of MMDAs), 6 pages.
Letter to G.T. Schwartz, from O.I. Ireland, dated Jun. 22, 1988 (response to Dec. 18, 1987 letter re: proposed modifications to Merrill Lynch's CMA Program), 5 pages.
Information Statement, "Alliance Insured Account," Sep. 1999; 6 pages.
Investors MoneyAccountSM and Insurance Plus Service Agreement, attached Schedule A (List of Banks Participating in the Insurance Plus Service), IMAD Mar. 1994, 3 pages.
Investors Money AccountSM (an FDIC-insured money market account), IMA-1; Mar. 1994, 4 pages.
Investors MoneyAccountSM, "The FDIC-Insured Money Market Investment with an Important Plus," IMA Oct. 1995, 2 pages.
1985 SEC No-Act. LEXIS 2756, Investment Company Act of 1940—Section 3(a)(1), 2(a)(36); Securities Act of 1933—Section 2(1), Nov. 29, 1985, Kemper Financial Services, Inc., 9 pages.
Insured Money Account Program Agreement and Disclosure Statement, (attached Schedule A—Deposit Account Terms), faxed Mar. 28, 2000; 10 pages.

First National Bank in Brookings, Certificates of Deposit [online] [retrieved on Jul. 17, 2009]. Retrieved from the Internet: Certificates of Deposit, <URL: http://web.archive.org/web/20000524121111/www.firstnb.com/cd.htm>; Multi-Bank CDs, <URL: http://web.archive.org/web/20000524132934/www.firstnb.com/mbcd.htm>, 5 pages.
Summary of Commentary on Current Economic Conditions by Federal Reserve Districts, Jan. 1985, 44 pages.
12 CFR Ch. II (Jan. 1, 2009 Edition), pp. 124-125.
Product Strategy, "Money Fund $$ Moving to Bank Deposits, Distributors Start to Install Bank Deposit Accounts to Replace Money Funds," 6 FRC Monitor, Dec. 2003, 2 pages.
Board of Governors of the Federal Reserve System, "The May 1998 Senior Financial Officer Survey," May 1998, (attached Appendix A: Survey Questions and Responses; Appendix B: Glossary; Appendix C: Examples of Key Reserve Concepts), 48 pages.
Interest Rate Review, A Publication of the Meyer Weekly Interest Rate Survey, "A Look at Tiers," Apr. 1987, 6 pages, vol. 11, No. 4.
LexisNexis, The American Banker, "Merrill Joins Money Market Account, CMA; Broker Begins Testing With 12 Institutions," Sep. 23, 1983, 4 pages.
Bent et al., Office Action, U.S. Appl. No. 10/071,053, with attached SB08, dated Mar. 10, 2009, 2 pages.
Merrill Lynch & You, "Financial Services the Way You Want, When You Want Them," Jan. 2000, 16 pages.
Exhibit 1, "FA/FB Account 1997 First Transactions, TRX Types: PU, PP, TA, PT," Aug. 2003, p. 1-2.
Advertisement: Where Your Interest is?, Mutual Funds, Oct. 1997; 1 page.
Advertisement: It's 1997, Do You Know Where Your Interest Is?, Mutual Funds, Dec. 1993, p. 46.
USPTO Office Action, Interview Summary, U.S. Appl. No. 11/767,827, dated Sep. 23, 2009, 4 pages.
USPTO Office Action, Office Action Summary, U.S. Appl. No. 11/767,827, dated Jun. 5, 2009, 35 pages.
Service Mark Application, Applicant: Reserve Management Corporation, Mark: Reserve Insured Deposits, (attached Power of Attorney, Declaration, Drawing Page, Sep. 21, 2001, 6 pages.
Letter to C.R. Macedo, from R.L. Rainey, Re: Promontory Interfinancial Network, LLC, dated Jul. 22, 2008, (attached Attachments A-E), 35 pages.
Letter to C.R. Macedo, from R.L. Rainey, Re: Promontory Interfinancial Network, LLC, dated Oct. 16, 2008, (attached Attachments A-C), 22 pages.
Letter to C.R. Macedo, from R.L. Rainey, Re: Promontory Interfinancial Network, LLC, dated Feb. 23, 2009, (attached Exhibit A-B), 21 pages.
Merrill Lynch & Co., Inc., Form 10-K405 (Annual Report (Regulation S-K, item 405)), Filed Mar. 14, 2002 for the Period Ending Dec. 28, 2001, 248 pages.
Merrill Lynch, "Information Statement Regarding changes to Interest Rates on Deposits in the Merrill Lynch Banks," Nov. 12, 2007, 2 pages.
QUESTessentials, "Quest Insured Account," May 17, 1994, 3 pages.
OCC Insured Bank Deposit Account (attached are p. 2 of Quest for Value Funds Daily Data, Jun. 1993; OCC Insured Account Rate Table), 3 pages.
CIBC World Markets, "Insured Bank Deposit Account," Information Statement, Jul. 1, 2000, 2 pages.
Letter to Client, from M.J. Hensle, Re: Salomon Smith Barney Bank Deposit ProgramSM, (attached Q&A: Important Information about the New Salomon Smith Barney Bank Deposit Program), Aug. 16, 2002, 14 pages.
Salomon Smith Barney, "Bank Deposit Program Disclosure Statement," 2002; 3 pages.
FDIC, FDIC Law, Regulations, Related Acts—4000—Advisory Opinions, Oct. 22, 1987, J. W. Via, Jr., Counsel [online] [Retrieved on Jan. 22, 2010]. Retrieved from the Internet: URL: <http://www.fdic.gov/regulations/laws/rules/4000-2560.html>, 1 page.
FDIC, FDIC Law, Regulations, Related Acts—4000—Advisory Opinions, Jun. 28, 1993, J. A. DiNuzzo, [online] [Retrieved on Jan. 22, 2010]. Retrieved from the Internet: URL: <www.fdic.gov/regulations/laws/rules/4000-8240.html>, 2 pages.

(56) References Cited

OTHER PUBLICATIONS

FDIC, FDIC Law, Regulations, Related Acts—4000—Advisory Opinions, Jul. 23, 1986, D. H. Jones [online] [Retrieved on Jan. 22, 2010]. Retrieved from the Internet: URL: <www.fdic.gov/regulations/laws/rules/4000-2120.html#fdic400086-21>, 2 pages.
Merrill Lynch—Pierce, Fenner & Smith, Inc., "The Merrill Lynch Cash Management Account®," Financial Service, Jan. 1985, 18 pages.
Merrill Lynch, "Insured Savings™ Account Fact Sheet," The Merrill Lynch Cash Management Account® Financial Service, 1987; 11 pages.
CMA, "A Guide to Your CMA Account," Jan. 1995, 38 pages.
American Banker, Salomon's Sweep Plan Raises FDIC Fund Alarm [online], Dec. 6, 2000 [retrieved on Apr. 13, 2009]. Retrieved form the Internet: <URL: http://www.americanbanker.com/printthis.html?id=2000120603YJGEZD>, 2 pages.
The Insured Deposit Account: "Money in the Bank," p. 5; Three Little Letters. Three Big Ways to Save in 1998; 1998; p. 4.
LexisNexis, The American Banker, Sep. 23, 1983, Merrill Joins Money Market Account, CMA; Broker Begins Testing With 12 Institutions, Byline: A. Arvan, 4 pages.
Merrill Lynch & Co Inc—MER, 10k Wizard, Form 8-K, "Report of Unscheduled Material Events or Corporate Changes," Filed Mar. 7, 2002, 51 pages.
Federal Reserve System, LEXSEE 51 FR 9632, "Definition of Deposit and Technical Amendments," Action: Final Rule, Mar. 20, 1986, 13 pages.
Federal Reserve System, LEXSEE 56 FR 15494, "Regulation D—Reserve Requirements of Depository Institutions," Action: Final Rule, Apr. 17, 1991, 5 pages.
Federal Reserve System, Part 201—Reserve Requirements of Depository Institutions (Regulation D)12 CFR Ch. II (Jan. 1, 2010 Edition); Aug. 1980; pp. 94-128, Pt. 204-Pt. 205.
Letter to G.T. Schwartz, from O.I. Ireland, dated Jun. 22, 1988, Re: response to letter of Dec. 18, 1987 regarding proposed modifications to Merrill Lynch's CMA Program, 5 pages.
Federal Reserve System, LEXSEE 47 FR 55207, "Reserve Requirements of Depository Institutions; Money Market Deposit Account," Dec. 8, 1982, Action: Final Rule, 5 pages.
Insured Bank Deposits™ Program Summary Information Statement, May 9, 2002; 11 pages.
Insured Bank Deposits™ Program Information Statement, (attached List of Eligible Program Banks, Effective May 9, 2002; New Account Application, Joint Account Agreement), 11 pages.
Wayne Hummer Investments, "Insured Bank Deposits™ Program, Frequently Asked Questions," 2001 or earlier; 4 pages.
Memorandum to M. Peterson, J. Whitt, R. Wroten, E. Naumes, E. Deal, B. McCain, from J.E. Oncken, Jun. 15, 1990, Re: Insured Savings Update (with attachments), 7 pages.
Insured Savings, "Project Team Meeting," Feb. 2, 1989, 21 pages.
Insured Savings, "Overview & Marketing Plan," Presented by: J.E. Oncken, Dec. 6, 1988, (including Exhibit A), 23 pages.
Letter to V.J. Best, from J.E. Oncken, dated Apr. 18, 1988, 2 pages.
Letter to M.L. Duke from K. Johnson, dated Dec. 27, 1989, (attached Insured Savings Correspondent Agreement, Exhibits A-D, letter to M.L. Duke from K. Johnson dated Nov. 21, 1989 and Account Information Sheet), 39 pages.
Memorandum to J. Oncken, J. Scurlock, B. Standefer, E. Piner, T. Cyr, from K. Johnson, dated Jul. 5, 1990, Re: Attached Insured Savings Letters (with attachments), 9 pages.
E.D.S.—First City Austin Electronic Mail, from J. Oncken, to T. Cyr, Re: Depository Levels at Insured Savings Depositories, Nov. 2, 1989, 1 page.
Cash Management Balance Monitoring Agreement and Memorandum from Ed Piner to Cash management Line of Business Representatives dated May 21, 1991(with attachments), 8 pages.
Merrill Lynch, Insured Savings Account Fact Sheet, The Merrill Lynch Cash Management Account® Financial Service, Jan. 1986, 4 pages.

Merrill Lynch Money Markets, Inc., Merrill Lynch Capital Markets, "The Insured Savings Account, Issuer Guide to Offering MMDAs through Merrill Lynch," Sep. 1986; 36 pages.
Merrill Lynch, The Merrill Lynch Capital BuilderSM Account Financial Service, Insured SavingsSM Account Participating Depository Institutions, 1996, 2 pages.
Insured Deposit Account, May 21, 1996, 14 pages.
An Introduction to the Smith Barney Insured Deposit Account, Sep. 20, 1995; 8 pages.
Smith Barney Inc. Capital Markets, Debt Origination Group Memo, to J. Mandelbaum, from T. Hamilton, cc: R. Holloman, H. Bald, S. Becton, Re: Insured Deposit Account, Oct. 10, 1995; Smith Barney Inc. Capital Markets, Debt Origination Group Memo, to B. Holloman, from T. Hamilton, cc: W. Heinzerling, H. Morris, COPs, Re: New Product Proposal for Insured Deposit Account, Sep. 18, 1995, 2 pages.
Insured Deposit Account, Product Description for the Investor, Draft as of Sep. 20, 1995, 8 pages.
"Bank of Oak Ridge to Offer FDIC Insurance on up to $1.5 Million," Dialog Web Command Mode, 2 Sheets, Sep. 25, 2003, http://www.dialogweb.com/cgi/dwclient.
"Man Bites Dog: Funds Move Into Banking," IBC's Money Fund Selector, 2 Sheets, Nov. 6, 1998.
"Reverse Ups Insurance Limit on Money Market Account," Thomson Financial Inc., Mutual Fund Market News, 1 Sheet, Aug. 26, 2002.
"The Bank of New York adds a $300,000 FDIC-Insured Money Market Account Option to its Dividend Income Checking Account," PR Newswire Associations, Inc., PR Newswire, 2 Sheets, Apr. 18, 2002.
"The Reverse Funds to Offer up to $600,000 of FDIC Insurance on Reserve Insured Deposits; Addressing Investor Needs for Increased Safety, Flexibility and a Competitive Yield," Business Wire, Inc. Business Wire, 2 Sheets, Aug. 13, 2002.
12 CFR Part 329—Interest on Deposit, Source: 51 FR 10808, Mar. 31, 1986, 5 Sheets.
AB 2011 Assembly Bill—Bill Analysis, Senate Amendments, http://www.leginfo.ca.gov/pub/bill/asm/ab_2001-2050/ab_2011_cfa_20060811_161755_asm_floor.html, 2006, pp. 1-3.
AB 2011 Assembly Bill—Bill Analysis, Senate Rules Committee, Third Reading, http://www.leginfo.ca.gov/pub/bill/asm/ab_2001-2050/ab_2011_cfa_20060705_161454_sen_floor.html, 2006, pp. 1-7.
AB 2011 Assembly Bill—Chaptered, http://www.leginfo.ca.gov/pub/bill/asm/ab_2001-2050/ab_2011_bill_20060925_chaptered.html, 2006, pp. 1-3.
AB 2011 Assembly Bill—Enrolled, http://www.leginfo.ca.gov/pub/bill/asm/ab_2001-2050/ab_2011_bill_20060816_enrolled.html, 2006, pp. 1-3.
AB 2011 Assembly Bill—History, Complete Bill History, http://www.leginfo.ca.gov/pub/bill/asm/ab_2001-2050/ab_2011_bill_20060925_history.html, 2006, p. 1.
About iMoneyNet, Inc., About iMoneyNet's Money Funds Division, 4 Sheets, Aug. 21, 2003, http://www.ibcdata.com/about.htm.
Adler, Joe, "Promontory to Roll Out Deposit Service Insuring Liquid Funds", American Banker, Feb. 22, 2010, 1 sheet.
An iMoneyNet Special Report, Brokerage Cash Sweep Options: The Shift from Money Funds to FDIC-Insured Bank Deposit Accounts, by Peter G. Crane & Michael F. Krasner, iMoneyNet, Nov. 2004, 66 pages.
Anderson et al. "Retail Sweep Programs and Bank Reserves," Federal Reserve Bank of St. Louis Review, Bell & Howell Information and Learning Company, vol. 83, Issue 1, 24 Sheets, Jan. 1, 2001.
Announcing Changes in Automatic "Sweep" Investment Options, LPL Financial Services, Linsco/Private Ledger, Member NASD/SIPC, Jun. 2006; 26 Sheets.
Bank Deposit Program, Online http://web.archive.org/web/20030620100115/http:/www.smithbarney.com/products_servi, Jan. 19, 2001, 4 Sheets.
Bent, "Bruce Bent Makes Money Market Funds Act Like Bank Accounts," Equity BBDP, Oct. 5, 1998, 3 Sheets.

(56) References Cited

OTHER PUBLICATIONS

Blackwell, "ABA to Approve System for Sharing Deposit Coverage," American Banker, 2 Sheets, Feb. 11, 2003.
Blackwell, "New Pitch: Deposit Insurance Sharing," American Banker Online, 4 Sheets, Jan. 21, 2003.
Board of Governors of the Federal Reserve System, 1984 Fed. Res. Interp. Ltr. LEXIS 56, Nov. 16, 1984, 3 Sheets.
Board of Governors of the Federal Reserve System, 1988 Fed. Res. Interp. Ltr. LEXIS 141, Jun. 22, 1988, 3 Sheets.
Board of Governors of the Federal Reserve System, 1989 Fed. Res. Interp. Ltr. LEXIS 154, Jun. 21, 1989, 2 Sheets.
Board of Governors of the Federal Reserve System, 1989 Fed. Res. Interp. Ltr. LEXIS 77, Mar. 14, 1989, 2 Sheets.
Board of Governors of the Federal Reserve System, 1990 Fed. Res. Interp. Ltr. LEXIS 94, Feb. 1, 1990, 1 Sheet.
Board of Governors of the Federal Reserve System, 1991 Fed. Res. Interp. Ltr. LEXIS 232, Jan. 30, 1991, 2 Sheets.
Board of Governors of the Federal Reserve System, 1994 Fed. Res. Interp. Ltr. LEXIS 156, Jun. 24, 1994, 3 Sheets.
Board of Governors of the Federal Reserve System, 1994 Fed. Res. Interp. Ltr. LEXIS 314, Oct. 17, 1994, 2 Sheets.
Board of Governors of the Federal Reserve System, 1994 Fed. Res. Interp. Ltr. LEXIS 419, Oct. 14, 1994, 4 Sheets.
Britt, "Struggling with Sweep Accounts," America's Community Banker, vol. 6, No. 12, 11 Sheets, Dec. 1, 1997.
California Independent Bankers, ICBA Independent Community Bankers of America, Banker Bulletin, 2006, CIB 16th Annual Convention, vol. 4, issue 6, http://www.cib.org/banker_bulletin.htm.
Capital Briefs: Corporate Checking Account Relief Sought, American Banker, vol. 162, Jul. 28, 1997, 1 Sheet.
Certificate of Deposit Registry Service: Keeping Deposits in the Corn Patch, Banknews, 2 Sheets. Mar. 2003.
Chapelle et al. "Peering Into Tomorrow: At the Threshold of a New Century, Brokers and Others Discuss Where They were Going," Securities Data Publishing on Wall Street, 6 Sheets, Dec. 1, 1999.
Chapelle, "Merrill's Rivals Say They, Too. Offer Services Beyond Banking," Securities Data Publishing on Wall Street, 2 Sheets, Feb. 1, 2003.
CMA, Insured Savings Account Fact Sheet, Merrill Lynch, Pierce, Fenner & Smith Incorporated, 1997, pp. 49-57.
CMA, Insured Savings Account Fact Sheet, Merrill Lynch, Pierce, Fenner & Smith Incorporated, Jul. 1994, pp. 47-54.
CMA, The Investor Credit Line Service, Cost-Effective Financing for the '90s, Merrill Lynch, Pierce, Fenner & Smith Incorporated, 1997, pp. 36-46.
CMA, The Merrill Lynch Cash Management Account Financial Service, Insured Savings Account Participating Depository Institutions, Merrill Lynch, Pierce, Fenner & Smith Incorporated, Mar. 1995, 2 Sheets.
CMA, The Merrill Lynch Cash Management Account Financial Service, Insured Savings Account Participating Depository Institutions, Merrill Lynch, Pierce, Fenner & Smith Incorporated, Nov. 1992, 2 Sheets.
CMA, The Merrill Lynch Cash Management Account Financial Service, Merrill Lynch, Pierce, Fenner & Smith Incorporated, Jan. 1997, 35 Sheets.
Litigation Notice After Payment of Issue Fee filed in Parent U.S. Appl. No. 10/382,946, Apr. 3, 2009, 160 pages.
Coyle, "A Look at commercial Demand Deposit Options," America's Community Banker, vol. 9, Issue 2, Bell & Howell Information and Learning Company, 9 Sheets, Feb. 1, 2000.
Crockett, "Big Banks Found Stepping Up Marketing of 'Sweep' Accounts," American Banker, vol. 159, No. 198, American Banker Inc., 3 Sheets, Oct. 13, 1994.
Declaration of Mr. Bruce Bent II, Vice Chairman and Registrant of Applicant on the date of first commercial use of the service providing interest and FDIC insurance for checking accounts by means of a system using money market deposit accounts (MMDA's) of Oct. 23, 1997.
Declaration of Mr. Bruce Bent II, Vice Chairman and Registrant of Applicant. (3 Sheets) and Exhibits A, B, C and D (6 Sheets).
Deposit Growth Strategies for Financial Institutions, New Sweep Account Helps Retain $40 Million in Business Deposits, vol. 7, No. 12, The Reserve Funds, May 2001, 1 Sheet.
Deutsche Bank Insured Deposit Program, Marketing Literature 2007, 3 pages.
DI 48, Excerpts of Transcript of Hearing, U.S. Dist. Ct., District of Delaware, Civil Action No. 82-680, Apr. 8, 1983, 5 sheets.
DI 56, Interrog. Response, U.S. Dist. Ct. District of Delaware, Civil Action No. 82-680, May 20, 1983, 15 Sheets.
DI 99, Suppl. Interrogatory Response, U.S. Dist. Ct., District of Delaware, Civil Action No. 82-630, May 30, 1984, 6 Sheets.
Dreyfus Insured Deposit Program, Disclosure Statement and Terms and Conditions, Dreyfus A BNY Mellon Company, 8 Sheets.
Dreyfus Insured Deposit Program, Multiple List Program—Effective May 11, 2009, 1 Sheet.
Email from Olivia Kim to Charles Macedo on Jun. 9, 2010 with attachement of Lawsuit by Island Intellectual Property LLC, Lids Capital LLC, Double Rock Corporation, and Intrasweep LLC against Deutshe Bank Trust Company Americas and Total Bank Solutions, LLC, Defendant Deutsche Bank Trust Company America's responses to Intrasweep's common interrogatory Nos. 1-5, Confidential—Attorneys only, Civil Action No. 09 Civ. 2675 (VM) (AJP).
Email from Olivia Kim to Charles Macedo on May 13, 2010 with attachment of Lawsuit by Island Intellectual Property LLC, Lids Capital LLC, Double Rock Corporation, and Intrasweep LLC against Deutshe Bank Trust Company Americas and Total Bank Solutions, LLC, Defendant Deutsche Bank Trust Company America's responses to Double Rock's Common interrogatory Nos. 1-10 to defendants Reservation of Right, Civil Action No. 09 Civ. 2675 (VM) (AJP).
Email from Olivia Kim to Charles Macedo on May 13, 2010 with attachment of Lawsuit by Island Intellectual Property LLC, Lids Capital LLC, Double Rock Corporation, and Intrasweep LLC against Deutshe Bank Trust Company Americas and Total Bank Solutions, LLC, Defendant Total Bank Solutions, LLC's responses to Double Rock's Common interrogatory Nos. 1-10 to defendants, Reservation of Right, Civil Action No. 09 Civ. 2675 (VM) (AJP).
FDIC Federal Register Citations: Email from Bert Ely to Comments, Mar. 8, 2006, Subject: Large-Bank Deposit Insurance Determination Proposal—RIN 3064-AC98—Regs@fdic.gov. Attached, also from FDIC Federal Register Citations: Email From American Banker, by Bert Ely, Feb. 24, 2006, Viewpoint: FDIC's Account-Link Plan a Pointless, Costly Threat.
FDIC, Federal Deposit Insurance Corporation, Letter to Mr. Ronald Rexter, Feb. 28, 2003, From Michelle M. Borzillo, Counsel Supervision and Legislation Section, 2 Sheets.
Federal Register: Oct. 9, 1997 (vol. 62, No. 196), pp. 52809-52868. http://www.fdic.gov/news/news/inactivefinancial/1997/fil97111b.html.
Financial Services Industry, "Web Watch: Trading Company Bundles CDs for Better Rates," Community Banker, Jun. 2002, online, http://findarticles.com/p/articles/mi_qa5344/is_200206/ai_n21313883/.
Finistar Reg. No. 2,939,558, Registered Apr. 12, 2005.
Finistar, Providing FDIC Insured Funds as a Stable Source of Deposits to Commercial Banking Institutions, 16 Sheets, www.Finistar.com.
Fredrickson, "Rising Rates Rescue Money Fund Firm Reserve Profits by Picking Niches," Crain's New York Business, Crain Communications Inc., vol. 20, Issue 51, 2 Sheets, Dec. 20, 2004.
Frost Bank, Member FDIC, Checking Accounts, 1 Sheet, Sep. 19, 2003, https://www.frostbank.com/cgi-bin/ecomm/frost1/scripts/products/product_detail.jsp?BV_. . . .
Garmhausen, "Matching Small Banks with Large Muni Deposits," American Banker, Online the Financial Services Resource, Oct. 4, 2005, 4 pages, http://www.finstar.com/docs/AmericanBanker.html.
Heavyweight Funding, Bankers News, Mar. 4, 2003, vol. II, Issue No. 5, 2 Sheets.
Hencke, "New Rules for FDIC deposit Insurance", ABA Bank Compliance, vol. 20, No. 7, Jul./Aug. 1999, pp. 31-37.

(56) References Cited

OTHER PUBLICATIONS

Hoffman, "Reserve's FDIC-Insured Account Draws Regionals; But some see little need for insurance," Crain Communications Inc., Investment News, 2 Sheets, Jun. 4, 2001.
IDC Deposits, online, http://idcdeposits.com/ , 2009, 1 Sheet.
In the Know, Important Information About Your Account, Smith Barney Citigroup, 2005, 6 Sheets.
Insured Bank Deposit Program Summary Information Statement, Information Statement, and list of Eligible Program Banks Effective Feb. 10, 2005, 11 pages.
Insured Cash Account Program Disclosure Booklet, LPL Financial Services, Linsco/Private Ledger, Member NASD/SIPC 14 pages.
Jong et al., "The Valuation and Hedging of Variable Rate Savings Accounts," University of Amsterdam, Nov. 15, 2001, 23 Sheets.
Keenan, "Tapping Brokerages for Alternative to CDs," American Banker, The Financial Services Daily, 3 Sheets, Feb. 18, 2004.
Lake Forest Bank & Trust Company, Introducing MaxSafe Deposit Accounts with up to $3.75 Million in FDIC Insurance, www.lakeforestbank.com/maxsafe, 2 Sheets.
Lavine, "Check Out High-Yield Checking Accounts," Broward Daily Business Review, vol. 39, No. 102, 2 Sheets, Apr. 27, 1998.
Lawsuit by Island Intellectual Property LLC, Lids Capital. LLC, Double Rock Corporation and Intrasweep LLC, against Promontory Interfinancial Network, LLC, Deutsche Bank AG, Deutsche Bank Trust Company Americas and Total Bank Solutions, LLC, Complaint, Apr. 14, 2009, Case No. 09 CV 3750.
Lawsuit by Carlo DeBlasio et al. against Merrill Lynch & Co., Inc. et al., Declaration of Andrew W. Stern, including Exhibits A, B, C, D, E and F, Nov. 12, 2007, Case No. 07-cv-318 (RJS) (Document 59).
Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: "Client Commitment"; "Get Started Today"; "Total Merrill"; "Guideline for Business Conduct"; "Commitment to Clarity"; "Cash Management Account"; "Information Statement Regarding Changes to Interest Rates on Deposits in Merrill Lynch Banks"; Feb. 5, 2008.
Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 72).
Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 73).
Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 74).
Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 75).
Lawsuit by Carlo DeBlasio et al. against Merrill Lynch & Co., Inc. et al., Declaration of Kenneth I. Schacter, including Exhibits A, B, C, D, F, G, H, I, J, K, L, M, N, O, P, Q and R, Nov. 14, 2007, Case No. 07-cv-318 (RJS) (Document 69).
Lawsuit by Carlo DeBlasio et al. against Merrill Lynch & Co., Inc. et al., Declaration of Mathew J. Terry in Support of Motion to Dismiss by Defendants Wachovia Corporation, Wachovia Securities, LLC, Wachovia Bank, N.A., and Wachovia Bank of Delaware, N.A., including Exhibits A, B, C and D, Nov. 14, 2007, Case No. 07-318 (RJS) (Document 67).

Lawsuit by Carlo DeBlasio et al. against Merrill Lynch & Co., Inc. et al., Declaration of Scott D. Musoff in Support of the Merrill Lynch Defendants' Motion to Dismiss the Second Amended Class Action Complaint, ECF Case, Nov. 12, 2007, Case No. 07-cv-318 (RJS) (Document 64).
Lawsuit by Carlo DeBlasio et al. against Merrill Lynch & Co., Inc. et al., Reply Declaration of Kenneth Schacter including Exhibits S and T, Mar. 6, 2008, Case No. 07-cv-318 (RJS) (Document 81).
Lawsuit by Carlo DeBlasio et al. against Merrill Lynch & Co., Inc. et al., Second Amended Class Action Complaint, Jury Trial Demanded, Introduction and Summary of Allegations, Jun. 11, 2007, Case No. 07-cv-318-VM.
Lawsuit by Carlo DeBlasio et al. against Merrill Lynch & Co., Inc. et al., Supplemental Declaration of Matthew J. Terry in Support of Motion to Dismiss by Defendants Wachovia Corp., Wachova Securities, LLC, Wachovia Bank N.A., and Wachovia Bank of Delaware, N.A., including Exhibits A and B, Mar. 6, 2008, Case No. 07-cv-318 (RJS) (Document 79).
Lawsuit by Carlo DeBlasio, et al. against Merrill Lynch & Co., Inc., et al., Opinion and Order Regarding Motions, Jul. 27, 2009, Case No. 07 CIV 318(RJS).
Lawsuit by Island Intellectual Property LLC and Intrasweep LLC against Deutsche Bank Trust Company Americas and Total Bank Solutions, LLC, Deutsche Bank Trust Company Americas' answer to plaintiffs' Feb. 23, 2010 complaint and counterclaims, May 4, 2010, Civil Action No. 09 Civ. 2675 (VM) (AJP)(Document 111).
Lawsuit by Island Intellectual Property LLC and Intrasweep LLC against Deutsche Bank Trust Company Americas and Total Bank Solutions, LLC, Total Bank Solutions, LLC's answer to plaintiffs' Feb. 23, 2010 complaint and counterclaims, May 4, 2010, Civil Action No. 09 Civ. 2675 (VM) (AJP)(Document 112).
Lawsuit by Island Intellectual Property LLC and Intrasweep LLC against Institutional Deposits Corp. The Island Plaintiffs' Complaint against Defendant Institutional Deposits Corp., Nov. 4, 2009, Civil Action No. 1 09-CV-3079.
Lawsuit by Island Intellectual Property LLC and Intrasweep LLC against Institutional Deposits Corp., Complaint for Patent Infringement, Jury Trial Demanded, Nov. 4, 2009, Civil Action No. 09 CV 3079.
Lawsuit by Island Intellectual Property LLC and Intrasweep LLC against Institutional Deposits Corp., Consent Order, Apr. 21, 2010, Case No. 09-CV-3079 (Document 44).
Lawsuit by Island Intellectual Property LLC and Intrasweep LLC, Answer of Defendant Institutional Deposits Corp. to Complaint for Patent Infringement, Dec. 10, 2009, Case No. 09 CV 03079 (JEC), (Document 16).
Lawsuit by Island Intellectual Property LLC and Lids Capital LLC against Deutsche Bank Trust Company Americas and Total Bank Solutions, LLC, Deutsche Bank Trust Company answer to plaintiffs' Mar. 16, 2010 complaint and counterclaims, May 4, 2010, Civil Action No. 09 Civ. 2675 (VM) (AJP) (Document 113).
Lawsuit by Island Intellectual Property LLC and Lids Capital LLC against Deutsche Bank Trust Company Americas and Total Bank Solutions, LLC, Total Bank Solutions, LLC's answer to plaintiffs' Mar. 16, 2010 complaint and counterclaims, May 4, 2010, Civil Action No. 09 Civ. 2675 (VM)(Document 114).
Lawsuit by Island Intellectual Property LLC, et al. against Deutsche Bank Trust Company Americas, et al,. Defendant Deutsch Bank Trust Company Americas' Responses to Double Rock's Interrogatories Nos. 1-10; May 2010; Civil Action No. 09 Civ. 2675 (VM)(AJP).
Lawsuit by Island Intellectual Property LLC, et al. against Deutsche Bank Trust Company Americas; Defendant Total Bank Solutions, LLC's Responses to Double Rock's Common Interrogatory Nos. 1-10 to Defendants; May 2010; Civil Action No. 09 Civ. 2675 (VM)(AJP).
Lawsuit by Island Intellectual Property LLC, Intrasweep LLC and Double Rock Corporation against Deutsche Bank AG, Deutsche Bank Trust Company Americas and Total Bank Solutions, LLC, Complaint for Patent Infringement, May 19, 2009, Case No. 09 CIV 4673.
Lawsuit by Island Intellectual Property LLC, Lids Capital LLC, and Double Rock Corporation against Deutsche Bank AG, Deutsche

(56) References Cited

OTHER PUBLICATIONS

Bank Trust Company Americas and Total Bank Solutions, LLC, including Cover Sheet, Summons, Complaint and Rule 7.1 Statement, Mar. 24, 2009, Case No. 09 CV 2677.

Lawsuit by Island Intellectual Property LLC, Lids Capital LLC, and Double Rock Corporation against Promontory Interfinancial Network, LLC and MBSC Securities Corporation, including Cover Sheet, Summons, Complaint and Rule 7.1 Statement, Mar. 24, 2009, Case No. 09 CV 2675.

Lawsuit by Island Intellectual Property LLC, Lids Capital LLC, Double Rock Corporation and Intrasweep LLC against Deutsche Bank AG, Deutsche Bank Trust Company Americas and Total Bank Solutions, LLC, Stipulated Dismissal of Deutsche Bank AG Without Prejudice, Nov. 19, 2009, Civil Action No. 09 CIV 2675 (VM) (AJP) (Document 79).

Lawsuit by Island Intellectual Property LLC, Lids Capital LLC, Double Rock Corporation and Intrasweep LLC against Deutsche Bank Trust Company Americas and Total Bank Solutions, LLC, Deutsche Bank Trust Company Americas' First Amended Answer to Consolidated First Amended Complaint and Counterclaims, Dec. 4, 2009, Civil Action No. 09 CIV 2675 (VM) (AJP), (Document 86).

Lawsuit by Island Intellectual Property LLC, Lids Capital LLC, Double Rock Corporation and Intrasweep LLC against Deutsche Bank Trust Company Americas and Total Bank Solutions, LLC, Total Bank Solutions, LLC's First Amended Answer to Consolidated First Amended Complaint and Counterclaims Dec. 4, 2009, Civil Action No. 09 CIV 2675 (VM) (AJP) (Document 87).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Answer and Counter Claims, Answer of Defendant MBSC Securities Corporation, Jun. 25, 2009, Case No. 09 CV 2675.

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Answer and Counter Claims, Answer of Defendant Promontory Interfinancial Network, LLC, Jun. 25, 2009, Case No. 09 CV 2675.

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Consolidated First Amended Complaint, Jury Trial Demanded, Jun. 11, 2009, Civil Action No. 09 CIV 2675 (VM).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Deutsche Bank AG's Answer to Consolidated First Amended Complaint, Jun. 25, 2009, Civil Action No. 09 CIV 2675.

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Deutsche Bank Trust Company Americas' Answer to Consolidated First Amended Complaint and Counter Claims, Jun. 25, 2009, Civil Action No. 09 CIV 2675.

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Total Bank Solutions, LLC's Answer to Consolidated First Amended Complaint and Counterclaims, Jun. 25, 2009, Civil Action No. 09 CIV 2675.

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Stipulated Dismissal of Counts I-III of Defendant Promontory Interfinancial Network, LLC's, Counterclaim with Prejudice, Oct. 19, 2009, (Document 68).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Stipulation and Order, Oct. 29, 2009, Case No. 09 CV 2675 (VM) (AJP) (Document 73).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant Deutsche Bank Trust Company Americas' Counterclaims, Jul. 9, 2009, Civil Action No. 09 CIV 2675 (VM).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant MBSC Securities Corporation's Counterclaims, Jul. 9, 2009, Civil Action No. 09 CIV 2675 (VM).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant Promontory Interfinancial Network LLC's Counterclaims, Jul. 9, 2009, Civil Action No. 09 CIV 2675 (VM).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant Total Bank Solutions, LLC's Counterclaims, Jul. 9, 2009, Civil Action No. 09 CIV 2675 (VM).

Lawsuit by Promontory Interfinancial Network, LLC against Double Rock Corporation p/k/a Reserve Management Corporation and Lids Capital LLC, Amended Complaint, Mar. 27, 2009, Civil Action No. 1:09 CV 316.

Lawsuit by Promontory Interfinancial Network, LLC against Double Rock Corporation p/k/a Reserve Management Corporation, Complaint, Mar. 24, 2009, Civil Action No. 1:09 CV 316.

Lawsuit by Promontory Interfinancial Network, LLC against Double Rock Corporation p/k/a Reserve Management Corporation, Island Intellectual Property LLC, Lids Capital LLC and Intrasweep LLC, Amended Complaint, Apr. 15, 2009, Civil Action No. 3:09 CV 217.

Lawsuit by Promontory Interfinancial Network, LLC against Double Rock Corporation p/k/a Reserve Management Corporation, Island Intellectual Property LLC, Lids Capital LLC and Intrasweep LLC, Complaint, May 19, 2009, Civil Action No. 3:09 CV 322.

Lawsuit by Promontory Interfinancial Network, LLC against Double Rock Corporation, p/k/a Reserve Management Corporation, Island Intellectual Property LLC and Lids Capital LLC, including Cover Sheet, Summons and Complaint, Apr. 14, 2009, Civil Action No. 3:09 CV 217.

Letter from Gilbert T. Schwartz, Skadden, Arts, Slate, Meagher & Flom to Oliver Ireland, Associate General Counsel, Board of Governors of the Federal Reserve System; Dec. 18, 1987; 19 sheets.

Letter From Jamey Basham, Attorney, LEXSEE 1990 FDIC Interp. Ltr., Lexis 1, Federal Deposit Insurance Corporation, FDIC-90-02, Jan. 3, 1990, 2 Sheets.

Letter From Joseph A. DiNuzzo, Counsel, Oct. 20, 1999, FDIC, Federal Deposit Insurance Corporation, 1 Sheet.

(56) References Cited

OTHER PUBLICATIONS

Letter From Merle Y. Waldman, LEXSEE 1985 Sec No- Act., Lexis 1593, Securities Exchange Act of 1934—Section 15(a), Jan. 8, 1985, 11 Sheets.
Letter from Michael Bradfield, General Counsel, Board of Governors of the Federal Reserve System, Nov. 16, 1984, 4 Sheets.
Letter From Roger A. Hood, Assistant General Counsel, Jul. 16, 1986, FDIC, Federal Deposit Insurance Corporation, Legal Division, 1 Sheet.
Letter from Roger M. Zaitzeff, Seward & Kissel to Gilbert T. Schwartz, Associate General Counsel, Board of Governors of the Federal Reserve System; May 10, 1983, 5 sheets.
Letter from Stephanie Martin, Assoc. General Counsel, Board of Governors of the Federal Reserve System, Apr. 22, 2004, 8 Sheets.
Letter to Mr. James E. Creekman, Group Vice President, From Oliver Ireland, Associate General Counsel, Aug. 1, 1995, 4 Sheets.
Letter to Mr. Jonathan L. Levin, Esq., From Oliver Ireland, Associate General Counsel, Oct. 18, 1996, 2 Sheets.
Letter to Mr. L.P. Fleming, Jr., Esq., From Oliver Ireland, Associate General Counsel, Feb. 7, 1995, 3 Sheets.
Letter to Ms. Brenda L. Skidmore, Senior Vice President, From Oliver Ireland, Associate General Counsel, Aug. 30, 1995, 4 Sheets.
Letter to William R. Burdette, CEO, Apr. 6, 2009, FDIC, Federal Deposit Insurance Corporation, 2 pages.
Letter to William R. Burdette, CEO, Nov. 15, 2007, FDIC, Federal Deposit Insurance Corporation, 5 Sheets.
Liberman et al., Market Watch, "How Important are Banks?" FDIC Insurance on Deposits Just One Continuing Advantage, Oct. 17, 2006, 3 Sheets.
McReynolds et al. "Unusual Products for Unusual Times," Securities Data Publishing on Wall Street, 6 Sheets, May 1, 2001.
McReynolds, "The Power of CASH: Ho-hum cash can be great product (and lead to more business) in troubled times," Securities Data Publishing on Wall Street, 3 Sheets, Jun. 1, 2002.
Merriam-Webster Online Dictionary, 10th Edition, Definition of "Associated", 2 Sheets.
Merrill Lynch Announces Beyond Banking, The Power of Advice for Smarter Cash Management, Jan. 8, 2 Sheets.
Merrill Moves CMA Cash to Bank, Street Talk, on Wall Street, Nov. 2000, p. 26.
Money Fund Report, Bank of New York Adds Insured Sweeps Option, Friday, May 3, 2002, The Reserve Funds, 1 Sheet.
Money Fund Report, IBC Financial Data, Inc., Nov. 6, 1998, 1 Sheet.
Money Fund Report, Insured Cash Sweep Options Proliferate, Friday, Jun. 1, 2001, The Reserve Funds, 1 Sheet.
Money Market Insight's, Goldman Sachs May Create Bank to Offer Insured Cash Sweeps, Aug. 2002 Issue, 3 Sheets.
Munk, Merrill Makes New Push Into Traditional Banking, Dow Jones Newswires, Jan. 3, 2003, 1 Sheet.
Mutual Funds Magazine, Bargain Basement Funds, Oct. 1997, 1 Sheet.
Mutual Funds Magazine, Bargain Basement Funds, Oct. 1997, 2 Sheets.
News Article: "Regulators Support Demand Deposit Bill", Regulatory Compliance Watch—Mar. 9, 1998; 2 Sheets, vol. 9, No. 10.
Northbrook Bank & Trust Company, Introducing our MaxSafe CD with up to $700,000 of FDIC Insurance, 4 Sheets.
Northbrook Bank & Trust Company, Seven Times the Security of a Normal CD, Introducing our MaxSafe CD, 4 Sheets.
O'Brian, "Money-Market Funds Suit Many Investors, But Proud Creator Frets About Extra Risk," Re-Printed From the Wall Street Journal, Monday, Nov. 6, 2000, Dow Jones & Company, Inc., 2 Sheets.
On Wall Street, Helping Brokers Build a More Successful Business, The Power of Cash, Jun. 2002, 2 Sheets.
On Wall Street, Helping Brokers Build a More Successful Business, Unusual Products for Unusual Times, May 2001, 2 Sheets.
Online, www.usabancshares.com, Brave New World, 1999, 2 Sheets.

Part: 2, Monetary Policy and Reserve Requirements, Subpart-Regulation D, Board Interpretations of Regulation D, Transaction Accounts—Linked to Time Deposits, vol. 1, Federal Reserve Regulatory Service, Mar. 1994; 2 Sheets.
Potter, "As Sweep Accounts Continue to Grow, So do Community Bank Options," America's Community Banker, vol. 9, Issue 8, Bell & Howell Information and Learning Company, 3 Sheets, Aug. 1, 2000.
Promontory Interfinancial Network, Promontory Interfinancial Network Announces New Deposit Placement Service, Jan. 21, 2003, 3 Sheets.
Promontory Interfinancial Network: http://www.promnetwork.com/index.html, 2003.
Promontory Interfinancial Network: Frequently Asked Questions (FAQs), Feb. 5, 2003, 5 pages.
Promontory to Roll Out Deposit Service Insuring Liquid Funds, American Banker, by Joe Adler, Feb. 22, 2010, 2 sheets.
Reserve Insured Deposits, United States Patent and Trademark Office, Reg. No. 2,694,910, Registered Mar. 11, 2003, 1 Sheet.
Reserve Management Corporation, Reserve Insured Deposits, Serial No. 76/315,600, Issued.
Ring, National /Global, "Amex Spans the Globe in Retail Bank Buildup," Nov. 27, 2000, 1 Sheet.
Share, "New Service Skirts FDIC's $100K Limit," Dialog Web Command Mode, 2 Sheets, Jun. 13, 2003, http://www.dialogweb.com/cgi/dwclient.
Smith, "IBAA Won't Push Interest-Bearing Checking for Business; Says Too Few Members Want It," The American Banker, 2 Sheets, Apr. 18, 1996.
Stafford, "New Bank Program Allows $1 Million in Insured Deposits," Dialog Web Command Mode, 3 Sheets, Aug. 24, 2003, http://www.dialogweb.com/cgi/dwclient.
Sweeping Your Firm Into FDIC Insured Deposits, Harken Financial Services, Aug. 4, 2006, 8 Sheets.
Testimony of Bruce R. Bent, CEO of the Reserve Funds, Before the Financial Institutions and Consumer Credit Subcommittee House Financial Services Committee U.S. House of Representative, Hearing on H.R. 758 and H.R. 859, Mar. 5, 2003, 4 Sheets.
The Depository Trust Company, B#: 3875, Oct. 1, 2002, Settlement\Underwritting, From: Denise Russo, Director, Underwritting, 6 Sheets.
The Insured Savings Account, Issuer Guide to Offering MMDAs Through Merrill Lynch, Merrill Lynch Money Markets, Inc., "Operational Guide to the Merrill Lynch MMDA Program 1986", Sep. 1986 3 Sheets.
The Pershing Press, Dreyfus Insured Deposit Program, Issue 2, Aug. 2008, http://www.pershing.com/news/pershing_press/news_466244.html, 1 Sheets.
The Reserve Fund, Study of U.S. Pat. No. 6,374,231, 1 Sheet.
The Reserve Funds Press Release, "The Reserve Funds and Frontier Bank Partner to Offer Revolutionary Banking Product," 5 Sheets, Aug. 1, 2000.
The Reserve Funds, Objectives, Observations & Strategies for American Enterprises Inv., Oct. 18, 2000, 11 Sheets.
The Reserve Funds, NJBA Endorses New Sweep Account Offers New Jersey Banks Deposit Growth, Retention, for Immediate Release, May 23, 2001, 1 Sheet.
The Reserve Funds, Reserve Management and Irwin Union Bank and Trust Company Partner to Offer the Reserve Return Sweep, for Immediate Release, Mar. 8, 2001, 2 Sheets.
The Reserve, "Company History," 3 Sheets, Oct. 4, 2006, http://www.ther.com/aboutus/history.shtml.
The Reserve, "Reserve Insured Deposits Program," 2 Sheets, Oct. 4, 2006, http://www.ther.com/bank/bank_insdep.shtml.
The Reserve, "Reserve Insured Deposits," 2 Sheets, Oct. 4, 2006, http://www.ther.com/ps/ps_fif.shtml.
The Reserve, "What Sets Us Apart," 2 Sheets, Oct. 4, 2006, http://www.ther.com/bank/bank_wsua.shtml.
The Unmatched Sweep Solution From the Cash Management Expert, 1999; 2 Sheets.
Total Bank Solutions, Bank Sweep FAQs http://www.totalbanksolutions.com/sweepbnkfaqs.htm, Sep. 23, 2005, 2 pages.

(56) References Cited

OTHER PUBLICATIONS

Total Bank Solutions, Bank Sweep FAQs, http://www.totalbanksolutions.com/sweepbnkfaqs.htm, Nov. 2, 2005, 3 pages.
Total Bank Solutions, Bank Sweep Products, Deutsche Bank, http://www.totalbanksolutions.com/banksweep.htm, Sep. 23, 2005, 1 page.
Total Bank Solutions, Bank Sweep Products, http://www.totalbanksolutions.com/banksweep.htm, Appendix 3, Oct. 18, 2005, 2 pages.
Total Bank Solutions, Bank Sweep Products, http://www.totalbanksolutions.com/banksweep.htm, Nov. 2, 2005, 2 pages.
Total Bank Solutions, Brokerage Sweep FAQs, http://www.totalbanksolutions.com/brokerfaqs.htm, Nov. 2, 2005, 3 pages.
Total Bank Solutions, Brokerage Sweep, http://www.totalbanksolutions.com/brokersweep.htm, Nov. 2, 2005, 1 page.
Total Bank Solutions, Deposit Bank FAQs, http://www.totalbanksolutions.com/depositbnkfaqs.htm, Nov. 2, 2005, 2 pages.
Total Bank Solutions, Deposits, Deutsche Bank, http://www.totalbanksolutions.com/deposits.htm, Sep. 23, 2005, 1 page.
Total Bank Solutions, Deposits, http://www.totalbanksolutions.com/deposits.htm, Nov. 2, 2005, 2 pages.
Total Bank Solutions, Deutsche Bank Insured Deposit Program, DB Insured Deposit Program Features, http://www.totalbanksolutions.com/features.htm, Sep. 23, 2005, 2 pages.
Total Bank Solutions, Deutsche Bank Insured Deposit Program, http://www.totalbanksolutions.com/, Sep. 23, 2005, 1 page.
Total Bank Solutions, http://www.totalbanksolutions.com/, Mar. 16, 2007, 8 pages.
Total Bank Solutions, http://www.totalbanksolutions.com/overview.htm, Nov. 2, 2005, 1 page.
Total Bank Solutions, Insured Deposit Program Features, http://www.totalbanksolutions.com/features.htm, Nov. 2, 2005, 2 pages.
Total Bank Solutions, Insured Deposit Program, http://www.totalbanksolutions.com/Insureddeposits.htm, Nov. 2, 2005, 2 pages.
Total Bank Solutions, Partners & Affiliates, http://www.totalbanksolutions.com/partners.htm, Nov. 2, 2005, 3 pages.
Total Bank Solutions, Partners & Affiliates, http://www.totalbanksolutions.com/partners.htm, Oct. 25, 2005, 3 pages.
Total Bank Solutions, Strategtic Partners, Nov. 2, 2005, 1 page.
Total Bank Solutions, TBS Deposit Account, About Our Broker Products, http://www.totalbanksolutions.com/brokerproducts.htm, Sep. 7, 2005, 2 pages.
Total Bank Solutions, TBS Management Team, http://www.totalbanksolutions.com/management.htm, Appendix 1, Oct. 18, 2005, 1 page.
Total Bank Solutions, TBS Management Team, http://www.totalbanksolutions.com/management.htm, Nov. 2, 2005, 2 pages.
Total Bank Solutions, TBS Management Team, http://www.totalbanksolutions.com/management.htm, Oct. 25, 2005, 2 pages.
TotalBank Solutions, TBS Bank Deposit Account, Oct. 2004, 7 pgs.
TotalBank Solutions, web.archive.org/web/20050126044216/http://totalbanksolutions.com, Jan. 26, 2005, 2 pgs.
USA Mutual Partners Insured Cash Shelter Account Terms and Conditions, 11 pages, 2009 USA Mutuals Partners, Inc.
Wachovia Securities, Important Information for Clients Concerning Changes in Automatic "Sweep" Arrangements, Oct. 1, 2003, 6 sheets.
Waddell, "Sweeping Clean," Advisor, The Advisor to Advisors, Oct. 2001; 2 Sheets.
Wilson, "How Cash Management Services Can Help Your Bank Cultivate New Relationships with Commercial Customers," America's Community Banker, vol. 10, Issue 5, Bell & Howell Information and Learning Company, 8 Sheets, May 1, 2001.
Garton, Thomas W.; Are LLC Banks in the Cards? Stay Tuned; Fredrikson & Byron, P.A.; Jun. 2003; http://www.fredlaw.com/articles/banking/bank_0306_twig.html; 2 pages.
Lawsuit by Island Intellectual Property LLC against Clearview Correspondent Services, LLC, et al.; Complaint for Patent Infringement; Civil Action No. 1:11-cv-448 (LO/TRJ); Apr. 26, 2011; 55 pages.
Lawsuit by Island Intellectual Property LLC against First Southwest Company; Complaint for Patent Infringement; Civil Action No. 1:11-cv-00371-UNA; Apr. 26, 2011; 42 pages.
Lawsuit by Island Intellectual Property LLC et al., against Deutsche Bank Trust Company Americas, et al.; Expert Report of Richard T. Powers Concerning Invalidity of U.S. Pat. Nos. 7,509,286; 7,519,551; 7,536,350; 7,668,771; 7,668,772, 7,672,886; and 7,660,734; and Exhibits A-R; Civil Action No. 09 Civ. 2675(VM)(AJP), Oct. 28, 2010; 1,119 pages.
Lawsuit by *Island Intellectual Property LLC* v. *Clearview Correspondent Services, LLC, et al.*; Branch Banking & Trust Company's Answer to Complaint and Counterclaims; Civil Action No. 1:11-cv-448-LO-IDD; Jun. 20, 2011; 13 pages.
Lawsuit by *Island Intellectual Property LLC* v. *Clearview Correspondent Services, LLC, et al.*; Clearview Correspondent Services, LLC's Answer to Complaint and Counterclaims; Civil Action No. 1:11-cv-448-LO-IDD; Jun. 20, 2011; 12 pages.
Lawsuit by *Island Intellectual Property LLC* v. *Clearview Correspondent Services, LLC, et al.*; Scott & Stringfellow, LLC's Answer to Complaint and Counterclaims; Civil Action No. 1:11-cv-448-LO-IDD; Jun. 20, 2011; 12 pages.
Lawsuit by *Island Intellectual Property LLC* v. *First Southwest Company*; First Southwest Company's Answer to Complaint and Counterclaims; Civil Action 1:11-cv-371-SD; Jun. 20, 2011; 11 pages.
Lawsuit by Island Intellectual Property LLC, et al. against Deutsche Bank Trust Company Americas, et al.; Expert Report of Ivan Zatkovich Regarding Validity and Enforceability of the Asserted Claims of the Patents-in-Suit; Civil Action No. 09 Civ. 2675 (VM)(AJP); Nov. 23, 2010; 192 pages. The redacted items were designated as confidential in a Protective Order in this case.
Lawsuit by Island Intellectual Property LLC, et al. against Deutsche Bank Trust Company Americas, et al.; Expert Report of the Honorable Gerald J. Mossinghoff and Exhibits A-E; Civil Action No. 09 Civ. 2675 (VM)(AJP); Nov. 23, 2010; 107 pages.
Lawsuit by Island Intellectual Property LLC, et al., against Deutsche Bank Trust Company Americas, et al.; Defendant Deutsche Bank Trust Company Americas' Fifth Supplemental Responses to Island IP's First Set of Common Interrogatories to All Defendants (No. 7); Case No. 09 Civ. 2675 (VM)(AJP); Sep. 16, 2010; 9 pages.
Lawsuit by Island Intellectual Property LLC, et al., against Deutsche Bank Trust Company Americas, et al.; Defendant Total Bank Solutions, LLC's Fifth Supplemental Responses to Island IP's First Set of Common Interrogatories to All Defendants (No. 7); Case No. 09 Civ. 2675 (VM)(AJP); Sep. 16, 2010; 9 pages.
*Island Intellectual Property LLC et al.* v. *Deutsche Bank AG, et al.*; Memorandum and Order; Case 1:09-cv-02675-KBF; Doc. 289; Feb. 14, 2012; pp. 1-28.
*Island Intellectual Property LLC et al.* v. *Deutsche Bank AG, et al.*; Order; Case 1:09-cv-02675-KBF; Doc. 221; Feb. 14, 2012; pp. 1-34.
*Island Intellectual Property LLC et al.* v. *Deutsche Bank Trust Company Americas, et al.*; Declaration of Charles R. Macedo 2 in support of Plaintiffs' motions in limine Nos. 4-6; Case 1:09-cv-02675-KBF; Doc. 260; Feb. 3, 2012; pp. 1-3 and Exhibits.
*Island Intellectual Property LLC et al.* v. *Deutsche Bank Trust Company Americas, et al.*; Defendants' opposition to Plaintiffs' motion in limine #3 to preclude defendants' expert Richard T. Powers from testifying that the Merrill Lynch CMA/ISA product includes omnibus accounts. Case 1:09-cv-02675-KBF; Doc. 269; Feb. 6, 2012; pp. 1-18.
*Island Intellectual Property LLC et al.* v. *Deutsche Bank Trust Company Americas, et al.*; Defendants' opposition to Plaintiffs' motion in limine #4 to preclude evidence and argument regarding Plaintiffs' confidential Oct. 18, 2000 presentation to American Enterprises Investment Services at trial; Case 1:09-cv-02675-KBF; Doc. 284; Feb. 10, 2012; pp. 1-12.
*Island Intellectual Property LLC et al.* v. *Deutsche Bank Trust Company Americas, et al.*; Memorandum and Order; Case 1:09-cv-02675-KBF; Doc. 265; Feb. 6, 2012; pp. 1-22.
*Island Intellectual Property LLC et al.* v. *Deutsche Bank Trust Company Americas, et al.*; Plaintiffs' brief in support of their motion

(56) References Cited

OTHER PUBLICATIONS in limine #3 to preclude defendants' expert Richard T. Powers from testifying that the Merrill Lynch CMA/ISA product includes omnibus accounts based on 17-year old double hearsay that is uncorroborated and in contravention of documentary and oral evidence of record; Case 1:09-cv-02675-KBF; Doc. 247; Jan. 30, 2012; pp. 1-20.

*Island Intellectual Property LLC et al.* v. *Deutsche Bank Trust Company Americas, et al.*; Plaintiffs' memorandum of law in support of motion in limine #4 to preclude evidence and argument regarding Plaintiffs' confidential Oct. 18, 2000 presentation to American Enterprises Investment Services at trial; Case 1:09-cv-02675-KBF; Doc. 262; Feb. 6, 2012; pp. 1-10.

*Island Intellectual Property LLC et al.* v. *Deutsche Bank Trust Company Americas, et al.*; Plaintiffs' motion in limine #4 to preclude evidence and argument regarding Plaintiffs' confidential Oct. 18, 2000 presentation to American Enterprises Investment Services at trial; Case 1:09-cv-02675-KBF; Doc. 257; Feb. 3, 2012; pp. 1-10.

*Island Intellectual Property LLC et al.* v. *Deutsche Bank Trust Company Americas, et al.*; Plaintiffs' Notice of Motion and Motion in Limine #3 to preclude Defendants' expert Richard T. Powers from testifying that the Merrill Lynch CMA/ISA product includes omnibus accounts based on 17-year old double hearsay that is uncorroborated and in contravention of documentary and oral evidence of record; Case 1:09-cv-02675-KBF, Doc. 246; Jan. 30, 2012; pp. 1-2.

*Island Intellectual Property LLC et al.* v. *Deutsche Bank Trust Company Americas, et al.*; Plaintiffs' notice of motion and motion in limine #3 to preclude testimony of Gilbert Schwartz; Case 1:09-cv-02675-KBF; Doc. 259; Feb. 3, 2012; pp. 1-2.

*Island Intellectual Property LLC et al.* v. *Deutsche Bank Trust Company Americas, et al.*; Plaintiffs' notice of motion and motion in limine #4 to preclude evidence and argument regarding Plaintiffs' confidential Oct. 18, 2000 presentation to American Enterprises Investment Services at trial; Case 1:09-cv-02675-KBF; Doc. 256; Feb. 3, 2012; pp. 1-2.

Knight-Ridder; Money Matters, Tips you can use—Limits Apply as FDIC Insurance Covers Depositor, Not Account; Chicago Tribune; Feb. 4, 1998; 2 pages.

Lawsuit by *Island Intellectual Property LLC et al.* v. *Deutsche Bank Trust Company Americas et al.*; Joint Statement of Claims and Defenses to be Presented at Trial Set for Feb. 27, 2012; Jan. 16, 2012; Case 1:09-cv-02675-KBF (Document 227).

Lawsuit by *Island Intellectual Property LLC, et al.* v. *Deutsche Bank Trust Company Americas et al.*; Declaration of Olivia M. Kim in Support of Defendants' Motion for Summary Judgment of Invalidity Under 35 U.S.C. § 101; Oct. 6, 2011; Case 1:09-cv-02675-VM, Document 197.

Lawsuit by *Island Intellectual Property LLC, et al.* v. *Deutsche Bank Trust Company Americas, et al.* Plaintiffs' Memorandum of Law in Opposition to Defendants' Motion for Summary Judgment of Invalidity Under 35 U.S.C. § 101; Nov. 2, 2011; Case 1:09-cv-02675-VM, Document 201.

Lawsuit by *Island Intellectual Property LLC, et al.* v. *Deutsche Bank Trust Company Americas, et al.*; Defendants Reply in Support of Their Motion for Summary Judgment of Invalidity Under 35 U.S.C. § 101; Nov. 15, 2011; Case 1:09-cv-02675-VM, Document 208.

Lawsuit by *Island Intellectual Property LLC, et al.* v. *Deutsche Bank Trust Company Americas, et al.*; Defendants' Response to Plaintiffs' Statement of Additional Material Facts in Support of Plaintiffs' Opposition to Defendants' Motion for Summary Judgment of Invalidity Under 35 U.S.C. § 101; Nov. 15, 2011; Case 1:09-cv-02675-VM, Document 209.

Lawsuit by *Island Intellectual Property LLC, et al.* v. *Deutsche Bank Trust Company Americas, et al.*; Order; Dec. 7, 2011; Case 1:09-cv-02675-VM, Document 212.

Lawsuit by *Island Intellectual Property LLC, et al.* v. *Deutsche Bank Trust Company Americas, et al.*; Special Master's Report and Recommended Decision on Defendants' Summary Judgment Motion of Invalidity Under 35 U.S.C. § 101; Dec. 19, 2011.

Lawsuit by *Island Intellectual Property LLC, et al.* v. *Deutsche Bank Trust Company Americas, et al.*; Supplemental Declaration of Olivia M. Kim in Support of Defendants' Opening and Reply Claim Construction Briefs; Nov. 15, 2011; Case 1:09-cv-02675-VM, Document 207.

Martens, Don W.; letter to Hon. Victor Marrero re. supplement to letter of Nov. 28, 2011 on tentative rulings on claim construction in *Island Intellectual Property LLC et al.* v. *Deutsche Bank Trust Co., et al.*; Nov. 28, 2011; Case 1:09-cv-02675-VM; Document 211.

Martens, Don W.; letter to Hon. Victor Marrero re. tentative rulings on claim construction in *Island Intellectual Property LLC et al.* v. *Deutsche Bank Trust Co., et al.*; Nov. 28, 2011; Case 1:09-cv-02675-VM, Document 210.

Scottrade Bank Deposit Program—Terms, Conditions & Disclosures; Author unknown; Aug. 2011; pp. 1-3.

Hencke, Christopher; New Rules for FDIC Deposit Insurance; ABA Bank Compliance, Jul./Aug. 1999, 20,7; pp. 31-37.

Campbell, Andrew, et al.; A new standard for deposit insurance and government guarantees after the crisis; Journal of Financial Regulation and Compliance, vol. 17 No. 3, 2009; pp. 210-239.

Cynamon et al.; Redefining the Monetary Aggregates: A Clean Sweep; Eastern Economic Journal, vol. 32, No. 4, Fall 2006; pp. 661-672.

12 CFR Part 330; Simplification of Deposit Insurance Rules; Federal Register, vol. 63 Issue 90; May 11, 1998; pp. 1-31.

The Merrill Lynch Cash Management Account—Financial Service; Jan. 1985; 18 pages.

"The US Banking System: origin, development and regulation", History Now, Jun. 2010.

Webster's New Twentieth Century Dictionary, Unabridged, Second Edition, 1983, p. 1336.

\* cited by examiner

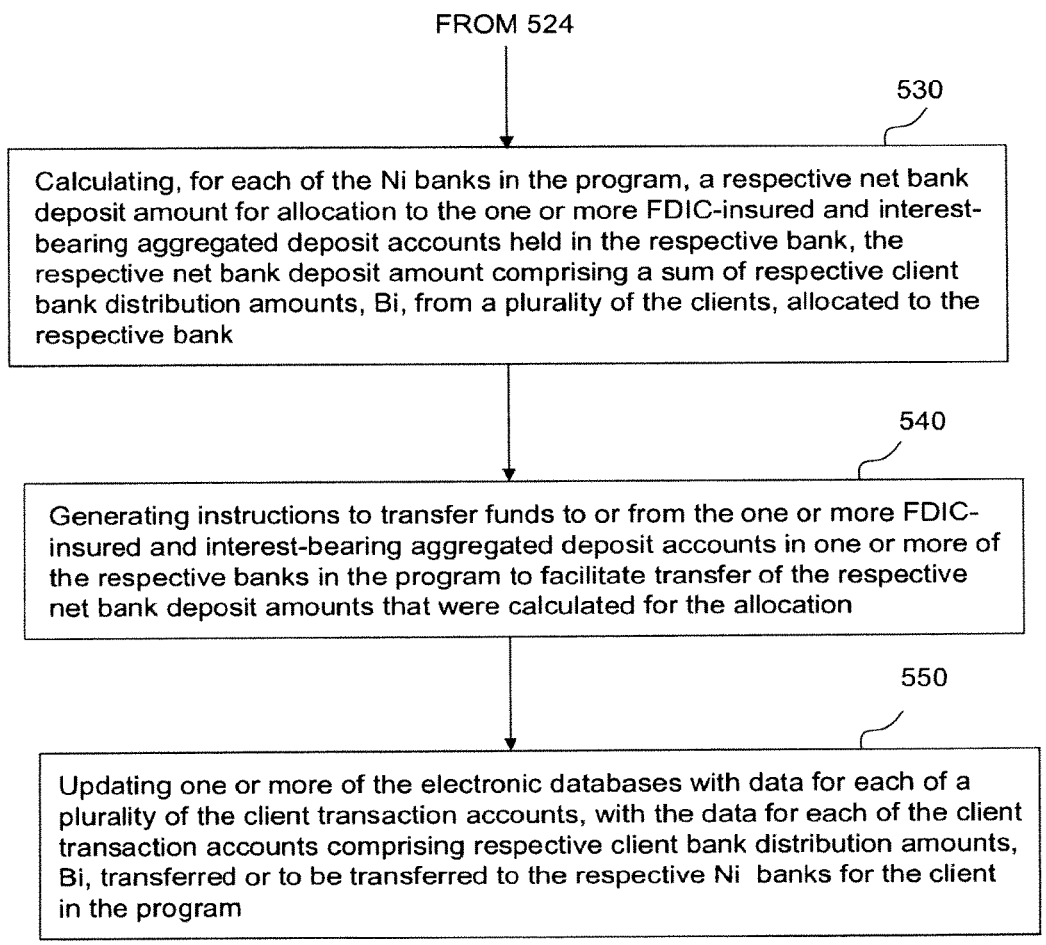

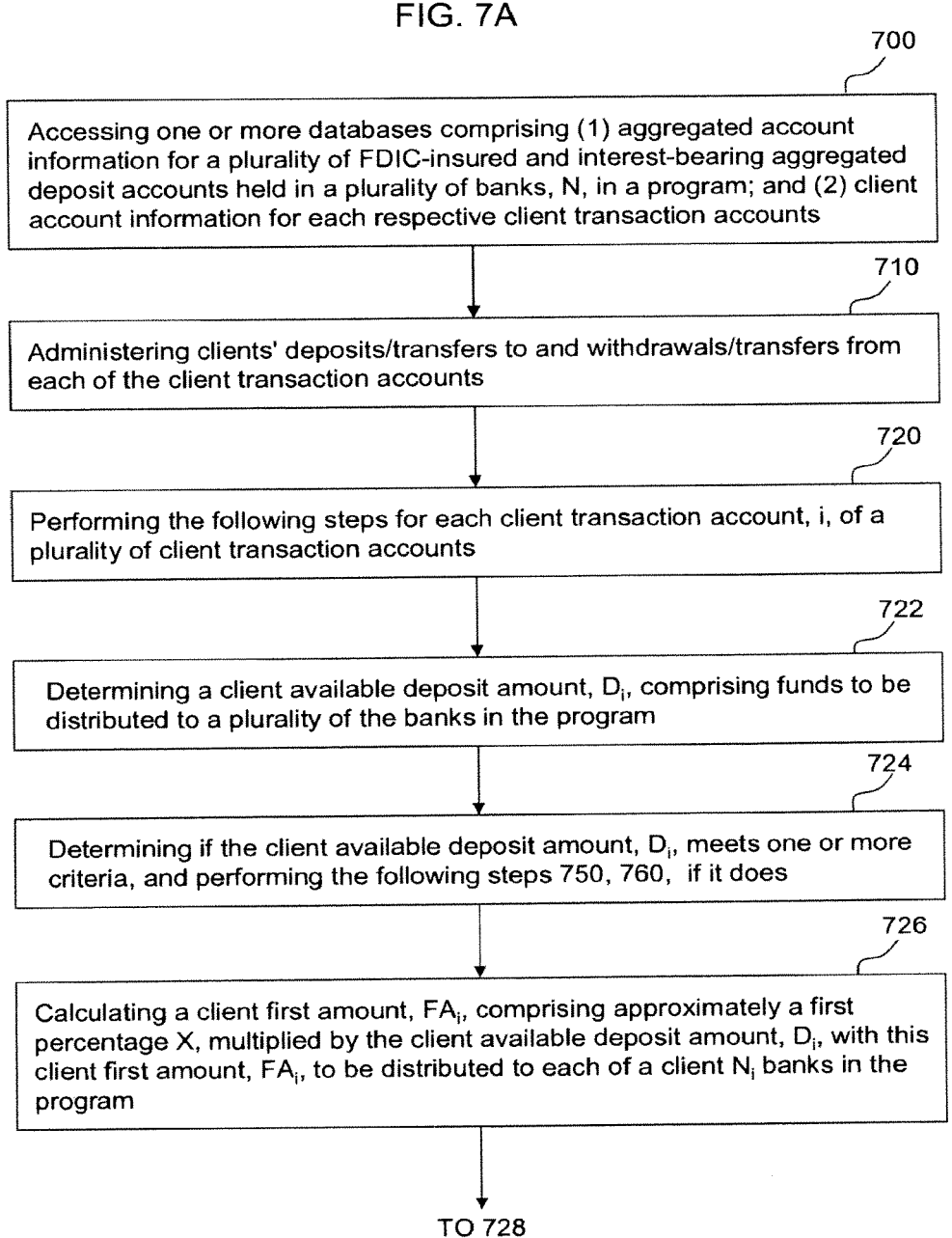

METHOD AND SYSTEM FOR ALLOCATING DEPOSITS OVER A PLURALITY OF DEPOSITORY INSTITUTIONS

CROSS-REFERENCE TO RELATED PATENT APPLICATIONS

This application is a Continuation of U.S. application Ser. No. 13/841,778, filed on Mar. 15, 2013, which is a Continuation of U.S. application Ser. No. 12/638,544, filed Dec. 15, 2009, which claims priority from Provisional Application U.S. Application 61/181,109, filed May 26, 2009, and from Provisional Application U.S. Application 61/246,840, filed Sep. 29, 2009. All of the aforesaid applications are incorporated herein by reference in their entirety as if fully set forth herein.

FIELD OF THE INVENTION

The field of the invention relates generally to administration of client transaction accounts, and administration of interest-bearing aggregated deposit accounts at program banks.

SUMMARY OF THE INVENTION

In accordance with one embodiment, a computer system for managing a plurality of client transaction accounts associated with a plurality of respective clients for a plurality of transactions, said system comprising: A. one or more electronic databases, stored on one or more computer-readable media, comprising: (1) aggregated account information for a plurality of Federal Deposit Insurance Corporation (FDIC)-insured and interest-bearing aggregated deposit accounts held in a plurality of banks, N, in a program, wherein funds from client transaction accounts of a plurality of clients are aggregated with funds of other client transaction accounts in the aggregated deposit accounts held in the banks in the program; and (2) client transaction account information for each of the respective client transaction accounts comprising: (a) a respective balance in the respective client transaction account; (b) transaction data for the respective client transaction account; and (c) a respective balance of funds from the respective client transaction account held in each of one or more of the insured and interest-bearing aggregated deposit accounts holding funds of the respective client transaction account; and B. one or more computers comprising memory wherein the memory stores computer-readable instructions comprising program code that, when executed, cause the one or more computers to perform the steps: (1) administering clients' deposits/transfers to and withdrawals/transfers from client transaction accounts, said administering comprising processing transaction data comprising transaction data for one or more deposits/transfers for one or more client transaction accounts and/or transaction data for one or more withdrawals/transfers from one or more of said client transaction accounts, with the transaction data comprising a respective amount for each respective deposit/transfer and each respective withdrawal/transfer; (2) performing the following steps for each client transaction account, i, of a plurality of client transaction accounts: (a) determining a client available deposit amount, $D_i$, from the respective client's transaction account, i, comprising funds to be distributed over $N_i$ respective banks in the program for the client; (b) determining, for a client available deposit amount $D_i$, that is less than an FDIC-insured limit multiplied by $N_i$ banks, a value of $N_i$ banks for the respective client transaction account, wherein $N_i$ is a whole number and (X) times ($N_i$) is equal to or less than 100, where X is a distribution percent value to be distributed to each of the $N_i$ banks; (c) allocating, the percentage, X, multiplied by the respective client available deposit amount, $D_i$, comprising a respective client bank distribution amount, $BN_i$, to each of the respective $N_i$ banks determined for the respective client, up to a predetermined amount in each of the respective client $N_i$ banks; (3) calculating, for each bank of a plurality of the banks in the program, a respective net bank deposit amount for allocation to one or more of the FDIC-insured and interest-bearing aggregated deposit accounts held in the respective bank, the respective net bank deposit amount comprising a sum of respective client bank distribution amounts, $BN_i$, from a plurality of the client transaction accounts, allocated to the respective bank; (4) generating instructions to transfer funds to or from one or more of the FDIC-insured and interest-bearing aggregated deposit accounts in one or more of the respective banks in the program to facilitate transfer of the respective net bank deposit amounts that were calculated for the allocation; and (5) updating one or more of the electronic databases with update data for each of a plurality of the client transaction accounts, with the update data for each of the client transaction accounts comprising respective client bank distribution amounts, $BN_i$, transferred or to be transferred to the respective client $N_i$ banks for the client in the program.

In a further embodiment, the memory stores computer-readable instructions comprising program code that configures the one or more computers to perform, for each of a plurality of the client transaction accounts steps, for when (X) times ($N_i$) is less than 100 so that there is a remainder amount, $R_i$: comprising: (d) allocating at least a portion, $PR_i$, of the remainder amount, $R_i$, multiplied by the respective client available deposit amount, $D_i$, where $R_i=(D_i)-D_i(N_i \cdot X)/100$, to one or more of the banks, $M_i$, up to a predetermined amount in each of the respective one or more client $M_i$ banks; and wherein the calculating step (3) comprises calculating, for each bank of a plurality of the banks in the program, a respective net bank deposit amount for allocation to one or more of the FDIC-insured and interest-bearing aggregated deposit accounts held in the respective bank, the respective net bank deposit amount comprising a sum of respective client bank distribution amounts, $BN_i$, and/or portions, $PR_i$, of remainder amounts, $R_i$, from a plurality of the client transaction accounts, allocated to the respective bank; and wherein the updating step (5) comprises updating one or more of the electronic databases with update data for each of a plurality of the client transaction accounts, with the update data for each of the client transaction accounts comprising portions, $PR_i$, of remainder amounts, transferred or to be transferred to the respective client $M_i$ banks for the client in the program.

In a further embodiment, the memory for one or more of the computers stores computer-readable instructions that, when executed, cause the one or more computers to perform the step: processing all withdrawals/transfers from and/or deposits/transfers to the respective client transaction account, i, against the funds in the one or more of the respective client remainder banks, $M_i$, for the client, until one or more criteria are met.

In a further embodiment, the one or more criteria comprise that the client available deposit amount, $D_i$, is greater than a minimum amount and less than a maximum amount.

In a further embodiment, the one or more of the electronic databases includes client preference and/or exclusion information comprising a client's one or more preferences and/or one or more exclusions of one or more banks to hold its funds; and wherein the memory for one or more of the computers storing computer-readable instructions that, when executed, cause the one or more computers to perform the step: determining the banks in the program for allocation of the client available deposit amount, $D_i$, based at least in part on the client preference and/or exclusion information.

In a further embodiment, the one or more databases comprise: information for each respective one of a plurality of the client transaction accounts about a respective relationship bank or other respective relationship financial entity that originated or maintains the respective client transaction account, and that can hold funds, and a respective amount or method of determining the respective amount, to be retained in the respective relationship bank or respective relationship financial entity for the respective client transaction account; and wherein the operation of determining a client available deposit amount, $D_i$, from the respective client's transaction account, i, comprises the one or more computers configured for: obtaining the respective amount to be retained; and subtracting the respective amount to be retained from the balance in the client transaction account.

In a further embodiment, the operation is disclosed of receiving the $D_i$ from a non-bank agent.

In a further embodiment, the operation is disclosed of receiving the $D_i$ for one or the respective clients via a direct or indirect communication from the respective client.

In a further embodiment, the operation is disclosed of receiving the $D_i$ from a relationship bank holding a client transaction account for the respective client. In one embodiment, the relationship bank is one of the $N_i$ banks.

In a further embodiment, the program code for generating instructions to transfer funds to or from one or more of the FDIC-insured and interest-bearing aggregated deposit accounts in one or more of the respective banks in the program is configured to cause, for each of a plurality of the banks in the program, a respective balance of funds in the respective bank held in the one or more FDIC-insured and interest-bearing aggregated deposit accounts therein to approximately equal the respective net bank deposit amount calculated for the respective bank.

In another embodiment, a method is disclosed for managing a plurality of client transaction accounts associated with a plurality of respective clients for a plurality of transactions, the method comprising: A. accessing, by one or more computers, one or more electronic databases, stored on one or more computer-readable media, comprising: (1) aggregated account information for a plurality of Federal Deposit Insurance Corporation (FDIC)-insured and interest-bearing aggregated deposit accounts held in a plurality of banks, N, in a program, wherein funds from client transaction accounts of a plurality of clients are aggregated with funds of other client transaction accounts in the aggregated deposit accounts held in the banks in the program; and (2) client transaction account information for each of the respective client transaction accounts comprising: (a) a respective balance in the respective client transaction account; (b) transaction data for the respective client transaction account; and (c) a respective balance of funds from the respective client transaction account held in each of one or more of the insured and interest-bearing aggregated deposit accounts holding funds of the client transaction account; and B. administering, by the one or more computers, clients' deposits/transfers to and withdrawals/transfers from client transaction accounts, said administering comprising processing transaction data comprising transaction data for one or more deposits/transfers for one or more client transaction accounts and/or transaction data for one or more withdrawals/transfers from a plurality of said client transaction accounts, with the transaction data comprising a respective amount for each respective deposit/transfer and each respective withdrawal/transfer; C. performing the following operations for each client transaction account, i, of a plurality of client transaction accounts: (1) determining a client available deposit amount, $D_i$, from the respective client's transaction account i, comprising funds to be distributed over $N_i$ respective banks in the program for the respective client; (2) determining, for a client available deposit amount $D_i$, that is less than an FDIC-insured limit multiplied by $N_i$ banks, a value of $N_i$ banks for the respective client transaction account, wherein $N_i$ is a whole number and (X) times ($N_i$) is equal to or less than 100, where X is a distribution percent value to be distributed to each of the $N_i$ banks; (3) allocating, by the one or more computers, a respective client bank distribution amount, $BN_i$, comprising approximately the percentage, X, multiplied by the respective client available deposit amount, to each of the respective $N_i$ banks determined for the client, up to a predetermined amount in each of the respective client $N_i$ banks; D. calculating, by the one or more computers, for each bank of a plurality of the banks in the program, a respective net bank deposit amount for allocation to one or more of the FDIC-insured and interest-bearing aggregated deposit accounts held in the respective bank, the respective net bank deposit amount comprising a sum of respective client bank distribution amounts, $BN_i$, from a plurality of the clients, allocated to the respective bank; E. generating instructions to transfer funds to or from one or more of the FDIC-insured and interest-bearing aggregated deposit accounts in one or more of the respective banks in the program to facilitate transfer of the respective net bank deposit amounts that were calculated for the allocation; and F. updating, by the one or more computers, one or more of the electronic databases with update data for each of a plurality of the client transaction accounts, with the update data for each of the client transaction accounts comprising respective client bank distribution amounts, $BN_i$, transferred or to be transferred to the respective client $N_i$ banks for the client in the program.

In a further embodiment, the operation is disclosed of maintaining the respective client available amounts, $D_i$, in the one or more FDIC-insured and interest-bearing aggregated deposit accounts held in the plurality of banks, $N_i$, determined for the respective client available amounts, $D_i$.

In a further embodiment, the operations are disclosed of performing for each of a plurality of the client transaction accounts when $N_i$ is a whole number and (X) times ($N_i$) is less than 100, so that there is a remainder amount, $R_i$, the steps: (d) allocating at least a portion, $PR_i$, of a remainder amount, $R_i$, multiplied by the respective client available deposit amount, $D_i$, where $R_i=(D_i)-D_i(N_i\cdot X)/100$, to one or more of the banks, $M_i$, up to a predetermined amount in each of the respective one or more client $M_i$ banks; and wherein the calculating step (3) comprises calculating, for each bank of a plurality of the banks in the program, a respective net bank deposit amount for allocation to one or more of the FDIC-insured and interest-bearing aggregated deposit accounts held in the respective bank, the respective net bank deposit amount comprising a sum of respective client bank distribution amounts, $BN_i$, and/or portions, $PR_i$, of remainder amounts, $R_i$, from a plurality of the client transaction accounts, allocated to the respective bank; and wherein the updating step (5) comprises updating one or more of the electronic databases with update data for each of a plurality of the client transaction accounts, with the update data for each of the client transaction accounts comprising portions, $PR_i$, of remainder amounts, transferred or to be transferred to the respective client $M_i$ banks for the client in the program.

In a yet further embodiment, a program product is disclosed for managing a plurality of client transaction accounts associated with a plurality of respective clients for a plurality of transactions, comprising: at least one computer-readable media having computer-readable program code embodied therein or among them if more than one, to be executed by a computer, for causing one or more computers to perform the method: A accessing one or more electronic databases, stored on one or more computer-readable media, comprising: (1) aggregated account information for a plurality of Federal Deposit Insurance Corporation (FDIC)-insured and interest-bearing aggregated deposit accounts held in a plurality of banks, N, in a program, wherein funds from client transaction accounts of a plurality of clients are aggregated with funds of other client transaction accounts in the aggregated deposit accounts held in the banks in the program; and (2) client transaction account information for each of the respective client transaction accounts comprising: (a) a respective balance in the respective client transaction account; (b) transaction data for the respective client transaction account; and (c) a respective balance of funds from the respective client transaction account held in each of one or more of the insured and interest-bearing aggregated deposit accounts holding funds of the client transaction account; and B. administering, by the one or more computers, clients' deposits/transfers to and withdrawals/transfers from client transaction accounts, said administering comprising processing transaction data comprising transaction data for one or more deposits/transfers for one or more client transaction accounts and/or transaction data for one or more withdrawals/transfers from a plurality of said client transaction accounts, with the transaction data comprising a respective amount for each respective deposit/transfer and each respective withdrawal/transfer; C. performing the following operations for each client transaction account, i, of a plurality of client transaction accounts: (1) determining a client available deposit amount, $D_i$, from the respective client's transaction account i, comprising funds to be distributed over $N_i$ respective banks in the program for the respective client; (2) determining, for a client available deposit amount $D_i$, that is less than an FDIC-insured limit multiplied by $N_i$ banks, a value of $N_i$ banks for the respective client transaction account, wherein $N_i$ is a whole number and (X) times ($N_i$) is equal to or less than 100, where X is a distribution percent value to be distributed to each of the $N_i$ banks; (3) allocating, by the one or more computers, a respective client bank distribution amount, $BN_i$, comprising approximately the percentage, X, multiplied by the respective client available deposit amount, to each of the respective $N_i$ banks determined for the client, up to a predetermined amount in each of the respective client $N_i$ banks; D. calculating, by the one or more computers, for each bank of a plurality of the banks in the program, a respective net bank deposit amount for allocation to one or more of the FDIC-insured and interest-bearing aggregated deposit accounts held in the respective bank, the respective net bank deposit amount comprising a sum of respective client bank distribution amounts, $BN_i$, from a plurality of the clients, allocated to the respective bank; E. generating instructions to transfer funds to or from one or more of the FDIC-insured and interest-bearing aggregated deposit accounts in one or more of the respective banks in the program to facilitate transfer of the respective net bank deposit amounts that were calculated for the allocation; and F. updating, by the one or more computers, one or more of the electronic databases with update data for each of a plurality of the client transaction accounts, with the update data for each of the client transaction accounts comprising respective client bank distribution amounts, $BN_i$, transferred or to be transferred to the respective client $N_i$ banks for the client in the program.

In yet a further embodiment, a computer system is disclosed for distributing respective client funds associated with a plurality of respective clients, said system comprising: A. one or more electronic databases, stored on one or more computer-readable media, comprising: (1) aggregated account information for a plurality of Federal Deposit Insurance Corporation (FDIC)-insured and interest-bearing aggregated deposit accounts held in a plurality of banks, N, in a program, wherein funds of a plurality of clients are aggregated with funds of other clients in the aggregated deposit accounts held in the banks in the program; and (2) client information for each of the respective clients comprising: (a) a respective total balance to be distributed for the respective client; (b) a respective balance of funds of the respective client held in each of one or more of the insured and interest-bearing aggregated deposit accounts holding funds of the respective client; and B. one or more computers comprising memory wherein the memory stores computer-readable instructions comprising program code that, when executed, cause the one or more computers to perform the steps: (1) performing the following steps for each client, i, of a plurality of clients: (a) determining a client available deposit amount, $D_i$, for the respective client i, comprising funds to be distributed over $N_i$ respective banks in the program for the respective client; (b) determining, for a client available deposit amount $D_i$, that is less than an FDIC-insured limit multiplied by $N_i$ banks, a value of $N_i$ banks for the respective client, wherein $N_i$ is a whole number and (X) times ($N_i$) is equal to or less than 100, where X is a distribution percent value to be distributed to each of the $N_i$ banks; (c) allocating, a respective client bank distribution amount, $BN_i$, comprising approximately the percentage, X, multiplied by the respective client available deposit amount, to each of the respective $N_i$ banks determined for the client, up to a predetermined amount in each of the respective client $N_i$ banks; (2) calculating, for each bank of a plurality of the banks in the program, a respective net bank deposit amount for allocation to one or more of the FDIC-insured and interest-bearing aggregated deposit accounts held in the respective bank, the respective net bank deposit amount comprising a sum of respective client bank distribution amounts, $BN_i$, from a plurality of the clients, allocated to the respective bank; (3) generating instructions to transfer funds to or from one or more of the FDIC-insured and interest-bearing aggregated deposit accounts in one or more of the respective banks in the program to facilitate transfer of the respective net bank deposit amounts that were calculated for the allocation; and (4) updating one or more of the electronic databases with update data for each of a plurality of the clients, i, with the update data for each of the clients, i, comprising respective client bank distribution amounts, $BN_i$, transferred or to be transferred to the respective client $N_i$ banks for the client in the program.

In a further embodiment, the memory stores computer-readable instructions comprising program code that configures the one or more computers to perform for each of a plurality of the clients the steps when (X) times ($N_1$) is less than 100 so that there is a remainder amount, $R_i$: comprising:

(d) allocating at least a portion, $PR_i$, of a remainder amount, $R_i$, multiplied by the respective client available deposit amount, $D_i$, where $R_i=(D_i)-D_i(N_i\cdot X)/100$, to one or more of the banks, $M_i$, up to a predetermined amount in each of the respective one or more client $M_i$ banks; and wherein the calculating step (3) comprises calculating, for each bank of a plurality of the banks in the program, a respective net bank deposit amount for allocation to one or more of the FDIC-insured and interest-bearing aggregated deposit accounts held in the respective bank, the respective net bank deposit amount comprising a sum of respective client bank distribution amounts, $BN_i$, and/or portions, $PR_i$, of remainder amounts, $R_i$, from a plurality of the clients, allocated to the respective bank; and wherein the updating step (5) comprises updating one or more of the electronic databases with update data for each of a plurality of the clients, with the update data for each of the clients comprising portions, $PR_i$, of remainder amounts, transferred or to be transferred to the respective client $M_i$ banks for the client in the program.

In a yet further embodiment, a method is disclosed for distributing respective client funds associated with a plurality of respective clients, comprising: A. accessing, by one or more computers, one or more electronic databases, stored on one or more computer-readable media, comprising: (1) aggregated account information for a plurality of Federal Deposit Insurance Corporation (FDIC)-insured and interest-bearing aggregated deposit accounts held in a plurality of banks, N, in a program, wherein funds of a plurality of clients are aggregated with funds of other clients in the aggregated deposit accounts held in the banks in the program; and (2) client information for each of the respective clients comprising: (a) a respective total balance to be distributed for the respective client; (b) a respective balance of funds of the respective client held in each of one or more of the insured and interest-bearing aggregated deposit accounts holding funds of the respective client; and B. performing the following steps for each client, i, of a plurality of clients: (1) determining a client available deposit amount, $D_i$, for the respective client i, comprising funds to be distributed over $N_i$ respective banks in the program for the respective client; (2) determining, for a client available deposit amount $D_i$, that is less than an FDIC-insured limit multiplied by $N_i$ banks, a value of $N_i$ banks for the respective client, wherein $N_i$ is a whole number and (X) times ($N_i$) is equal to or less than 100, where X is a distribution percent value to be distributed to each of the $N_i$ banks; (3) allocating, by the one or more computers, a respective client bank distribution amount, $BN_i$, comprising approximately the percentage, X, multiplied by the respective client available deposit amount, to each of the respective $N_i$ banks determined for the client, up to a predetermined amount in each of the respective client $N_i$ banks; (2) calculating, by the one or more computers, for each bank of a plurality of the banks in the program, a respective net bank deposit amount for allocation to one or more of the FDIC-insured and interest-bearing aggregated deposit accounts held in the respective bank, the respective net bank deposit amount comprising a sum of respective client bank distribution amounts, $BN_i$, from a plurality of the clients, allocated to the respective bank; (3) generating instructions to transfer funds to or from one or more of the FDIC-insured and interest-bearing aggregated deposit accounts in one or more of the respective banks in the program to facilitate transfer of the respective net bank deposit amounts that were calculated for the allocation; and (4) updating, by the one or more computers, one or more of the electronic databases with update data for each of a plurality of the clients, i, with the update data for each of the clients, i, comprising respective client bank distribution amounts, $BN_i$, transferred or to be transferred to the respective client $N_i$ banks for the client in the program.

In a yet further embodiment, the operation is performed of maintaining the respective client available amounts, $D_i$, in the one or more FDIC-insured and interest-bearing aggregated deposit accounts held in the plurality of banks, $N_i$. determined for the respective client available amounts, $D_i$.

In yet a further embodiment, the operation is performed for each of a plurality of the clients when $N_i$ is a whole number and (X) times ($N_i$) is less than 100, so that there is a remainder amount, $R_i$, comprising the steps: (d) allocating at least a portion, $PR_i$, of a remainder amount, $R_i$, multiplied by the respective client available deposit amount, $D_i$, where $R_i=(D_i)-D_i(N_i\cdot X)/100$, to one or more of the banks, $M_i$, up to a predetermined amount in each of the respective one or more client $M_i$ banks; and wherein the calculating step (3) comprises calculating, for each bank of a plurality of the banks in the program, a respective net bank deposit amount for allocation to one or more of the FDIC-insured and interest-bearing aggregated deposit accounts held in the respective bank, the respective net bank deposit amount comprising a sum of respective client bank distribution amounts, $BN_i$, and/or portions, $PR_i$, of remainder amounts, $R_i$, from a plurality of the clients, allocated to the respective bank; and wherein the updating step (5) comprises updating one or more of the electronic databases with update data for each of a plurality of the clients, with the update data for each of the clients comprising portions, $PR_i$, of remainder amounts, transferred or to be transferred to the respective client $M_i$ banks for the client in the program.

In a yet further embodiment, a program product for distributing respective client funds associated with a plurality of respective clients, comprising: at least one computer-readable media having computer-readable program code embodied therein or among them if more than one, to be executed by a computer, for causing one or more computers to perform the method: A. accessing, by one or more computers, one or more electronic databases, stored on one or more computer-readable media, comprising: (1) aggregated account information for a plurality of Federal Deposit Insurance Corporation (FDIC)-insured and interest-bearing aggregated deposit accounts held in a plurality of banks, N, in a program, wherein funds of a plurality of clients are aggregated with funds of other clients in the aggregated deposit accounts held in the banks in the program; and (2) client information for each of the respective clients comprising: (a) a respective total balance to be distributed for the respective client; (b) a respective balance of funds of the respective client held in each of one or more of the insured and interest-bearing aggregated deposit accounts holding funds of the respective client; and B. performing the following steps for each client, i, of a plurality of clients: (1) determining a client available deposit amount, $D_i$, for the respective client i, comprising funds to be distributed over $N_i$ respective banks in the program for the respective client; (2) determining, for a client available deposit amount $D_i$, that is less than an FDIC-insured limit multiplied by $N_i$ banks, a value of $N_i$ banks for the respective client, wherein $N_i$ is a whole number and (X) times ($N_i$) is equal to or less than 100, where X is a distribution percent value to be distributed to each of the $N_i$ banks; (3) allocating, by the one or more computers, a respective client bank distribution amount, $BN_i$, comprising approximately the percentage, X, multiplied by the respective client available deposit amount, to each of the respective $N_i$ banks determined for the client, up to a predetermined amount in each of the respective client $N_i$ banks; (2) calculating, by the one or more computers, for each bank of a plurality of the banks in the program, a respective net bank deposit amount for allocation to one or more of the FDIC-insured and interest-bearing aggregated deposit accounts held in the respective bank, the respective net bank deposit amount comprising a sum of respective client bank distribution amounts, $BN_i$, from a plurality of the clients, allocated to the respective bank; (3) generating instructions to transfer funds to or from one or more of the FDIC-insured and interest-bearing aggregated deposit accounts in one or more of the respective banks in the program to facilitate transfer of the respective net bank deposit amounts that were calculated for the allocation; and (4) updating, by the one or more computers, one or more of the electronic databases with update data for each of a plurality of the clients, i, with the update data for each of the clients, i, comprising respective client bank distribution amounts, $BN_i$, transferred or to be transferred to the respective client $N_i$ banks for the client in the program.

In another embodiment of the invention, a computer system, method, and program product is disclosed for managing a plurality of client transaction accounts associated with a plurality of respective clients for a plurality of transactions, the system comprising: one or more electronic databases, stored on one or more computer-readable media, comprising: (1) aggregated account information for a plurality of Federal Deposit Insurance Corporation (FDIC)-insured and interest-bearing aggregated deposit accounts held in a plurality of banks, N, in a program, wherein funds from client transaction accounts of a plurality of clients are aggregated with funds of other client transaction accounts in the aggregated deposit accounts held in the banks in the program; and (2) client transaction account information for each of the respective client transaction accounts comprising: (a) a respective balance in the respective client transaction account; (b) transaction data for the respective client transaction account; and (c) a respective balance of funds from the respective client transaction account held in each of one or more of the insured and interest-bearing aggregated deposit accounts holding funds of the client transaction account; and one or more computers comprising memory wherein the memory stores computer-readable instructions comprising program code that, when executed, cause the one or more computers to perform the steps: (1) administering clients' deposits/transfers to and withdrawals/transfers from client transaction accounts, said administering comprising processing transaction data comprising transaction data for one or more deposits/transfers for one or more client transaction accounts and/or transaction data for one or more withdrawals/transfers from one or more of said client transaction accounts, with the transaction data comprising a respective amount for each respective deposit/transfer and each respective withdrawal/transfer; (2) performing the following steps for each client transaction account, i, of a plurality of client transaction accounts: (a) determining a client available deposit amount, $D_i$, from the respective client's transaction account, i, comprising funds to be distributed over $N_i$ respective banks in the program; (b) allocating, for a client available deposit amount, $D_i$, that is less than an FDIC-insured limit multiplied by $N_i$ banks, an amount comprising a bank distribution amount, $B_i$, for the client, approximating $D_i/N_i$, to each of the $N_i$ banks in the program, up to a predetermined amount in each of the respective $N_i$ banks; (3) calculating, for each of the $N_i$ banks in the program, a respective net bank deposit amount for allocation to one or more of the FDIC-insured and interest-bearing aggregated deposit accounts held in the respective bank, the respective net bank deposit amount comprising a sum of respective client bank distribution amounts, $B_i$, from a plurality of the clients, allocated to the respective bank; (4) generating instructions to transfer funds to or from one or more of the FDIC-insured and interest-bearing aggregated deposit accounts in one or more of the respective banks in the program to facilitate transfer of the respective net bank deposit amounts that were calculated for the allocation; and (5) updating one or more of the electronic databases with update data for each of a plurality of the client transaction accounts, with the update data for each of the client transaction accounts comprising respective client bank distribution amounts, $B_i$, transferred or to be transferred to the respective $N_i$ banks for the client in the program. In one implementation of this embodiment, the operation of administering the client deposits/transfers and withdrawals/transfers to their respective client transaction accounts is not included, and the information related to the client transaction accounts, may, but need not be included in the one or more databases.

In another embodiment of the invention, a computer system, method, and product is disclosed for managing a plurality of client transaction accounts associated with a plurality of respective clients for a plurality of transactions, the system comprising: one or more electronic databases, stored on one or more computer-readable media, comprising: (1) aggregated account information for a plurality of Federal Deposit Insurance Corporation (FDIC)-insured and interest-bearing aggregated deposit accounts held in a plurality of banks, N, in a program, wherein funds from client transaction accounts of a plurality of clients are aggregated with funds of other client transaction accounts in the aggregated deposit accounts held in the banks in the program; and (2) client transaction account information for each of the respective client transaction accounts comprising: (a) a respective balance in the respective client transaction account; (b) transaction data for the respective client transaction account; and (c) a respective balance of funds from the respective client transaction account held in each of one or more of the insured and interest-bearing aggregated deposit accounts holding funds of the client transaction account; and one or more computers comprising memory wherein the memory stores computer-readable instructions comprising program code that, when executed, cause the one or more computers to perform the steps: (1) administering clients' deposits/transfers to and withdrawals/transfers from client transaction accounts, said administering comprising processing transaction data comprising transaction data for one or more deposits/transfers for one or more client transaction accounts and/or transaction data for one or more withdrawals/transfers from a plurality of said client transaction accounts, with the transaction data comprising a respective amount for each respective deposit/transfer and each respective withdrawal/transfer; (2) performing the following steps for each client transaction account, i, of a plurality of client transaction accounts: (a) determining a client available deposit amount, $D_i$, comprising funds to be distributed to a plurality of the banks in the program; (b) determining a respective client first amount, $FA_{Ni}$, from a first percentage X of $D_i$ to be distributed to a respective given bank in a group of respective banks $N_i$ for the client, wherein the client first amount, $FA_i$, cannot exceed a predetermined amount. This respective first amount, $FA_{Ni}$, could vary from respective bank to respective bank in this group of banks $N_i$ based on one or more criteria selected by the client and/or the bank and/or a relationship entity. In one embodiment, this percentage X could be distributed equally across the group of banks $N_i$ for the client. In this case, the client first amount, $FA_{Ni}$, would comprise the first percentage $X/N_i$, multiplied by the client available deposit amount, $D_i$, with this client first amount, $FA_{Ni}$, to be distributed to each of the client $N_i$ banks in the program; c) determining a respective client second amount, $SA_{Mi}$, from a second percentage Y of $D_i$ to be distributed to a respective given bank in a group of respective banks $M_i$ for the client, with the second percentage, Y, not equal to X. This respective second amount, $SA_{Mi}$, could vary from respective bank to respective bank in this group of banks $M_i$ based on one or more criteria selected by the client and/or the bank and/or a relationship entity. In one embodiment, this percentage Y could be distributed equally across the group of banks $M_i$ for the client. In this case, the client second amount, $SA_{Mi}$, would comprise the second percentage $Y/M_i$, multiplied by the client available deposit amount, $D_i$, with this client second amount, $SA_{Mi}$, to be distributed to each of the client $M_i$ banks in the program. In one embodiment, the second percentage Y is equal to 100−X, unless the client second amount, $SA_{Mi}$, would exceed a predetermined amount; (d) calculating a remainder amount, $R_i$, if any, comprising $[D_i]-[(D_i)(X)+(D_i)(Y)]$, across the one or more safety banks; (e) allocating the client first amount, $FA_{Ni}$, to each of the respective client $N_i$ banks in the program, and allocating the client second amount, $SA_{Mi}$, to each of the respective client $M_i$ banks in the program, and allocating the remainder amount, $R_i$, if any, across the one or more safety banks; (3) calculating, for each respective bank of a plurality of the banks in the program, a respective net bank deposit amount for allocation to one or more of the FDIC-insured and interest-bearing aggregated deposit accounts held in the respective bank, the respective net bank deposit amount comprising a sum of respective clients' first amounts, $FA_{Ni}$, allocated to the respective bank and clients' second amounts, $SA_{Mi}$, allocated to the respective bank, and any portion of a remainder amount allocated to the respective one or more safety banks; (4) generating instructions to transfer funds to or from one or more of the FDIC-insured and interest-bearing aggregated deposit accounts in one or more of the respective banks in the program to facilitate transfer of the respective net bank deposit amounts that were calculated for the allocation; and (e) updating one or more of the electronic databases with update data for each of a plurality of the client transaction accounts, with the update data for each of the client transaction accounts comprising client first amounts, $FA_{Ni}$, allocated to each of the respective client $N_i$ banks and client second amounts, $SA_{Mi}$, allocated to each of the respective client $M_i$ banks, and portions of clients' remainder amounts, if any, allocated to the one or more safety banks. In one implementation of this embodiment, the operation of administering the client deposits/transfers and withdrawals/transfers to their respective client transaction accounts is not included, and the information related to the client transaction accounts, may, but need not be included in the one or more databases.

In another embodiment, a computer system, method, and program product is disclosed for managing a plurality of client transaction accounts associated with a plurality of respective clients for a plurality of transactions, said system comprising: one or more electronic databases, stored on one or more computer-readable media, comprising: (1) aggregated account information for a plurality of Federal Deposit Insurance Corporation (FDIC)-insured and interest-bearing aggregated deposit accounts held in a plurality of banks, N, in a program, wherein funds from client transaction accounts of a plurality of clients are aggregated with funds of other client transaction accounts in the aggregated deposit accounts held in the banks in the program; and (2) client transaction account information for each of the respective client transaction accounts comprising: (a) a respective balance in the respective client transaction account; (b) transaction data for the respective client transaction account; and (c) a respective balance of funds from the respective client transaction account held in each of one or more of the insured and interest-bearing aggregated deposit accounts holding funds of the client transaction account; and one or more computers comprising memory wherein the memory stores computer-readable instructions comprising program code that, when executed, cause the one or more computers to perform the steps: (1) administering clients' deposits/transfers to and withdrawals/transfers from client transaction accounts, said administering comprising processing transaction data comprising transaction data for one or more deposits/transfers for one or more client transaction accounts and/or transaction data for one or more withdrawals/transfers from a plurality of said client transaction accounts, with the transaction data comprising a respective amount for each respective deposit/transfer and each respective withdrawal/transfer; (2) performing the following steps for each client transaction account, i, of a plurality of client transaction accounts: (a) determining a client available deposit amount, $D_i$, comprising funds to be distributed to a plurality of the banks in the program; (b) determining if the client transaction account meets one or more criteria, and performing the following steps if it does: (i) calculating a client first amount, $FA_i$, comprising approximately a first percentage X, multiplied by the client available deposit amount, $D_i$, with this client first amount, $FA_i$, to be distributed to each of a client $N_i$ banks in the program, wherein the client first amount, $FA_i$, cannot exceed a predetermined amount; (ii) calculating a client second amount, $SA_i$, comprising approximately a client second percentage, Y, multiplied by the client available deposit amount, $D_i$, with this client second amount, $SA_i$, to be distributed to one or more other banks, $M_i$, in the program, wherein the client second amount, $SA_i$, cannot exceed a predetermined amount, and wherein Y is not equal to X; (iii) allocating the client first amount to each of the client $N_i$ banks in the program, and allocating the client second amount, $SA_i$, to each of the client $M_i$ banks in the program; (3) calculating, for each respective bank of a plurality of the banks in the program, a respective net bank deposit amount for allocation to one or more of the FDIC-insured and interest-bearing aggregated deposit accounts held in the respective bank, the respective net bank deposit amount comprising a sum of respective clients' first amounts, $FA_i$, allocated to the respective bank and clients' second amounts, $SA_i$, allocated to the respective bank; (4) generating instructions to transfer funds to or from one or more of the FDIC-insured and interest-bearing aggregated deposit accounts in one or more of the respective banks in the program to facilitate transfer of the respective net bank deposit amounts that were calculated for the allocation; and (5) updating one or more of the electronic databases with update data for each of a plurality of the client transaction accounts, with the update data for each of the client transaction accounts comprising client first amounts, $FA_i$, allocated to each of the client $N_i$ banks and client second amounts, $SA_i$, allocated to each of the client $M_i$ banks. In one implementation of this embodiment, the operation of administering the client deposits/transfers and withdrawals/transfers to their respective client transaction accounts is not included, and the information related to the client transaction accounts, may, but need not be included in the one or more databases.

In another embodiment of the invention, a computer system, method, and program product is disclosed for managing a plurality of client transaction accounts associated with a plurality of respective clients for a plurality of transactions, the system comprising: one or more electronic databases, stored on one or more computer-readable media, comprising: (1) aggregated account information for a plurality of Federal Deposit Insurance Corporation (FDIC)-insured and interest-bearing aggregated deposit accounts held in a plurality of banks, N, in a program, wherein funds from client transaction accounts of a plurality of clients are aggregated with funds of other client transaction accounts in the aggregated deposit accounts held in the banks in the program; and (2) client transaction account information for each of the respective client transaction accounts comprising: (a) a respective balance in the respective client transaction account; (b) transaction data for the respective client transaction account; and (c) a respective balance of funds from the respective client transaction account held in each of one or more of the insured and interest-bearing aggregated deposit accounts holding funds of the client transaction account; and one or more computers comprising memory wherein the memory stores computer-readable instructions comprising program code that, when executed, cause the one or more computers to perform the steps: (1) administering clients' deposits/transfers to and withdrawals/transfers from client transaction accounts, said administering comprising processing transaction data comprising transaction data for one or more deposits/transfers for one or more client transaction accounts and/or transaction data for one or more withdrawals/transfers from a plurality of said client transaction accounts, with the transaction data comprising a respective amount for each respective deposit/transfer and each respective withdrawal/transfer; (2) performing the following steps for each client transaction account, i, of a plurality of client transaction accounts: (a) determining a client available deposit amount, $D_i$, comprising funds to be distributed to one or more of the banks in the program; (b) determining a bank number tier, $T_i$, for the client available deposit amount, $D_i$, from among a plurality of tiers based on one or more criteria, wherein each tier has a number of banks electronically associated therewith or a function for computing electronically the number of banks associated therewith, in the one or more databases; (c) allocating the client available deposit amount across a number of banks, $N_T$, equal to the number associated electronically with the tier, $T_i$, or determined from the function in that tier, $T_i$, so that a respective client portion, $P_i$, of the client available deposit amount, $D_i$, is allocated to each respective bank in the number of banks, $N_T$, in the client's tier, $T_i$; (3) calculating, for each bank of a plurality of the banks in the program, a respective net bank deposit amount for allocation to one or more of the FDIC-insured and interest-bearing aggregated deposit accounts held in the respective bank, the respective net bank deposit amount comprising a sum of respective clients' portions, $P_i$, allocated to the respective bank; (4) generating instructions to transfer funds to or from one or more of the FDIC-insured and interest-bearing aggregated deposit accounts in one or more of the respective banks in the program to facilitate transfer of the respective net bank deposit amounts that were calculated for the allocation; and (5) updating one or more of the electronic databases with update data for each of a plurality of the client transaction accounts, with the update data for each of the client transaction accounts updated comprising client portions, $P_i$, allocated to each respective bank in the number of bank, $N_T$, for the client. In one implementation of this embodiment, the operation of administering the client deposits/transfers and withdrawals/transfers to their respective client transaction accounts is not included, and the information related to the client transaction accounts, may, but need not be included in the one or more databases.

In a further embodiment, the client portions, $P_i$, allocated to the banks in the client's tier, $N_i$, for the client transaction account, are approximately equal, but do not exceed a predetermined amount, except for one or more safety banks.

In a further embodiment, the one or more criteria comprise that the client available deposit amount, $D_i$, is greater than a minimum amount and less than a maximum amount.

In a further embodiment, the at least one criterion comprises the client available deposit amount, $D_i$, is greater than a predetermined amount.

These and other advantages and features of various embodiments of the present invention, together with the organization and manner of operation thereof, will become apparent from the following detailed description when taken in conjunction with the accompanying drawings, wherein like elements have like numerals throughout the several drawings described below. However, the accompanying drawings of the preferred embodiments of the invention are for explanation and understanding only and should not be taken to be limitative to the invention.

BRIEF DESCRIPTION OF THE DRAWINGS

FIGS. 5A and 5B are a schematic block diagram of one embodiment.

FIGS. 7A and 7B are a schematic block diagram of a further embodiment.

DETAILED DESCRIPTION OF PREFERRED EMBODIMENTS

Figure 1:
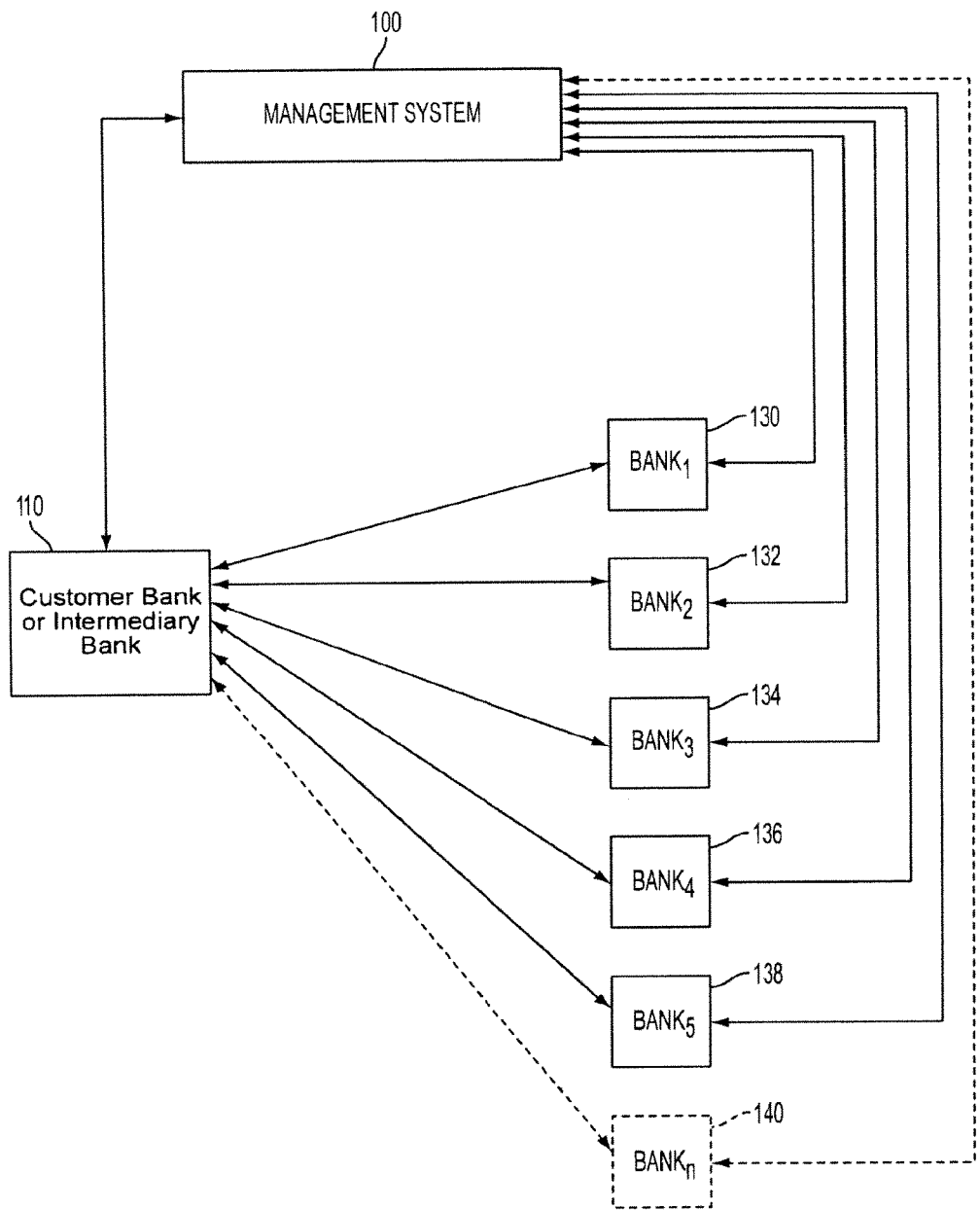
FIG. 1 is schematic block diagram of one embodiment.

FIG. 1 discloses an embodiment of the invention, comprising a financial entity, and/or a management system 100 acting as agent for the financial entity, that manages in each of a plurality of program banks, 130-140, one or more aggregated interest-bearing deposit accounts. In one embodiment, these one or more aggregated interest-bearing deposit accounts are aggregated Federal Deposit Insurance Corporation (FDIC)-insured, interest-bearing deposit accounts. Other embodiments for these deposit accounts are discussed below.

The financial entity or management system 100 receives various client transaction account files. Such client transaction files may comprise the deposit and withdrawal activity information for direct retail clients. Additionally, such client transaction files may comprise client transaction "sweep" files comprised of client deposits and withdrawals, which may comprise transactions initiated via ACH, wire, credit card, debit card, check, and/or other methods of money movement. The system 100 aggregates these deposit transactions and withdrawal transactions received over a sub-period of time, e.g., one or more hours or a day, for example, of a period, e.g., a month, or one or more specific times of day, for example. If the aggregated deposits of all or a select group of client transaction accounts for that financial entity exceed the aggregated client withdrawals (a net client credit) during this period of time, then all or some of the funds may be deposited in the aggregated deposit accounts in the one or more program banks. Conversely, if client withdrawals for all or a select group of client transaction accounts of that financial entity or program exceed client deposits (a net client debit) during this period of time, then one or more of the program banks may be instructed electronically, or by messenger, or other convenient or appropriate method, as described below, to withdraw funds from the one or more aggregated deposit accounts, for subsequent satisfaction of the net withdrawal. The management system 100 generates instructions to initiate transfers of these funds to or from the different program banks 130-140. The transfers may be based on various electronically implemented rules.

Note that the system 100 may receive the client transaction files from a variety of different sources. For example, client transaction files may be received from non-bank agents, lock-box companies or other third-party intermediaries. Alternatively, client transaction files may be received from a given relationship bank or other relationship financial entity that can hold funds. A relationship bank of other financial entity comprises a bank or other financial entity that holds the client transaction account in the name of and for the benefit of the respective client. For example, the client may have opened a client transaction account with the bank or other financial entity, and may make deposits at a branch office of the bank or other financial entity. The relationship bank or other financial entity may designate that a prescribed amount from, or a prescribed percentage of, a respective balance from each of one or more of the client transaction accounts, be held in the relationship bank or other financial entity, and not transferred to the program banks 130-140. Note that all references to "percentage" herein mean a fraction with 100 as the denominator. Alternatively, the relationship bank or other financial entity may designate a prescribed algorithm to apply to the balance in the client transaction account, or may designate a set of computer based rules to be applied to the client transaction account based on one or more criteria, to determine the client available deposit amount, $D_i$ to be retained.

Thus, the amount to be retained from the client transaction account or the percentage of the client transaction account balance may be set by one or more computer-implemented rules based on one or more criteria, such as the balance in the client transaction account compared to one or more thresholds. Alternatively, the amount or percentage to be retained may be fixed across a plurality of the client transaction accounts. The amount to be retained by the relationship bank or other relationship financial entity can be as much or as little as desired. The amount to be retained may be, but need not be set in relation to an FDIC insurance limit. The amount to be retained may be substantially more than the FDIC insurance limit, or it may be an amount needed to satisfy day-to-day transactions based on historical transaction data for the respective client transaction account, or based on a generic average generated from historical transaction data from a plurality of client transaction accounts.

After the amount to be retained is obtained or calculated, the system 100 may determine the client available deposit amount, $D_i$, from a respective client's transaction account, i, to be distributed over $N_i$ respective program banks, by first subtracting out this amount that is to be retained by the relationship bank or other relationship financial entity and not transferred to the program banks. Alternatively, this amount or percentage may be subtracted out from the client transaction files before they are sent to the system 100 for processing.

The amount or percentage to be retained by the relationship bank or other relationship financial entity may be held in one or more designated accounts at the relationship bank or other relationship financial entity. These one or more accounts may include one or more aggregated accounts to be discussed below.

Figure 9:
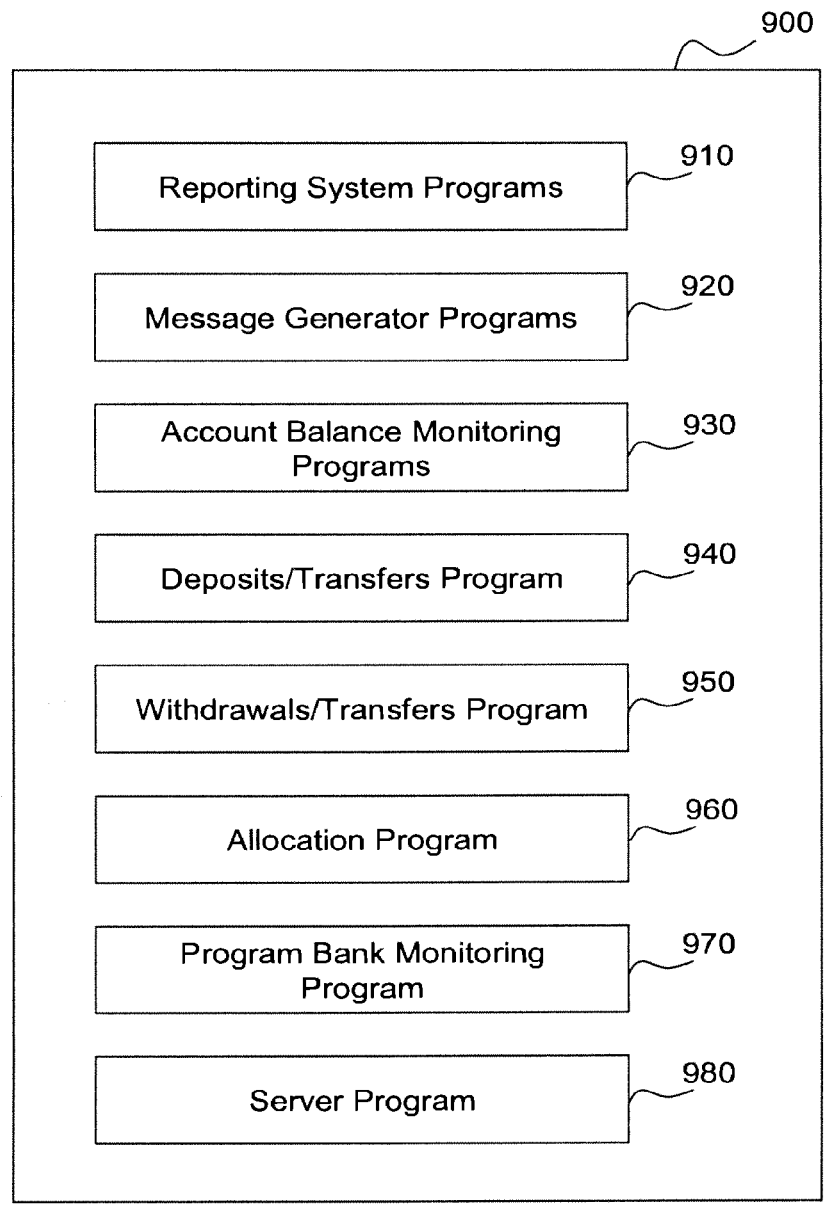
FIG. 9 is schematic block diagram of an embodiment of a memory configuration that may be used to implement the present invention.
Figure 10:
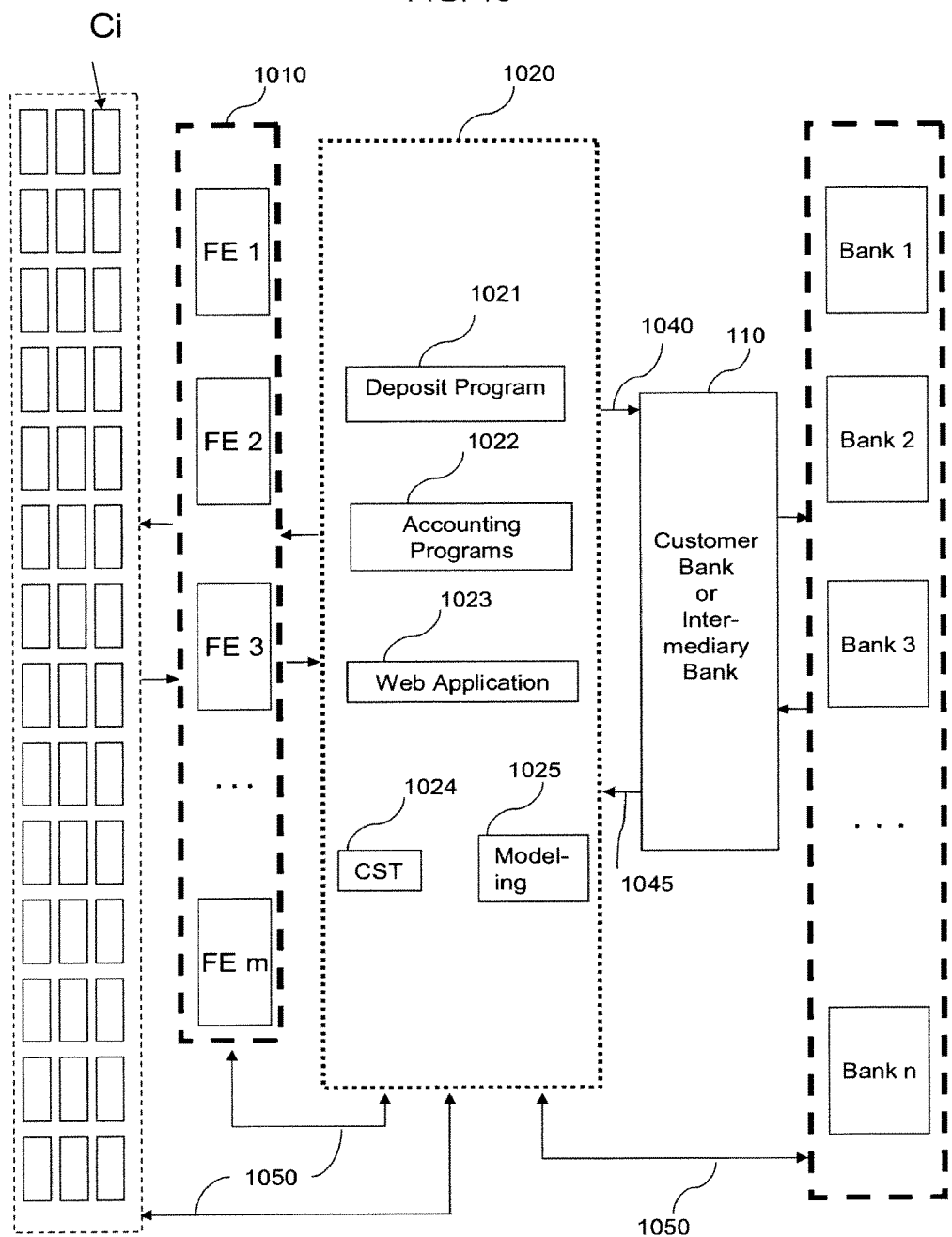
FIG. 10 is schematic block diagram of one embodiment.

FIG. 10 illustrates one embodiment of a system consistent with the present invention. The individual clients are represented in the figure by the small blocks Ci. The respective clients, Ci, may comprise individual investors and/or institutional investors. One or more banks, and/or broker dealers, and/or other financial entities, FE 1, FE 2, FE 3, and FE m, represented in block 1010, maintain a relationship with these clients and maintain client transaction accounts, i, for these clients. The management system 100 and its one or more computers are represented in FIG. 10 by block 1020. The management system computers 1020 are configured with a deposit computer program, and an accounting computer program that maintains information on the client transaction accounts and the program banks, and the movement of funds, in one or more databases. In one embodiment, this accounting program provides individual investor accounting functions, sweep functions, sweep processing and billing. The management system 1020 further comprises one or more web application programs. The management system 1020 further comprises, in one embodiment, one or more computer programs for processing and generating combined statements, including monthly, year end and tax statements, broker dealer or other financial entity administrative functions, bank reconciliation processing, and client inquiry processing. The management system 1020 further comprises, in one embodiment, a modeling program, for predicting a program bank capacity for receiving funds based on one or more criteria. Other computer programs run by the management system are referenced in FIG. 9, to be discussed below.

FIG. 10 further represents the one customer bank or intermediary bank 1110 that holds one or more control operating accounts. Also shown are a plurality of program banks 1, 2, 3 . . . n. In one embodiment, deposits to and withdrawals from the client transaction accounts i maintained by the relationship banks or relationship broker dealers or other relationship financial entities 1010, are netted and transferred into or withdrawn from the one or more control operating accounts maintained in the customer or intermediary bank 1110. There may be an operation included of subtracting out an amount to be retained in or processed for one or more accounts held in the respective relationship banks or other relationship financial entities. The computers of the system 1020 then allocate funds to one or more of the program banks and send instructions to have the funds transferred to or withdrawn from the one or more program banks. The arrowed lines 1040 and 1045 represent the movement of funds to and from the various entities shown in the figure. The arrowed lines 1050 represent a transmission of information on the movement of the funds, including the amount transferred, the timing of the movement, and the interest rate.

Referring again to FIG. 1. in one embodiment, the net transfer to or from one or more of the program banks may be from one or more control operating accounts 110 held in the financial entity having the client relationship, e.g., a financial entity that is a bank. In another embodiment, the one or more control operating accounts for the transfer could be held in a bank controlled by or associated in some manner with the administrator of the system. In another embodiment, the one or more control operating accounts may be held in or on behalf of a deposit interchange entity that operates to distribute deposits across multiple banks.

In one embodiment, one of the program banks could be the same bank that maintains a relationship with the clients. Alternatively, one or more of the program banks may be affiliated with the bank or other financial entity maintaining the relationship with the clients. Alternatively, none of the program banks may be affiliated with a bank or other financial entity maintaining the relationship with the clients. Alternatively, one or more of the program banks may be an affiliated bank and one or more of the program banks may be non-affiliated, with respect to the bank or other financial entity maintaining the relationship with the clients. Alternatively, none of the program banks may be affiliated with a bank or other financial entity maintaining the relationship with the clients.

In one embodiment the aggregated deposit accounts in which the managed balances for clients are deposited are simply interest-bearing, aggregated accounts. In another embodiment, the aggregated deposit accounts in which the managed balances for clients are deposited are interest-bearing, FDIC-insured aggregated accounts, such as MMDAs. Alternatively, the aggregated deposit accounts may be aggregated DDAs, such as a NOW account, that permits an unlimited number of deposits and withdrawals. Alternatively, the aggregated deposit accounts may be other types of investment vehicles, such as by way of example, a money market fund. In an embodiment, an MMDA is paired with an aggregated DDA, both accounts being in the identical name of the financial entity, or its agent. This paired set of accounts is referred to herein as an "MMDA-DDA pair." The DDA's serve to facilitate the exchange of funds between the MMDAs, the financial entities, and sources of client transactions.

The transfer of funds into one or more of the aggregated accounts may be accomplished in a variety of different manners, using a variety of different transfer algorithms or methods. For example, the administrator, or a relationship entity that maintains a relationship with the individual client may set up rules for automatic transfer, or the transfers may be ad hoc, or based on a specific amount to specified payor or other variable. In one embodiment, if the financial entity or the management system 100 determines that it is necessary to withdraw and/or transfer funds from a particular MMDA at a particular program bank, it may first generate an instruction for the withdrawal and cause that instruction to be sent by messenger, mail, telephone (via check mailed to the depositor), automated teller machine, or in person, to the program bank. See Regulation D. Other methods may also be used where the transfer is by wire or ACH, to name a few. However, the use of such methods would be subject to the restrictions imposed by Regulation D. In one implementation of this embodiment, funds could be transferred from the MMDA to the DDA member of the MMDA-DDA pair, and then, the funds in the DDA could be moved to the financial entity's or its agent's own account or accounts, by, for example, a sweep operation. Alternatively, in some embodiments the instructions for withdrawal may be sent by wire. In some embodiments the funds may be moved to a control operating account at an intermediary bank, prior to moving the funds to the financial entity's own account. The control operating account 110 may be registered in the name of the agent for the exclusive benefits of its deposit customers. The control operating account in one embodiment, may, but need not be, be zeroed, e.g., all of the funds therein transferred out at one or more specific times of day, or periodically, such as every hour, every few hours, every day, of every few days, or may be zeroed after the amount held therein reaches or exceeds a threshold amount. Funds from this account may be further transferred to a third party, such as a transaction source or a customer financial entity (preferably by electronic or other automatic means). A database is updated to reflect these funds transfers. Alternatively, if funds are to be deposited and/or transferred into a particular MMDA, the agent either may have the funds deposited into the associated DDA and then moved into the MMDA for the program, or may have the funds deposited directly into the MMDA.

In some embodiments, an MMDA-DDA pair may be used, where a balance of funds are maintained in the DDA part of the pair so as to minimize the number of withdrawals that may be necessary from the MMDA during a reporting cycle.

In some embodiments, in order to avoid a withdrawal limit imposed by regulation on interest-bearing deposit accounts, a program rule may be implemented to monitor the number of withdrawals from the interest-bearing deposit account, and when it reaches a predetermined withdrawal limit, e.g., one less than the regulation withdrawal limit for a period, such as 5 withdrawals, then a final withdrawal of all or a large portion of the funds may be made, and the funds transferred to a different account at a different bank, that has not reached this predetermined withdrawal limit. Alternatively, the funds could be transferred for the remainder of the reporting cycle to a DDA or other account in the same banking institution which does not have a limit on the number of withdrawals available.

While in a preferred embodiment, a separate account or set of accounts, e.g., money market deposit account (MMDA) and demand deposit account (DDA), may be set up by the administrator computers for each program with each different financial entity (e.g., broker dealer) in each of the program banks, under certain embodiments of the present invention, funds from different programs of the same financial entity or different financial entities can be commingled and aggregated. Thus, in one embodiment, each broker dealer (an example of a financial entity) can establish a separate program with the administrator computers to allocate funds from its respective client accounts into separate aggregated accounts designated for that broker dealer in a plurality of program banks. In another embodiment, the funds from client transaction accounts of a plurality of broker dealers can be aggregated into the same set of aggregated accounts in the plurality of program banks. Thus, the administrator computer does not have to set up a separate money market deposit account (MMDA) and associated demand deposit account (DDA) for each program with each financial entity at the program bank, e.g., the same MMDA and/or DDA can be used across several programs if registered, in the name of and offered by the same financial entity. Accordingly, a single MMDA or other type of account can be set up at each program bank, or multiple MMDA aggregated accounts can be set up at each program bank. Additionally, embodiments of the system may be set up without DDA accounts. Alternatively, where the customer may be limited to certain types of entities, the DDA could be a NOW account, or the NOW account could be used in place of one or more of the MMDAs. In either instance, the NOW account would be an aggregated account holding funds of a plurality of clients.

In some embodiments, a management system 100 may maintain account information for each of the financial entities and others in a database within its own system, or have such a database maintained for its use by a third party. The management system 100 may report balances and other data with respect to the client transaction accounts and amounts distributed to the aggregated deposit accounts periodically to the program banks, and/or originating bank that maintains the client relationship, or broker dealers or other financial entities, or the clients themselves.

In one embodiment, a process is disclosed that incorporates sweep purchases and redemptions, in addition to retail transactions or other transfers, into the respective client transaction accounts of the financial entity. A bank allocation process then operates electronically to assign fund amounts to the program banks based on various rules, such as fitting within maximum bank caps, and/or minimum bank caps.

In one or more embodiments to be discussed below, an allocation operation is described for a given client available deposit amount, $D_i$, that is to be deposited to one or more aggregated, interest-bearing deposit accounts in the program banks. This client available deposit amount, $D_i$, may be determined based on a variety of different algorithms. For example, as noted above, the relationship bank or other financial entity may designate that a prescribed amount from, or a prescribed percentage of, a respective balance from each of one or more of the client transaction accounts, be held in the relationship bank or other financial entity, and not transferred out, or transferred to another investment category, such as a mutual fund accounts, an ETF account, an automatic stock purchase account, to name a few. The system 100 may determine a client available deposit amount, $D_i$, from a respective client's transaction account, i, to be distributed over $N_i$ respective program banks, by first subtracting out this amount or percentage of the balance of the client transaction account that is to be retained by the relationship bank or other relationship financial entity and not transferred to the program banks. Alternatively, this amount or percentage may be subtracted out from the client transaction files before they are sent to the system 100 for processing.

The amount to be retained from the client transaction account or the percentage of the client transaction account balance may be set be set by one or more computer-implemented rules based on one or more criteria, such as the balance in the client transaction account relative to a threshold. Alternatively, the amount or percentage to be retained may be fixed across a plurality of the client transaction accounts. The amount to be retained by the relationship bank or other relationship financial entity can be as much or as little as desired. The amount to be retained may be, but need not be set in relation to an FDIC insurance limit. The amount to be retained may be substantially more than the FDIC insurance limit, or it may be an amount needed to satisfy day-to-day transactions based on historical transaction data for the respective client transaction account, or a generic average generated from historical transaction data from a plurality of client transaction accounts. Alternately, or in addition, the client available deposit amount, $D_i$, may be determined and transferred ad hoc, by the client, the administrator, or the relationship entity. By way of example, a graphical user interface (GUI) may be made available to the respective client to initiate the transfer of the client available deposit amount, $D_i$. The GUI may be presented to the client or accessed via a Web link or an email, or via an online portal in an Internet banking application, or other electronic methods.

The inventions relates to a plurality of embodiments for distributing portions below an FDIC insurance limit of the client available deposit amounts, $D_i$, based on one or more parameters selected by the respective client, the administrator, or automatically, based on one or more criteria. Examples of the parameters are the number of banks to deposit portions therein, and/or a percentage of the client available deposit amount, $D_i$, to be deposited in either a set number of banks, or a number of banks selected based on one or more parameters.

In one embodiment, a selection option for the one or more parameters is provided to the client, if one or more criteria are met. The one or more criteria may comprise, an amount in a given client account, a composite amount held in a plurality of different accounts associated with the client, a number of the years the client has maintained a given relationship, to name a few. In one embodiment, a selection option for the one or more parameters may be provided to the client, if the one or more criteria are met. For example, a selection option may be presented to the client electronically, for example, through an online portal in an Internet banking client application, or via an email communication, which, in one embodiment, may include a Web link. The Web link, if clicked, opens an interface that allows the client to select a number of banks for the deposit of the portions, or a percentage of the client available deposit amounts, $D_i$, to be deposited in each of a plurality of the program banks, or both. In one embodiment, the program banks may include a relationship bank that holds the relationship and a transaction account with the client. In one embodiment, the distribution of the portions of the client available deposit amounts, $D_i$, is into aggregated accounts held in the program banks. In another embodiment, the distribution is to individual accounts in the respective program banks.

After the client available deposit amount, $D_i$, has been determined, then in one embodiment, an allocation may be made of some amount, for example, a given percentage X, or a set amount, to each of $N_i$ program banks, where $N_i$ is a subset of the N program banks, with the subset determined based on the available deposit amount, $D_i$, and the allocation percentage. Then an allocation may be made of a remainder amount, across each of $M_i$ banks (a subset of the program banks N), with the number of remainder banks determined for the given client transaction account, in one embodiment, based on the remainder amount for the given client transaction account. A recalculation and reallocating of these amounts may be made on a periodic basis, to take into account client transaction account deposits and withdrawals. A further embodiment distributes a client available deposit amount, $D_i$, based on tiers, selected based on one or more criteria, such as a balance in the client transaction account relative to a threshold, or an overall relationship with the client, the client's family or friends, a broker-dealer or bank relationship, to name a few.

In one or more embodiments, the invention may be implemented in conjunction with managing a plurality of client transaction accounts, and depositing and/or withdrawing from one or more accounts in the program banks in order to satisfy the deposit and/or withdrawal activity in the respective client transaction account. The accounts in the program may or may not be aggregated accounts.

In another embodiment, the system only receives or obtains or calculates the client available deposit amounts, $D_i$, and then functions to make deposits and withdrawals to and/or from the program banks based on the parameters (e.g., number of banks, and/or percentages) determined or selected for this respective client. As noted, the client available deposit amounts, $D_i$, can be determined automatically, or can be determined Ad Hoc, by the respective client, the administrator, or relationship entity.

Figure 3A:
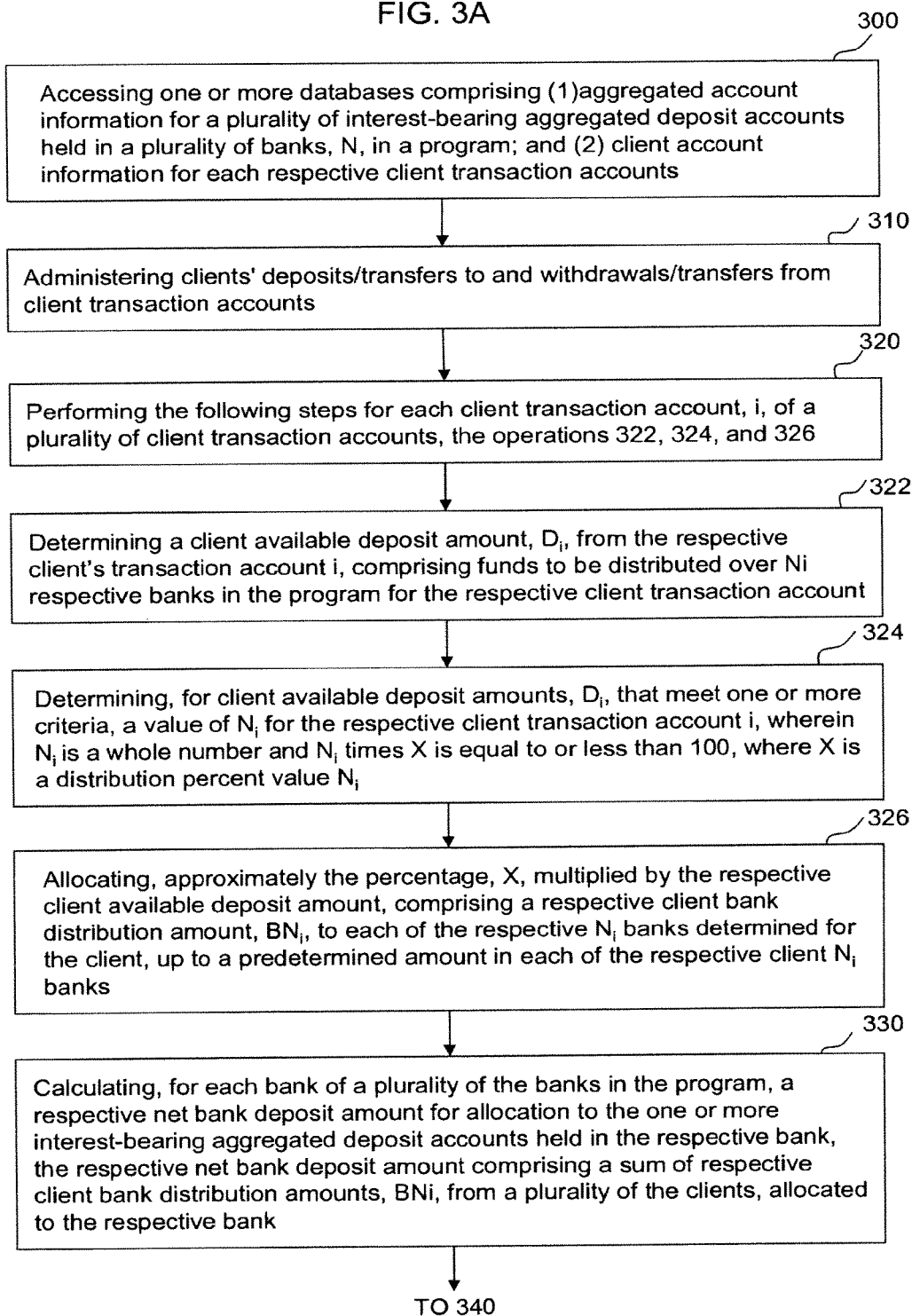
FIGS. 3A and 3B are a schematic block diagram of a further embodiment.
Figure 3B:
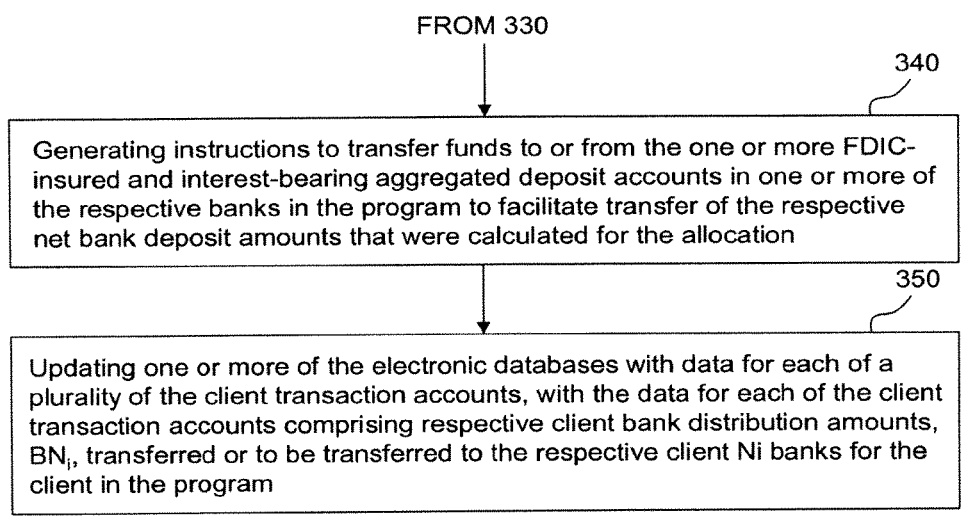

FIGS. 3A and 3B disclose an embodiment, referred to as Option 1, comprising a computer-implemented method, computer configuration and program product, for managing a plurality of client transaction accounts associated with a plurality of respective clients in the context of a plurality of transactions to allocate a given percentage of client assets across group of banks in a given program, with the number of banks, $N_i$, for the distribution varying based on the percentage X, e.g., for 20%, the number of banks would be 100/20=5. Such an allocation is illustrated in Table I below, as Option 1. The funds to be allocated may be received via one or more interfaces with clients and financial entities. For example, an electronic interface may be set up to receive funds from clients, and/or broker dealers or other financial entities, and/or banks, and/or Internet banks, to name a few. Note that in one embodiment, designated amounts allocated to the banks $N_i$ may vary based on one or more criteria set by the client and/or the bank and/or the relationship entity.

TABLE I

| Bank | Option 1, Scenario 1 | Option 1, Scenario 2 | Option 1, Scenario 3 |
|---|---|---|---|
| Account Balance | 100,000 | 100,000 | 1,600,000 |
| 1 | $20,000 | $18,000 | $180,000 |
| 2 | $20,000 | $18,000 | $180,000 |
| 3 | $20,000 | $18,000 | $180,000 |
| 4 | $20,000 | $18,000 | $180,000 |
| 5 | $20,000 | $18,000 | $180,000 |
| 6 | 0 | $10,000 | $100,000 |
| 7 | 0 | 0 | |
| 8 | 0 | 0 | 0 |
| 9 | 0 | 0 | 0 |
| 10 | 0 | 0 | 0 |
| Total | $100,000 | $100,000 | $1,000,000 |

In this embodiment, one or more computers may be configured, for example with computer program code loaded in main memory, or via hard-wiring, to implement the allocation. The one or more computers may be configured to provide that the amount allocated will not exceed a predetermined value based on an account type insurance limit, and/or will not exceed a limit for the bank determined, for example, by collateral held by the bank or other safety measure or criteria, with the exception of amounts allocated to safety banks or holdback banks. The amount allocated may be substantially the same across all of the banks in the program, or may be varied, in some embodiments, based on computer-implemented rules applied for the allocation. Note that different computer-implemented rules may be applied depending on whether the client is a regular individual, a high net worth individual, a corporation, a partnership, or other entity type, or a transaction account balance, or other variables depending upon the program.

In more detail, FIGS. 3A and 3B disclose a computer-implemented operation 300 of accessing, by one or more computers, one or more electronic databases, stored on one or more computer-readable media. In this embodiment, the one or more electronic databases comprise: (1) aggregated account information for a plurality of Federal Deposit Insurance Corporation (FDIC)-insured and interest-bearing aggregated deposit accounts held in a plurality of banks, N, in a program, wherein funds from client transaction accounts of a plurality of clients are aggregated with funds of other client transaction accounts in the aggregated deposit accounts held in the banks in the program; and (2) client transaction account information for each of the respective client transaction accounts comprising: (a) a respective balance in the respective client transaction account; (b) transaction data for the respective client transaction account; and (c) a respective balance of funds from the respective client transaction account held in each of one or more of the plurality of the insured and interest-bearing aggregated deposit accounts holding funds of the respective client transaction account. These one or more databases may, in some embodiments, further comprise financial information such as, the total funds being managed for that client (namely, the sum of balances in a plurality or all of the client's accounts and/or balances in the accounts of the client's family or friends.). The client records also preferably store information representing basic client identifications, such as name, address, social security number, information representing a financial entity association, such as a client account number at the financial entity, client characteristics at the financial entity important to management, and the like, and additional client related information. Additionally, the client records in the one or more databases may also store information on the relationship bank or relationship broker dealer or other relationship financial entity.

Block 310 represents the computer-implemented operation of administering, by the one of more computers, clients' deposits/transfers to and withdrawals/transfers from each of the client transaction accounts, i. In one embodiment, the administering comprises processing transaction data for one or more deposits/transfers for one or more client transaction accounts and/or transaction data for one or more withdrawals/transfers from one or more of the client transaction accounts, with the transaction data comprising a respective amount for each respective deposit/transfer and each respective withdrawal/transfer. For example, there may be 1000's of client transaction accounts, and a given client transaction account, i, may be account 59 in these 1000's of accounts. Note that deposits/transfers means deposits and/or transfers to the client transaction accounts, and withdrawals/transfers means withdrawals and/or transfers from the client transaction accounts.

Block 320 in FIG. 3 represents the computer-implemented step of performing, by the one or more computers, the following operations, 322, 324, and 326, for each of a plurality of client transaction accounts i. Note that the phrase "each of a plurality" means that it could be two or more client transaction accounts:

(a) As shown in block 322, determining, by the one or more computers, a client available deposit amount, $D_i$, from the respective client's transaction account i, comprising funds to be distributed over $N_i$ respective banks in the program for the respective client transaction account, i. This amount, $D_i$, may be all of the funds in the respective client transaction account, or only some of the funds in the respective client transaction account. In one embodiment, the amount, $D_i$, may be determined by one or more rules, such as maintaining a balance in the respective client transaction account based on recent or historic activity in the client transaction account. A further criterion that may be applied in some embodiments where this method is to be applied, is that the a client available deposit amount, $D_i$, for distribution must be less than an FDIC-insured limit multiplied by $N_i$ banks for the respective client transaction account.

(b) As shown in block 324, determining, by the one or more computers, a value of $N_i$, for the respective client transaction account, for a client available deposit amount, $D_i$, that is less than a program amount, e.g., less than an FDIC-insured limit multiplied by $N_i$ banks, wherein the number $N_i$ represents the number of banks for the respective client transaction account, wherein $N_i$ is a whole number and (X) times ($N_i$) is equal to or less than 100, where X is a distribution percent value to be distributed to each of the $N_i$ banks. Alternatively, the number of banks $N_i$ is a whole number which is equal to or greater than 100/X, where X is a distribution percent value to be distributed to each of the $N_i$ banks for the respective client transaction account i. Note that this operation may be subject to one or more criteria, such as that the respective client available deposit amount, $D_i$, equals or exceeds a threshold value, and/or that a logic element is set, based on a particular relationship between the financial entity and the client, to name a few. Table I below illustrates an example of this determination. As noted, in one embodiment, designated amounts allocated to the banks $N_i$ may vary based on one or more criteria set by the client and/or the bank and/or the relationship entity rather than being approximately equal.

(c) As shown in block 326, allocating, by the one or more computers, a respective client bank distribution amount, $BN_i$, comprising the distribution percent value, X, of the respective client available deposit amount, $D_i$, to each of the respective $N_i$ banks determined for the client, up to a predetermined amount in each of the respective client $N_i$ banks.

As noted above, Table I discloses an example allocation for this embodiment where X equals 20% of $D_i$ to be deposited in each of $N_i$ program banks, where $N_i$ is determined to be 100/20=5 banks in the program. Note that the predetermined amount may be the FDIC insurance limit, or some lesser amount, for example.

In one embodiment, these computer-implemented operations of 320 may cycle through a plurality of the client transaction accounts, performing the operations of 322, 324 and 326, for each of these client transaction accounts.

Block 330 comprises the computer-implemented operation of calculating, by the one or more computers, for each bank, $N_j$, of a plurality of the banks N, 130-140, in the program, a respective net bank deposit amount for allocation to one or more of the FDIC-insured and interest-bearing aggregated deposit accounts held in the respective bank. The respective net bank deposit amount comprises a sum of respective client bank distribution amounts, $BN_i$, from a plurality of the client transaction accounts, allocated to the respective bank, as determined in operation 322, 324, and 326.

Block 340 comprises the computer-implemented operation of generating instructions, by the one or more computers, to transfer funds to or from one or more of the FDIC-insured and interest-bearing aggregated deposit accounts in one or more of the respective banks in the program to facilitate transfer of the respective net bank deposit amounts that were calculated for the allocation. In one embodiment, this transfer may comprise simply transferring the net amount received for a given period of time or netted based on some other parameter. In another embodiments, the instruction may reallocate all of the already deposited funds in various program banks to cause, for each of a plurality of the banks in the program, a respective balance of funds in the respective program bank held in the one or more FDIC-insured and interest-bearing aggregated deposit accounts to equal the respective net bank deposit amount calculated for the respective program bank. The instructions generated may instruct for a transfer in accordance with one or more of the methods disclosed herein.

Block 350 comprises the computer-implemented operation of updating, by the one or more computers, one or more of the electronic databases 260 with update data for each of a plurality of the client transaction accounts, with the update data for each of the client transaction accounts comprising respective client bank distribution amounts, $BN_i$, transferred or to be transferred to the respective client $N_i$ banks for the client in the program.

This process may be particularly useful to spread the risk of bank failure over multiple banks for clients whose funds with the financial entity are less than a total available insurance limit for the program.

Note that one technical feature that may be applied to all of the embodiments of the invention, the one or more databases may comprise: information for each respective one of a plurality of the client transaction accounts about a respective relationship bank or other respective relationship financial entity that originated or maintains the respective client transaction account, and that can hold funds, and a respective amount or method of determining the respective amount, to be retained in the respective relationship bank or respective relationship financial entity for the respective client transaction account; and the operation of determining a client available deposit amount, $D_i$, from the respective client's transaction account, i, comprises the one or more computers configured for: obtaining the respective amount to be retained; and subtracting the respective amount to be retained from the balance in the client transaction account.

In a variation to this embodiment, referred to as Scenario 2 of Option 1, a computer-implemented method is disclosed for allocating a percentage, X, across less than all the banks in the program, e.g., 18% across 5 banks in a program with 10 banks, and allocating a remainder percentage, $R_i$, e.g., 10%, in or across one or more remainder banks, e.g., in a $6^{th}$ bank. In this example, the remainder bank (e.g., the $6^{th}$ bank) may be used to settle service transactions, such as debits, deposits, and transfers. This design, illustrated in Table I, as Option 1, Scenario 2, may be used to minimize activity in the first group of banks, e.g., banks 1 through 5 in this example.

A Scenario 3 is also shown in Table I, and represents the situation for an individual with a large account balance, e.g., $1,00,000, in his/her respective client transaction account. In this situation, the percentage, X, e.g., 18% again across 5 banks in a program with 10 banks, and allocating a remainder percentage, $R_i$, e.g., 10%, in or across one or more remainder banks, e.g., in a $6^{th}$ bank.

It is within the letter and spirit of the present invention that the number of banks and percentages to be allocated may be varied.

Figure 4A:
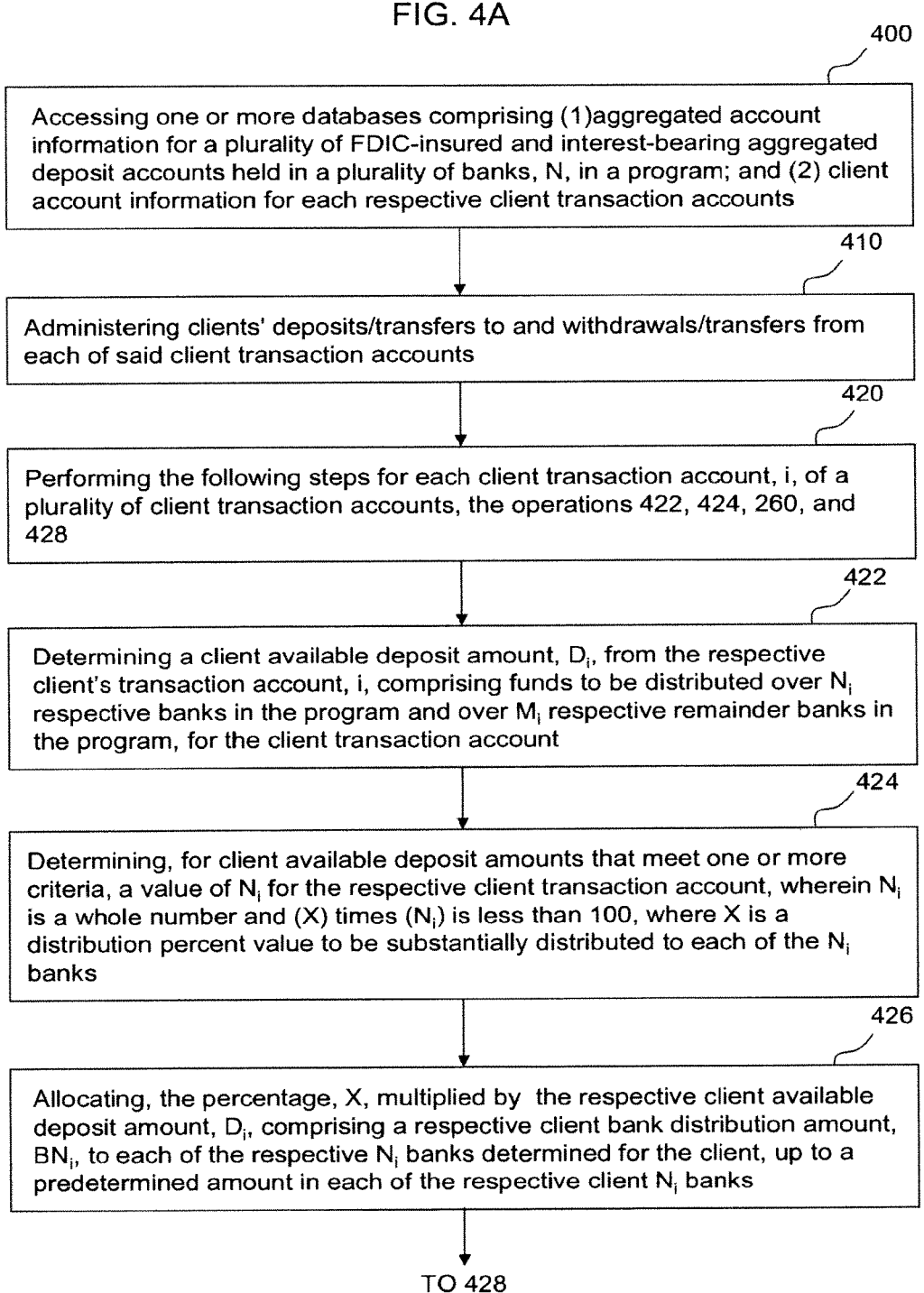
FIGS. 4A and 4B are a schematic block diagram of a yet further embodiment.
Figure 4B:
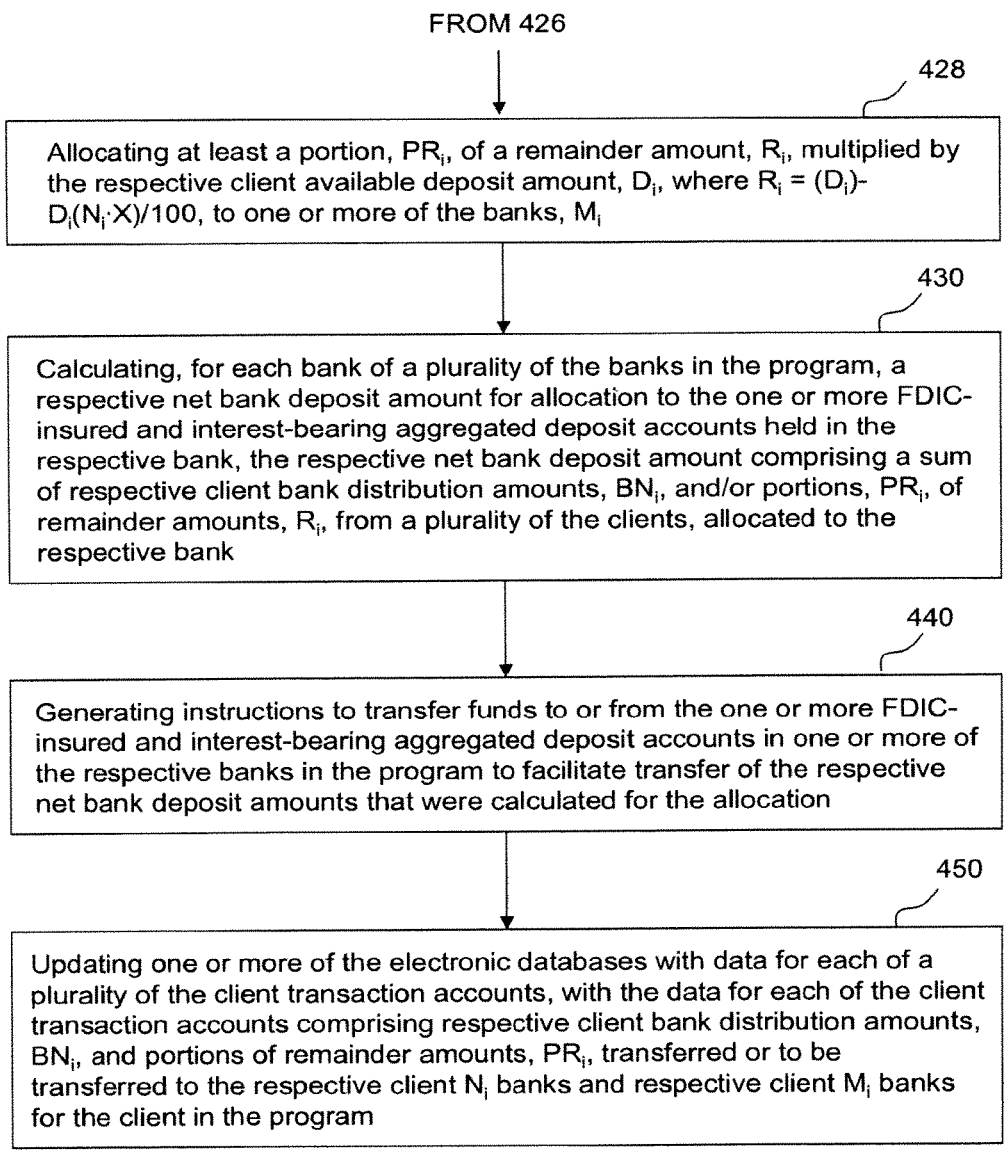

FIGS. 4A and 4B disclose one implementation for the second scenario shown in Table I, e.g., allocating a percentage, X, across a group of the banks in the program, e.g., 18% across 5 banks in a program with 10 banks, and allocating a remainder percentage, e.g., 10%, in or across one or more remainder banks, e.g., in a 6$^{th}$ bank. One embodiment of this second scenario comprises a computer-implemented method for managing a plurality of client transaction accounts associated with a plurality of respective clients for a plurality of transactions. Block 400 comprises accessing, by one or more computers, one or more electronic databases, stored on one or more computer-readable media. The information stored in the one or more databases comprises: (1) aggregated account information for a plurality of Federal Deposit Insurance Corporation (FDIC)-insured and interest-bearing aggregated deposit accounts held in a plurality of banks, N, in a program, wherein funds from client transaction accounts of a plurality of clients are aggregated with funds of other client transaction accounts in the aggregated deposit accounts held in the banks in the program; and (2) client transaction account information for each of the respective client transaction accounts comprising: (a) a respective balance in the respective client transaction account; (b) transaction data for the respective client transaction account; and (c) a respective balance of funds from the respective client transaction account held in each of one or more of the plurality of the insured and interest-bearing aggregated deposit accounts holding funds of the respective client transaction account.

Block 410 comprises the computer-implemented operation of (1) administering clients' deposits/transfers to and withdrawals/transfers from each of the client transaction accounts, the administering comprising, in one embodiment, processing, by the one or more computers, transaction data comprising transaction data for one or more deposits/transfers for one or more client transaction accounts and/or transaction data for one or more withdrawals/transfers from one or more of the client transaction accounts, with the transaction data comprising a respective amount for each respective deposit/transfer and each respective withdrawal/transfer.

Block 420 comprises the computer-implemented operation of performing the following operations: 422, 424, 426, and 428, for each of a plurality of the client transaction accounts i:

(a) Determining, by the one or more computers, as represented by block 422, a client available deposit amount, $D_i$, from the respective client's transaction account, i, comprising funds to be distributed over $N_i$ respective banks in the program and over $N_i$ respective banks in the program, and over $M_i$ remainder banks for the client. Various computer-implemented rules may be used to determine $D_i$, as described previously, such as imposing a criterion to hold a certain amount or percentage of the client transaction account funds in the relationship financial entity.

(b) Determining, by the one or more computers, as represented by block 424, a value of $N_i$ banks for the respective client transaction account, based on a client available deposit amount, $D_i$, that is less than a program amount, e.g., less than an FDIC-insured limit multiplied by $N_i$ banks, wherein $N_i$ is a whole number and (X) times ($N_i$) is less than 100, where X is a distribution percent value to be distributed to each of the $N_i$ banks for the respective client transaction account. Note that this operation may be subject to one or more criteria, such as that the respective client available deposit amount, $D_i$, equals or exceeds a threshold value, and/or that a logic element is set, based on a particular relationship between the financial entity and the client, to name a few.

(c) Allocating, by the one or more computers, as represented by block 426, the percentage, X, of the respective client available deposit amount, $D_i$, comprising a respective client bank distribution amount, $BN_i$, to each of the respective $N_i$ banks determined for the client transaction account, up to a predetermined amount in each of the respective client $N_i$ banks. Note that the predetermined amount may be the FDIC insurance limit, or some lesser amount, for example.

(d) Allocating, by the one or more computers, as represented by block 428, at least a portion, $PR_i$, of a remainder amount, $R_i$, of the respective client available deposit amount, $D_i$, where $R_i=(D)-(D_i(N_i \cdot X)/100)$, to one or more of the banks, $M_i$, up to a predetermined amount in each of the respective client $M_i$ banks, where $M_i$, is one or more banks. For the example shown in Table I, this equation would mean that $R_i$ would be equal to the amount ($D_i$) of $100,000 minus the quantity of $100,000 times the number of banks $N_i$, which is 5 in this case, in which client transaction account deposits are allocated, times the percentage of 18%, divided by 100, which results in $100,000-$100,000 (5×18)/100=$10,000.

Block 430 comprises the computer-implemented operation of calculating, by the one or more computers, for each bank of a plurality of the banks in the program, a respective net bank deposit amount for allocation to one or more of the FDIC-insured and interest-bearing aggregated deposit accounts held in the respective bank, the respective net bank deposit amount comprising a sum of respective client bank distribution amounts, $BN_i$, and/or portions, $PR_i$, of remainder amounts, $R_i$, from a plurality of the client transaction accounts, allocated to the respective bank.

Block 440 comprises the computer-implemented operation of generating instructions, by the one or more computers, to transfer funds to or from one or more of the FDIC-insured and interest-bearing aggregated deposit accounts in one or more of the respective banks in the program to facilitate transfer of the respective net bank deposit amounts that were calculated for the allocation. In one embodiment, this transfer may comprise simply transferring the net amount received for a given period of time or netted based on some other parameter. In another embodiments, the instruction may reallocate all of the already deposited funds in various program banks to cause, for each of a plurality of the banks in the program, a respective balance of funds in the respective program bank held in the one or more FDIC-insured and interest-bearing aggregated deposit accounts therein to approximately equal the respective net bank deposit amount calculated for the respective program bank.

Block 450 comprises the computer-implemented operation of updating, by the one or more computers, one or more of the electronic databases 260 with update data for each of a plurality of the client transaction accounts, with the update data for each of the client transaction accounts comprising respective client bank distribution amounts, $BN_i$, and portions of remainder amounts, $PR_i$, transferred or to be transferred to the respective client $N_i$ banks and respective client $M_i$ banks for the client in the program.

In another embodiment of the invention, referred to as Option 2, a system, program product, and computer-implemented method are disclosed to approximately evenly allocate total client available deposit amounts, $D_i$ across a fixed number of banks in a program, by taking the respective client's available deposit amounts, $D_i$ and dividing by the fixed number of program banks. In this embodiment, one or more computers may be configured, for example with computer program code loaded in main memory, or via hard-wiring, to implement the allocation. The one or more computers may be configured to provide that the amount allocated to a bank will not exceed the account type insurance limit (currently $250,000) and/or will not override a bank capacity—with an exception being an allocation to one or more safety banks. Option 2, Scenario 1, is illustrated in Table II, for a client's transaction account balance of $100,000, to be distributed approximately evenly across 10 banks in a program, e.g., $100,000/10 (number of banks)=$10,000 per bank.

TABLE II

| Bank | Option 2, Scenario 1 | Option 2, Scenario 2 |
|---|---|---|
| Amount for Deposit | 100,000 | 3,000,000 |
| 1 | $10,000 | $700,000 |
| 2 | $10,000 | $180,000 |
| 3 | $10,000 | $180,000 |
| 4 | $10,000 | $180,000 |
| 5 | $10,000 | $180,000 |
| 6 | $10,000 | $180,000 |
| 7 | $10,000 | $180,000 |
| 8 | $10,000 | $180,000 |
| 9 | $10,000 | $180,000 |
| 10 | $10,000 | $180,000 |
| Total | $100,000 | $2,320,000 |

Figure 5A:
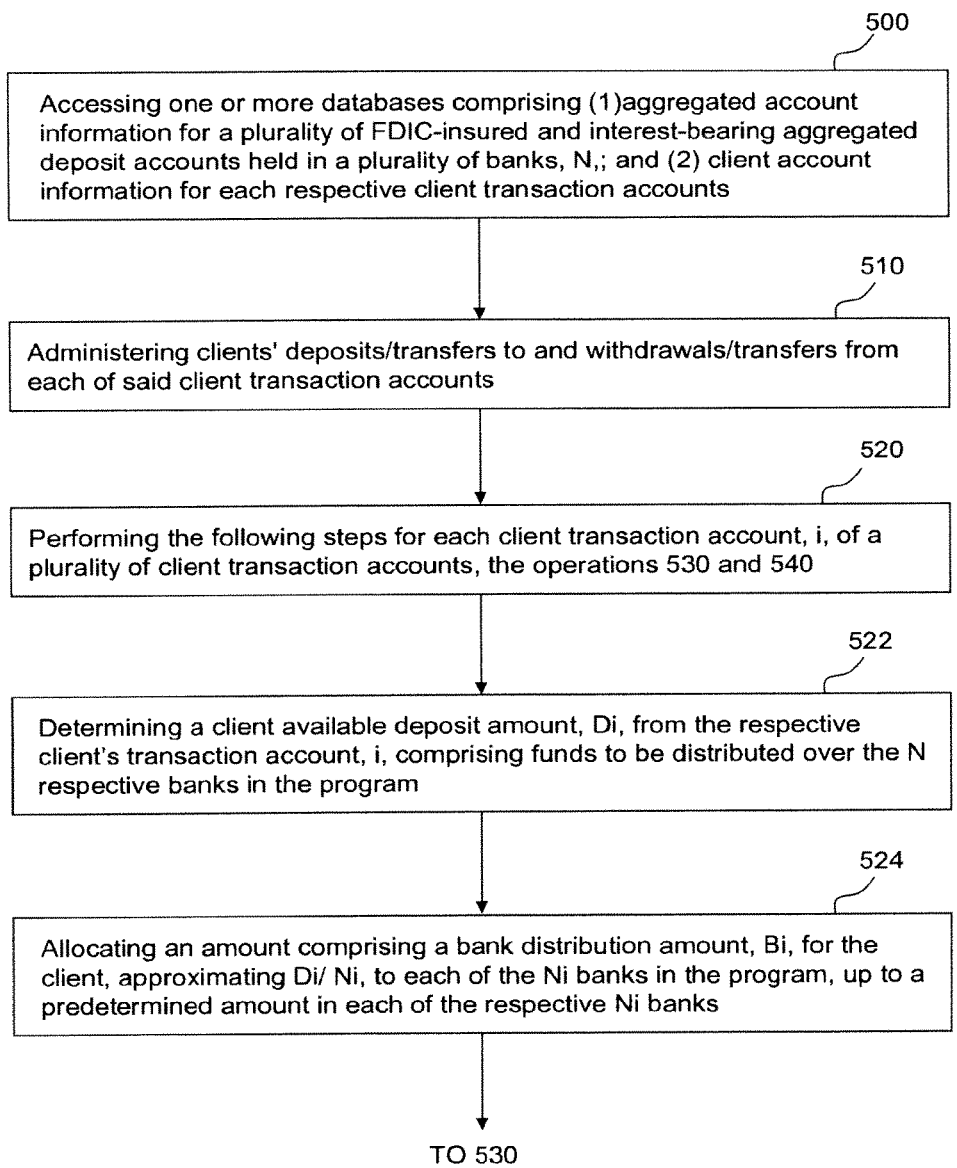

FIGS. 5A and 5B disclose one implementation for this embodiment, comprising a computer-implemented method for managing a plurality of client transaction accounts associated with a plurality of respective clients for a plurality of transactions. This method embodiment comprises a computer-implemented operation 500 of accessing, by one or more computers, one or more electronic databases, stored on one or more computer-readable media. In this embodiment, the one or more electronic databases comprise: (1) aggregated account information for a plurality of Federal Deposit Insurance Corporation (FDIC)-insured and interest-bearing aggregated deposit accounts held in a plurality of banks, N, in a program, wherein funds from client transaction accounts of a plurality of clients are aggregated with funds of other client transaction accounts in the aggregated deposit accounts held in the banks in the program; and (2) client transaction account information for each of the respective client transaction accounts comprising: (a) a respective balance in the respective client transaction account; (b) transaction data for the respective client transaction account; and (c) a respective balance of funds from the respective client transaction account held in each of one or more of the plurality of the insured and interest-bearing aggregated deposit accounts holding funds of the respective client transaction account.

Block 510 represents the computer-implemented operation of (1) administering clients' deposits/transfers to and withdrawals/transfers from each of the client transaction accounts, the administering comprising processing, by the one or more computers, transaction data comprising transaction data for one or more deposits/transfers for one or more client transaction accounts and/or transaction data for one or more withdrawals/transfers from one or more of the client transaction accounts, with the transaction data comprising a respective amount for each respective deposit/transfer and each respective withdrawal/transfer.

Block 520 comprises the computer-implemented operation of performing the following operations: 522 and 524, by the one or more computers, for each respective client transaction account, i, of a plurality of the client transaction accounts:

(a) Block 522 comprises the computer-implemented operation of, determining a client available deposit amount, $D_i$, from the respective client's transaction account, i, comprising funds to be distributed over $N_i$ respective banks in the program. $D_i$ may be determined using one or more computer-implemented rules, as noted above.

(b) Block 524 comprises the computer-implemented operation of, allocating an amount comprising a bank distribution amount, $B_i$, for the client transaction account, $D_i/N_i$, to each of the $N_i$ banks in the program, up to a predetermined amount in each of the respective client $N_i$ banks. Note that this operation is performed for client available deposit amounts, $D_i$, that are less than a program amount, e.g., less than an FDIC-insured limit multiplied by $N_i$ banks. One or more criteria may also be imposed on the allocation.

Block 530 represents the computer-implemented operation of (3) calculating, by the one or more computers, for each of the $N_i$ banks in the program, a respective net bank deposit amount for allocation to one or more of the FDIC-insured and interest-bearing aggregated deposit accounts held in the respective program bank, the respective net bank deposit amount comprising a sum of respective client bank distribution amounts, $B_i$, from a plurality of the clients, allocated to the respective program bank.

Block 540 represents the computer-implemented operation of (4) generating instructions, by the one or more computers, to transfer funds to or from one or more of the FDIC-insured and interest-bearing aggregated deposit accounts in one or more of the respective banks in the program to facilitate transfer of the respective net bank deposit amounts that were calculated for the allocation. In one embodiment, this transfer may comprise simply transferring the net amount received for a given period of time or netted based on some other parameter. In another embodiments, the instruction may reallocate all of the already deposited funds in various program banks to cause a respective balance of funds in the respective bank deposited in the one or more FDIC-insured and interest-bearing aggregated deposit accounts held therein to approximately equal the respective net bank deposit amount calculated for the respective bank.

Block 550 represents the computer-implemented operation of (5) updating, by the one or more computers, one or more of the electronic databases with update data for each of a plurality of the client transaction accounts, with the update data for each of the client transaction accounts comprising respective client bank distribution amounts, $B_i$, transferred or to be transferred to the respective $N_i$ banks for the respective client in the program.

In one variation of this embodiment, $N_i$ is made equal to N. In other variations, $N_i$ may vary for each client transaction account, i, based on such factors, as for example, a total amount a client has on deposit in various accounts with a given relationship financial entity, a number of available program banks with capacity, the parameters of the respective program, to name a few.

In a Scenario 2 for this Option 2, shown in Table II, a client has a transaction balance of $2,320,000, a balance of $180,000 is allocated to each of bank 2-10. A remaining balance is allocated and sent to a safety bank 1, or placed in a money fund or one or more other instruments that may or may not be FDIC insured.

Figure 6A:
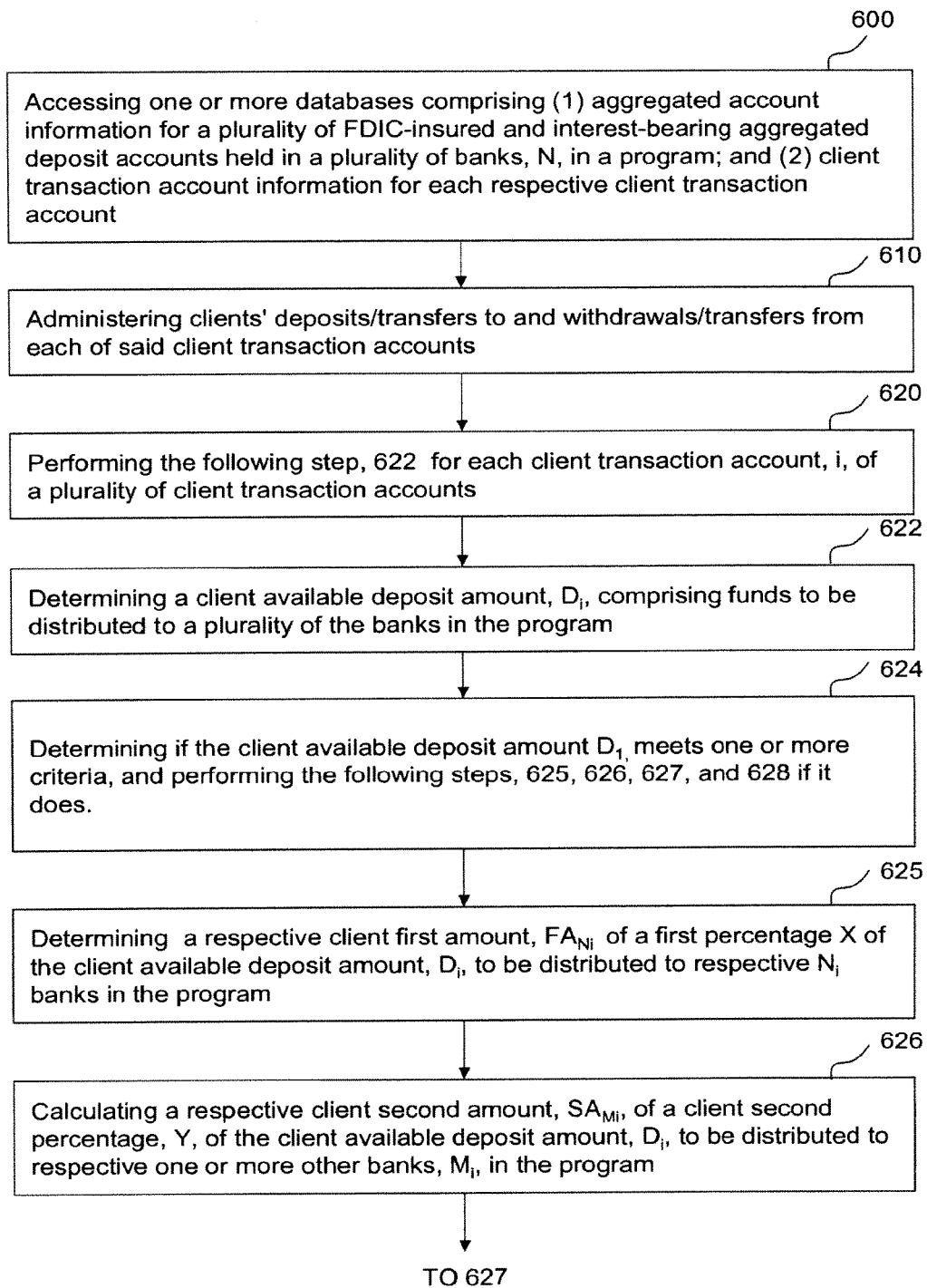
FIGS. 6A and 6B are a schematic block diagram of a further embodiment.
Figure 6B:
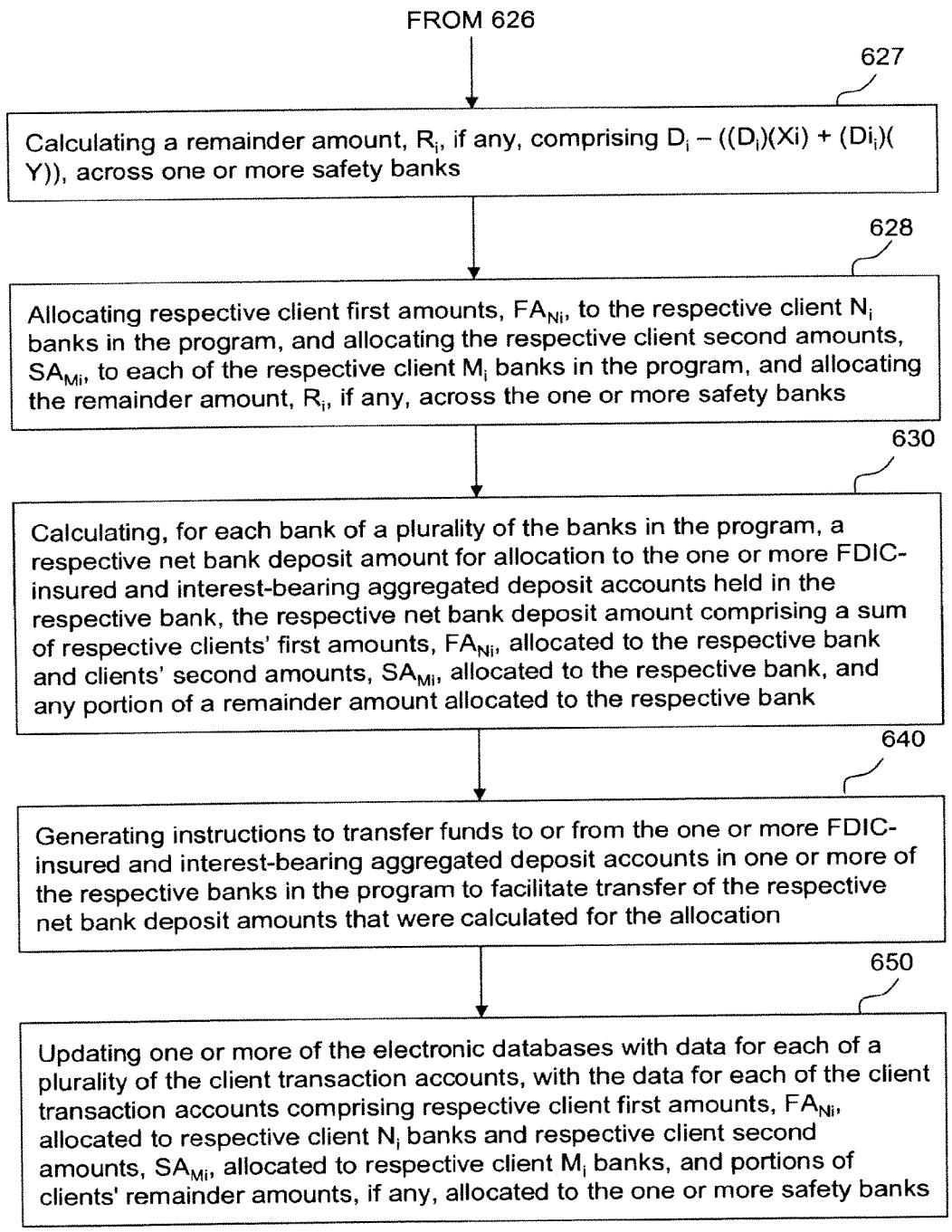

FIGS. 6A and 6B and Table III illustrate an embodiment of a computer-implemented method comprising an Option 3 for managing a plurality of client transaction accounts associated with a plurality of respective clients for a plurality of transactions. For Option 3, the one or more computers may be configured to calculate a percent of client assets, and allocate that percent amount among a first $N_i$ banks in program. The remaining amount of client assets is then allocated across $M_i$ program banks. The amount allocated to each bank in one of the sets is determined to not exceed the account type insurance limit (currently $250,000) or to exceed a bank capacity—with an exception being an allocation to one or more safety banks. Table III illustrates a Scenario 1 for this Option 3. In this Scenario 1, for a client with a total transaction account balance of $500,000, 80% is allocated to a first two banks, e.g., $200,000 in each of banks 1 and 2, and the remaining 20% of the balance is allocated among the remaining banks 3-10, e.g., $12,500 to each of banks 3-10. A Scenario 2 for Option 3 is shown in the second column in Table III. In this Scenario 2, for a client with a total transaction account balance of $500,000, 50% is allocated among a first 3 banks 1-3, e.g., $83,333 in of banks 1-3, and the remaining 50% is allocated across the remaining banks 4-10, e.g., $35,714 to each of banks 4-10. Although convenient for purposes of illustration, note that the amounts allocated to the banks in a given set of banks, e.g., $N_i$, need not be equal. Also, note the amount in the given bank for a client may exceed the FDIC insurance limit. This is illustrated in a Scenario 3 shown in column 3. Column 3 shows the same percentage of 50% allocated to the first set of banks, 1 and 2 as in column 1, but the amount in bank 1 is different from the amount in bank 2, and the total amount for deposit cause balance for the client in multiple of the banks to exceed the FDIC limit. Note that in an alternative embodiment, excess amount above a given amount may be placed in money funds, certificates of deposits, stocks, or other financial instruments.

In a further embodiment, referred to as Scenario 4, and shown in column 4, three sets of banks or other financial instruments are used, with a different percentage allocated to each set. Within the given set, the percentage allocated may be distributed equally across the banks or financial instruments in the set, or the amounts in the banks or financial instruments in the set may be different. The first set of banks may be determined based on one or more criteria, based on client characteristics, such as total balance with a relationship entity, or any of the other criteria already set forth herein, or based on one or more criteria related to the bank, such as the capacity of the banks, the balance sheet and safety of the bank, to name a few. In this example, the first set comprises banks 1 and 2 and has allocated thereto a percentage of 50%. The second set of banks may be determined based on one or more criteria, and comprises in this example, banks 3, 4, 5 and 6, and has allocated thereto a percentage of 30%. The third set may comprise a set of equity funds, which may be determined based on one or more criteria, and comprises in this example, equity funds 7, 8, 9 and 10, and has allocated thereto a percentage of 20%.

TABLE III

| Bank or Financial Instr. | Option 3, Scenario 1 | Option 3, Scenario 2 | Option 3 Scenario 3 | Option 3 Scenario 4 |
| --- | --- | --- | --- | --- |
| Amount for Deposit | $500,000 | $500,000 | $5,200,000 | $1,850,000 |
| 1 | $200,000 | $83,333 | $1,500,000 | $500,000 |
| 2 | $200,000 | $83,333 | $1,100,000 | $500,000 |
| 3 | $12,500 | $83,333 | $325,000 | $200,000 |
| 4 | $12,500 | $35,714 | $325,000 | $200,000 |
| 5 | $12,500 | $35,714 | $325,000 | $100,000 |
| 6 | $12,500 | $35,714 | $325,000 | $100,000 |
| 7 | $12,500 | $35,714 | $325,000 | $50,000 |
| 8 | $12,500 | $35,714 | $325,000 | $50,000 |
| 9 | $12,500 | $35,714 | $325,000 | $50,000 |
| 10 | $12,500 | $35,714 | $325,000 | $50,000 |
| Total | $500,000 | $500,000 | $3,000,000 | $50,000 |

As noted FIGS. 6A and 6B and Table III represent an example embodiment of this Option 3. Block 600 in FIG. 6 comprises the computer-implemented operation of accessing, by one or more computers, one or more electronic databases, stored on one or more computer-readable media, comprising: (1) aggregated account information for a plurality of Federal Deposit Insurance Corporation (FDIC)-insured and interest-bearing aggregated deposit accounts held in a plurality of banks, N, in a program, wherein funds from client transaction accounts of a plurality of clients are aggregated with funds of other client transaction accounts in the aggregated deposit accounts held in the banks in the program; and (2) client transaction account information for each of the respective client transaction accounts comprising: (a) a respective balance in the respective client transaction account; (b) transaction data for the respective client transaction account; and (c) a respective balance of funds from the respective client transaction account held in each of one or more of the plurality of the insured and interest-bearing aggregated deposit accounts holding funds of the respective client transaction account.

Block 610 comprises the computer-implemented operation of (1) administering clients' deposits/transfers to and withdrawals/transfers from each of the client transaction accounts, the administering comprising processing, by the one or more computers, transaction data comprising transaction data for one or more deposits/transfers for one or more client transaction accounts and/or transaction data for one or more withdrawals/transfers from one or more of the client transaction accounts, with the transaction data comprising a respective amount for each respective deposit/transfer and each respective withdrawal/transfer.

Block 620 comprises the computer-implemented operation of performing the following operations: 622, 624, 625, 626, 627 and 628, in a loop, for each client transaction account, i, of a plurality of client transaction accounts.

Block 622 comprises a computer-implemented operation of (a) determining a client available deposit amount, $D_i$, comprising funds to be distributed to a plurality of the banks in the program. One or more computer-implemented rules may be applied to determine $D_i$, as noted above.

Block 624 comprises determining whether to perform a plurality of computer-implemented operations for client transaction accounts that meet one or more criteria. By way of example, one criterion may be that client available deposit amounts, $D_i$, is less than an FDIC insurance limit times a number of program banks determined for the deposit. This determination may comprise, in one embodiment, determining if the client available deposit amount, $D_i$, is less than an FDIC-insured limit multiplied by ($N_i$+$M_i$), where $N_i$ and $M_i$ are banks in the program, as specified below. Example criteria that have been described previously for other embodiments, may be applied here also. Then the following operations are performed: 625, 626, 627, and 628, if it does.

Block 625 comprises a computer-implemented operation of (c) determining a respective client first amount, $FA_{Ni}$, from a first percentage X of $D_i$ to be distributed to a respective given bank in a group of respective banks $N_i$ for the client. This respective first amount, $FA_{Ni}$, could vary from respective bank to bank in this group of banks $N_i$ based on one or more criteria selected by the client and/or the bank and/or a relationship entity. In one embodiment, this percentage X could be distributed equally across the group of banks $N_i$ for the client. In this case, the client first amount, $FA_{Ni}$, would comprise the first percentage $X/N_i$, multiplied by the client available deposit amount, $D_i$, with this client first amount, $FA_{Ni}$, to be distributed to each of the client $N_i$ banks in the program, wherein the client first amount, $FA_{Ni}$, cannot exceed a predetermined amount. In one embodiment, the predetermined amount is an amount that is equal to or less than the FDIC insurance limit. As can be seen from the above, the percentage X does not need to be distributed equally across the $N_i$ banks, but in one embodiment, it could be.

Block 626 comprises a computer-implemented operation of determining a respective client second amount, $SA_{Mi}$, from a second percentage Y of $D_i$ to be distributed to a respective given bank in a group of respective banks $M_i$ for the client. This respective second amount, $SA_{Mi}$, could vary from respective bank to respective bank in this group of banks $M_i$ based on one or more criteria selected by the client and/or the bank and/or a relationship entity. In one embodiment, this percentage Y could be distributed equally across the group of banks $M_i$ for the client. In this case, the client second amount, $SA_{Mi}$, would comprise the second percentage $Y/M_i$, multiplied by the client available deposit amount, $D_i$, with this client second amount, $SA_{Mi}$, to be distributed to each of the client $M_i$ banks in the program, but where the client second amount, $SA_{Mi}$, cannot exceed a predetermined amount. In one embodiment, the second percentage Y is equal to 100-X, unless the client second amount, $SA_{Mi}$, would exceed a predetermined amount. The predetermined amount may be equal to or less than the FDIC insurance limit, for example. Examples of the predetermined amount that have been described for other embodiments apply here as well. In the example illustrated in Table III, Option 3, Scenario 1, the calculation for the second percentage is Y=100−80=20%, and the percentage of $D_i$ actually distributed to each of the $M_i$ banks is $Y/M_i$=20%/8=2.5%. The second amount for this example of an equal distribution across $M_i$ banks comprises 2.5% of $500,00=$12,500. Note that there are a variety of different algorithms to generate SA where the distribution among the $M_i$ banks is not to be equal.

Block 627 comprises a computer-implemented operation of calculating a remainder amount, $R_i$, if any, comprising $[D_i]−[(D_i)(X)+(D_i)(Y)]$, across the one or more safety banks. Note that a remainder amount, may occur, in one example, where the first percentage X of $D_i$ and/or the second percentage Y of $D_i$ exceeds the predetermined amount.

Block 628 comprises the computer-implemented operation of allocating the client respective first amounts, $FA_{Ni}$, to the respective client $N_i$ banks in the program, and allocating the respective client second amounts, $SA_{Mi}$, to the respective client $M_i$ banks in the program, and allocating the remainder amount, $R_i$, if any, across the one or more safety banks. Note that a given one of the program banks could be an $N_i$ bank for one client transaction account and an $M_i$ bank for a second client transaction account, and a safety bank for a third client. Alternatively, a first group of program banks might be only $N_i$ banks for client transaction accounts, a second group of banks might only be $M_i$ banks for client transaction accounts, and a third group of banks may operate as the safety banks for the client transaction accounts. This concept applies to all of the embodiments. Thus, a net bank deposit amount may comprise only client first amounts, $FA_{Ni}$, or only client second amounts, $SA_{Mi}$, or only client remainder amounts, or a combination of two of the above, or all three. This concept applies to all of the embodiments.

Block 630 comprises a computer-implemented operation of calculating, for each bank of a plurality of the banks in the program, a respective net bank deposit amount for allocation to one or more of the FDIC-insured and interest-bearing aggregated deposit accounts held in the respective bank, the respective net bank deposit amount comprising a sum of respective clients' first amounts, $FA_{Ni}$, allocated to the respective bank and respective clients' second amounts, $SA_{Mi}$, allocated to the respective bank, and any portion of a remainder amount allocated to the respective bank, if it is designated a safety bank for that client transaction account.

Block 640 comprises the computer-implemented operation of generating instructions to transfer funds to or from one or more of the FDIC-insured and interest-bearing aggregated deposit accounts in one or more of the respective banks in the program to facilitate transfer of the respective net bank deposit amounts that were calculated for the allocation. In one embodiment, this transfer may comprise simply transferring the net amount received for a given period of time or netted based on some other parameter. In another embodiments, the instruction may reallocate all of the already deposited funds in various program banks to cause a respective balance of funds in the respective bank deposited in the one or more FDIC-insured and interest-bearing aggregated deposit accounts held therein to approximately equal the respective net bank deposit amount calculated for the respective bank.

Block 650 comprises the computer-implemented operation of updating one or more of the electronic databases with update data for each of a plurality of the client transaction accounts, with the update data for each of the client transaction accounts comprising respective client first amounts, $FA_{Ni}$, allocated to the respective client $N_i$ banks and respective client second amounts, $SA_{Mi}$, allocated to the respective client $M_i$ banks, and all or portions of clients' remainder amounts, if any, allocated to the one or more safety banks.

In an embodiment, one or more of the safety banks may be one or more of the banks, $M_i$ and/or $N_i$.

In a further embodiment of the invention, referred to as Option 4 and illustrated in Table IV, a system, program product, and computer-implemented method is disclosed to allocate a percentage of client assets across $N_i$ banks in a program. In this embodiment, one or more computers may be configured, for example with computer program code loaded in main memory, or via hard-wiring to implement the allocation. The one or more computers may be configured to calculate a percent, X, of client available assets to be distributed, $D_i$, and allocate that amount to each of the $N_i$ banks in program. A remaining percentage, Y, of client assets is allocated equally by percent to each of $M_i$ banks. In one embodiment, this Y percentage is allocated based on a deposit sequence order. Note that in one embodiment, the programming will place a limit on the amount allocated to each bank so that it will not exceed the FDIC account type insurance limit (currently $250,000) or override a bank capacity—with the exception that an allocation above approximately the FDIC insurance limit may be placed in one or more safety banks.

Table IV illustrates a Scenario 1 for this embodiment. In this Scenario, by way of example, 80% is allocated to the first two banks, 1 and 2, and 20% of the balance is allocated to remaining bank 3.

TABLE IV

| Bank | Option 4, Scenario 1 |
|---|---|
| Account Balance | $500,000 |
| 1 | $200,000 |
| 2 | $200,000 |
| 3 | $100,000 |
| 4 | |
| 5 | |
| 6 | |
| 7 | |
| 8 | |
| 9 | |
| 10 | |
| Total | $500,000 |

Figure 7B:
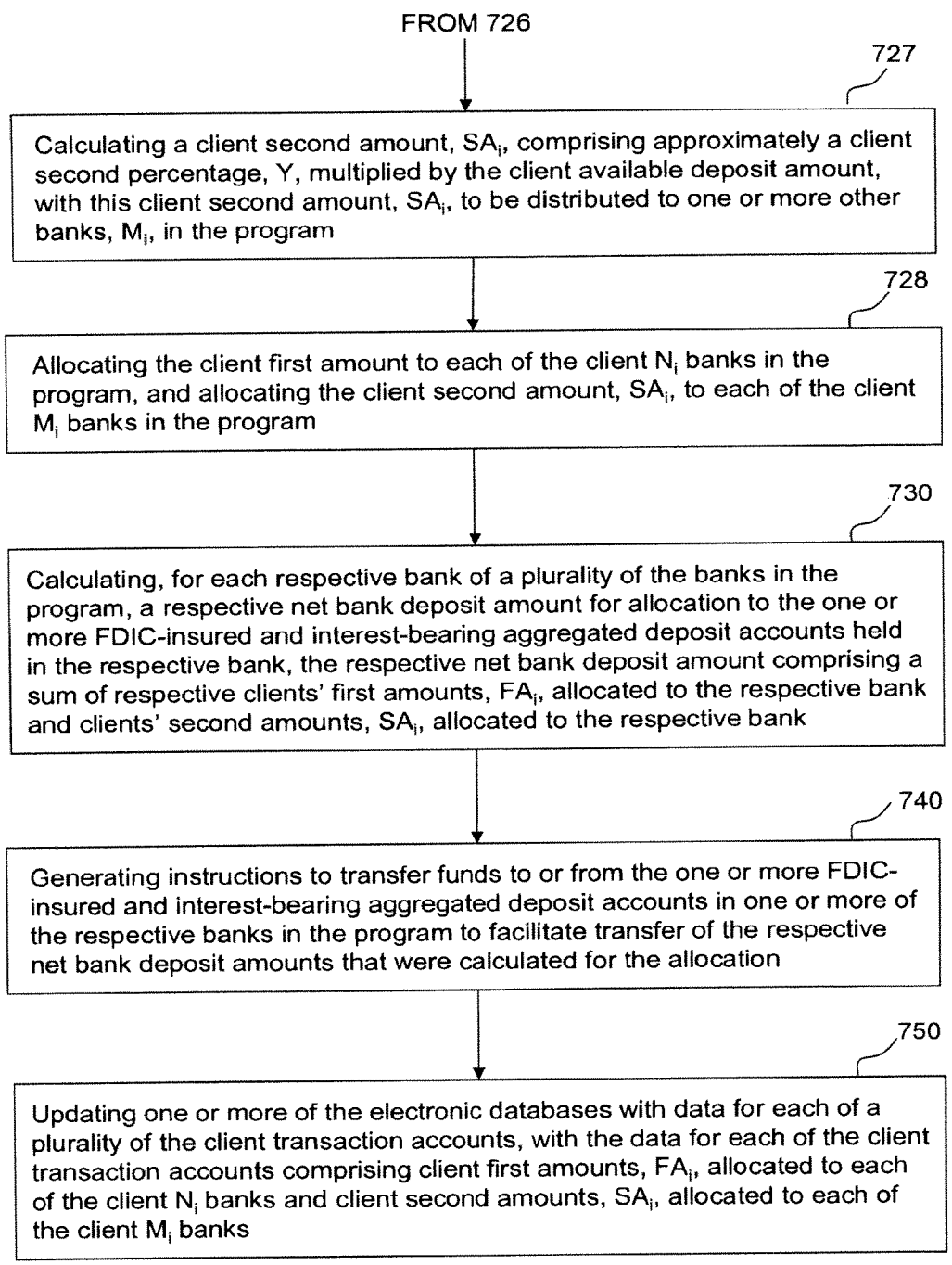

FIGS. 7A and 7B disclose an implementation for this embodiment of Option 4, comprising a computer-implemented method for managing a plurality of transactions for a plurality of client transaction accounts associated with a plurality of respective clients. This method embodiment comprises a computer-implemented operation 700 of accessing, by one or more computers, one or more electronic databases, stored on one or more computer-readable media, comprising: (1) aggregated account information for a plurality of Federal Deposit Insurance Corporation (FDIC)-insured and interest-bearing aggregated deposit accounts held in a plurality of banks, N, in a program, wherein funds from client transaction accounts of a plurality of clients are aggregated with funds of other client transaction accounts in the aggregated deposit accounts held in the banks in the program; and (2) client transaction account information for each of the respective client transaction accounts comprising: (a) a respective balance in the respective client transaction account; (b) transaction data for the respective client transaction account; and (c) a respective balance of funds from the respective client transaction account held in each of one or more of the plurality of the insured and interest-bearing aggregated deposit accounts holding funds of the respective client transaction account.

Block 710 comprises the computer-implemented operation of administering, by the one of more computers, clients' deposits/transfers to and withdrawals/transfers from each of the client transaction accounts, the administering comprising processing transaction data comprising transaction data for one or more deposits/transfers for one or more client transaction accounts and/or transaction data for one or more withdrawals/transfers from one or more of the client transaction accounts, with the transaction data comprising a respective amount for each respective deposit/transfer and each respective withdrawal/transfer.

Block 720 comprises the computer-implemented operation of performing, by the one of more computers, the following operations for each client transaction account, i, of a plurality of client transaction accounts:

(a) Block 722 comprises the computer-implemented operation of determining, by the one of more computers, a client available deposit amount, $D_i$, comprising funds to be distributed to a plurality of the banks in the program. As noted, one or more computer implemented rules may be applied to make this determination, as described above.

(b) Block 724 comprises the computer-implemented operation of performing, by the one of more computers, for client available deposit amounts $D_i$, as discussed previously, the following operations, 725, 726, and 728, if it does:

(i) Block 726 comprises the computer-implemented operation of calculating, by the one of more computers, a client first amount, $FA_i$, comprising a first percentage X, multiplied by the client available deposit amount, $D_i$, with this client first amount, $FA_i$, to be distributed to each of a client $N_i$ banks in the program, wherein the client first amount, $FA_i$, cannot exceed a predetermined amount.

(ii) Block 727 comprises the computer-implemented operation of calculating, by the one of more computers, a client second amount, $SA_i$, comprising a client second percentage, Y, multiplied by the client available deposit amount, $D_i$, with this client second amount, $SA_i$, to be distributed to each of the one or more other banks, $M_i$, in the program, but where the client second amount, $SA_i$, cannot exceed a predetermined amount, and where Y is not equal to X. In one embodiment, this distribution may be made in a deposit sequence order. In a further embodiment, the second percentage Y may be set equal to $(100-(X)\cdot(N_i))/M_i$.

(iii) Block 728 comprises the computer-implemented operation of allocating, by the one of more computers, the client first amount to each of the client $N_i$ banks in the program, and allocating the client second amount, $SA_i$, to each of the client $M_i$ banks in the program.

Block 730 comprises the computer-implemented operation of calculating, by the one of more computers, for each respective bank of a plurality of the banks in the program, a respective net bank deposit amount for allocation to one or more of the FDIC-insured and interest-bearing aggregated deposit accounts held in the respective program bank, the respective net bank deposit amount comprising a sum of respective clients' first amounts, $FA_i$, allocated to the respective program bank and clients' second amounts, $SA_i$, allocated to the respective program bank.

Block 740 comprises the computer-implemented operation of generating, by the one of more computers, instructions to transfer funds to or from one or more of the FDIC-insured and interest-bearing aggregated deposit accounts in one or more of the respective banks in the program to facilitate transfer of the respective net bank deposit amounts that were calculated for the allocation. In one embodiment, this transfer may comprise simply transferring the net amount received for a given period of time or netted based on some other parameter. In another embodiments, the instruction may reallocate all of the already deposited funds in various program banks to cause a respective balance of funds in the respective bank deposited in the one or more FDIC-insured and interest-bearing aggregated deposit accounts held therein to approximately equal the respective net bank deposit amount calculated for the respective bank.

Block 750 comprises the computer-implemented operation of updating, by the one of more computers, one or more of the electronic databases with update data for each of a plurality of the client transaction accounts, with the update data for each of the client transaction accounts comprising client first amounts, $FA_i$, allocated to each of the client $N_i$ banks and client second amounts, $SA_i$, allocated to each of the client $M_i$ banks.

A yet further embodiment of the invention comprises allocating client funds across a number of program banks, with the number of banks for the allocation based on one or more criteria, e.g., a tiering of the number of banks for deposit. One criterion may comprise a balance in the client transaction account relative to a tiering table comprising a bank number tier assigned to a range of balances. Another criterion may be the balance in all of the accounts for a client's family relative to a tiering table. Another criterion may be an overall client relationship with the system or with one or more financial institutions. An example of a bank tiered allocation operation is shown in FIGS. 8A and 8B.

Figure 8A:
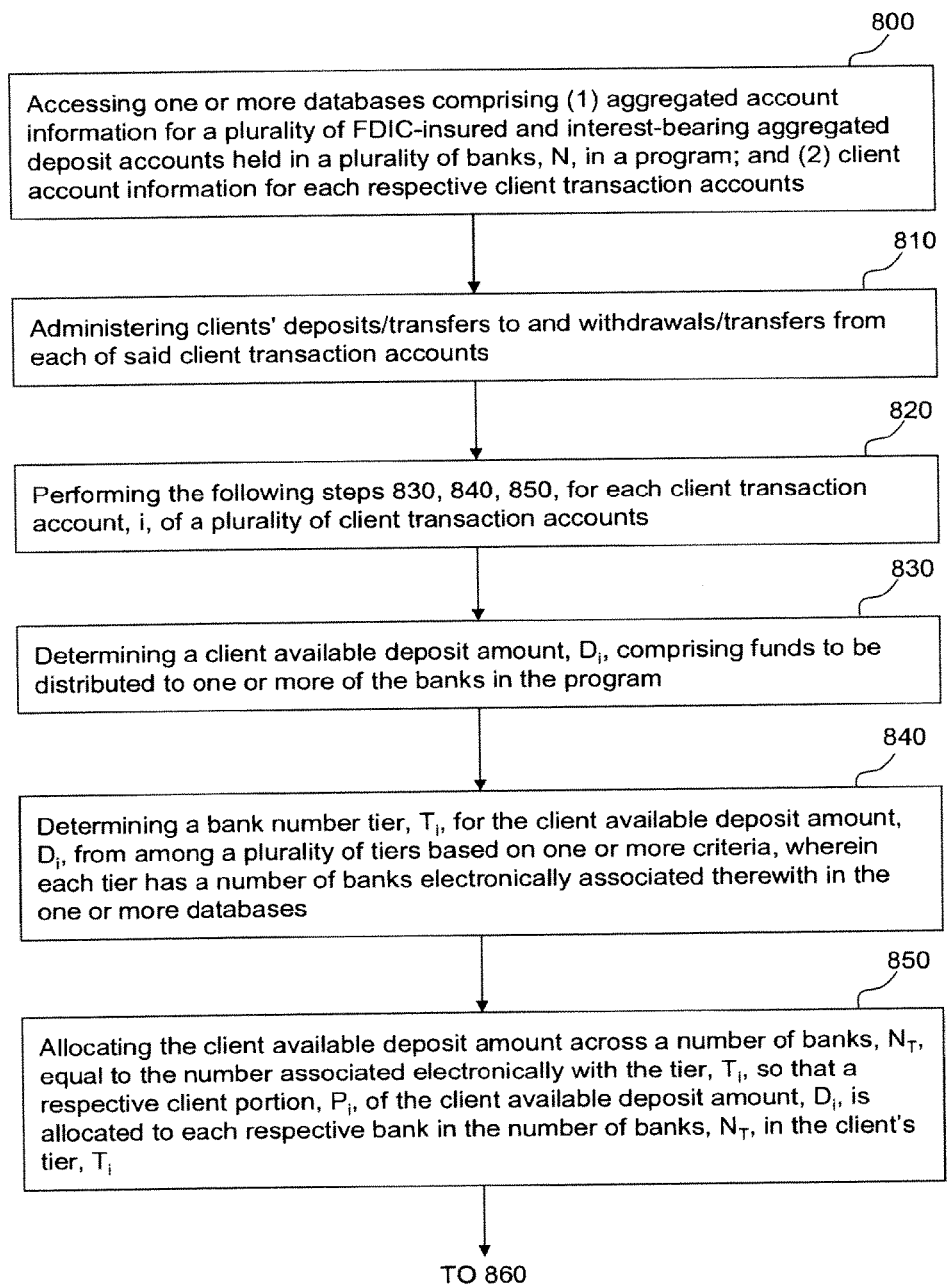
FIGS. 8A and 8B are a schematic block diagram of a further embodiment.
Figure 8B:
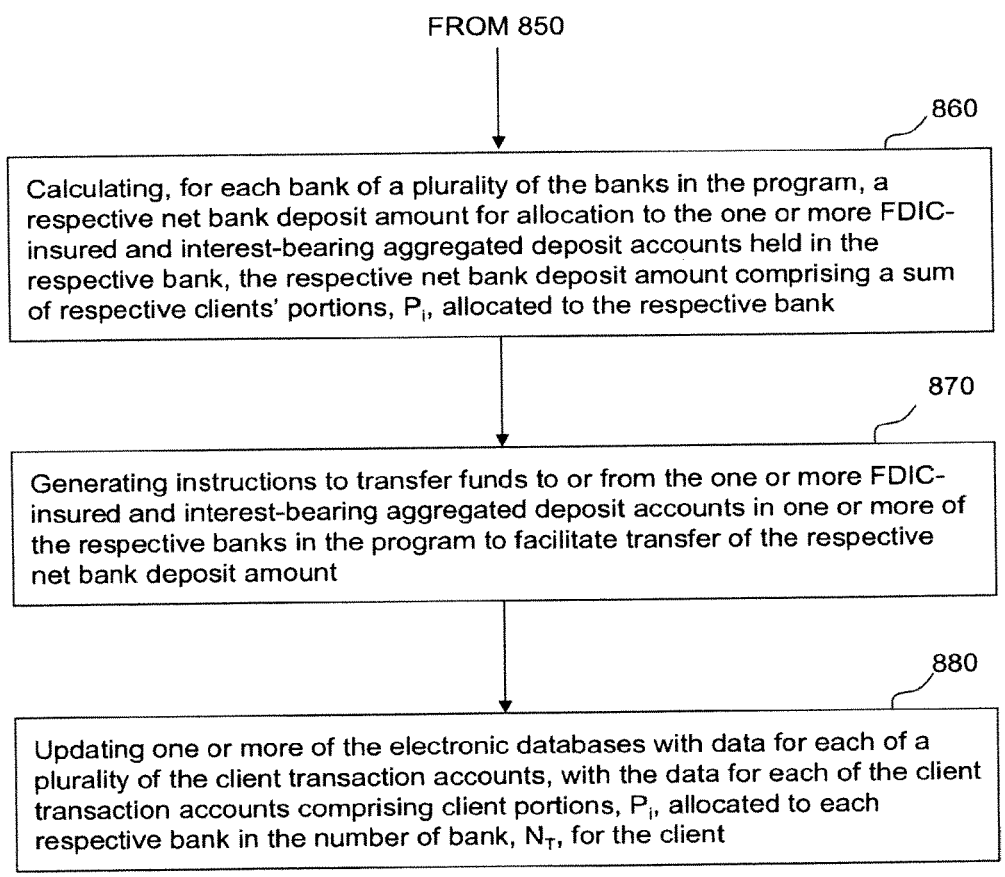

FIGS. 8A and 8B disclose one implementation for this embodiment, comprising a computer-implemented method for managing a plurality of client transaction accounts associated with a plurality of respective clients for a plurality of transactions. This method embodiment comprises a computer-implemented operation 800 of accessing one or more electronic databases, stored on one or more computer-readable media, comprising: (1) aggregated account information for a plurality of Federal Deposit Insurance Corporation (FDIC)-insured and interest-bearing aggregated deposit accounts held in a plurality of banks, N, in a program, wherein funds from client transaction accounts of a plurality of clients are aggregated with funds of other client transaction accounts in the aggregated deposit accounts held in the banks in the program; and (2) client transaction account information for each of the respective client transaction accounts comprising: (a) a respective balance in the respective client transaction account; (b) transaction data for the respective client transaction account; and (c) a respective balance of funds from the respective client transaction account held in each of one or more of the plurality of the insured and interest-bearing aggregated deposit accounts holding funds of the respective client transaction account.

Block 810 represents the computer-implemented operation of administering, by the one of more computers, clients' deposits/transfers to and withdrawals/transfers from each of the client transaction accounts, the administering comprising processing transaction data comprising transaction data for one or more deposits/transfers for one or more client transaction accounts and/or transaction data for one or more withdrawals/transfers from one or more of the client transaction accounts, with the transaction data comprising a respective amount for each respective deposit/transfer and each respective withdrawal/transfer.

Block 820 represents a computer-implemented operation of performing, by the one of more computers, (2) the following steps 822, 824, and 826, for each client transaction account, i, of a plurality of client transaction accounts. Note that the plurality of the client transactions accounts may be less than all of the client transaction accounts:

(a) Block 822 represents a computer-implemented operation of determining, by the one of more computers, a client available deposit amount, $D_i$, comprising funds to be distributed to one or more of the banks in the program. This determination may be subject to one or more computer implemented rules, as discussed previously.

(b) Block 824 represents a computer-implemented operation of determining, by the one of more computers, a bank number tier, $T_i$, for the client available deposit amount, $D_i$, from among a plurality of tiers based on one or more criteria, wherein each tier has a number of banks electronically associated therewith or a function for computing electronically the number of banks associated therewith, in the one or more databases. In one embodiment, one of the criteria may comprise the client available deposit amount, $D_i$, and where that client available deposit amount $D_i$ fits in a tier table comprising a set of deposit amount ranges, with a prescribed number of banks, $N_T$, assigned to each respective tier.

(c) Block 826 represents a computer-implemented operation of allocating, by the one of more computers, the client available deposit amount, $D_i$, across a number of banks, $N_T$, equal to the number associated electronically with the tier, $T_i$, or determined from the function in that tier, $T_i$, so that a respective client portion, $P_i$, of the client available deposit amount, $D_i$, is allocated to each respective bank in the number of banks, $N_T$, in the client's tier, $T_i$. In a variation of this Option 5, the client portions, $P_i$, allocated to each of the respective banks in the client's tier, $N_i$, are approximately equal, but do not exceed a predetermined amount, except for one or more safety banks. In another embodiment, the client portions, $P_i$, may vary from bank to bank. In another embodiment, the client portions, $P_i$, may be determined in accordance with one or more of the computer-implemented methods described herein.

Block 830 represents the computer-implemented operation of calculating, by the one of more computers, for each respective bank of a plurality of the banks in the program, a respective net bank deposit amount for allocation to one or more of the FDIC-insured and interest-bearing aggregated deposit accounts held in the respective bank, the respective net bank deposit amount comprising a sum of respective clients' portions, $P_i$, allocated to the respective bank. In one embodiment, any excess portions are also included in the respective net bank deposit amount, if the respective program bank is a safety bank for one or more client transaction accounts.

Block 840 represents the computer-implemented operation of generating, by the one of more computers, instructions to transfer funds to or from one or more of the FDIC-insured and interest-bearing aggregated deposit accounts in one or more of the respective banks in the program to facilitate transfer of the respective net bank deposit amounts that were calculated for the allocation. In one embodiment, this transfer may comprise simply transferring the net amount received for a given period of time or netted based on some other parameter. In another embodiments, the instruction may reallocate all of the already deposited funds in various program banks to cause a respective balance of funds in the respective bank deposited in the one or more FDIC-insured and interest-bearing aggregated deposit accounts held therein to equal or approximately equal the respective net bank deposit amount calculated for the respective bank.

Block 850 represents the computer-implemented operation of updating, by the one of more computers, one or more of the electronic databases with update data for each of a plurality of the client transaction accounts, with the update data for each of the client transaction accounts comprising client portions, $P_i$, allocated to each respective bank in the number of bank, $N_T$, determined for the client based on the tier determined for that client transaction account. Note that in some instances, the client portion, $P_i$, for the respective bank may include excess portions, if the respective bank is a safety bank for the respective client.

In a yet further embodiment, after the system has determined that a client, or a broker dealer, or relationship bank has met one or more designated criteria, then the client, or broker dealer or relationship bank may be permitted to designate a number of program banks across which to deposit its client available deposit amount, $D_i$. and/or to designate a percentage to be deposited in each of the program banks.

In a variation of this embodiment, after it has been determined that the client meets the one or more designated criteria, the client may be permitted to designate a number of program banks across which to deposit a client available deposit amount, $D_i$ that is less then the FDIC insurance limit times the number of banks the client has designated. By way of example but not limitation, the one or more criteria may comprise an amount in a respective client accounts, a composite amount from a plurality of the accounts associated with the respective client, a length of time that a relationship has been maintained, or other convenient parameter.

Figure 11:
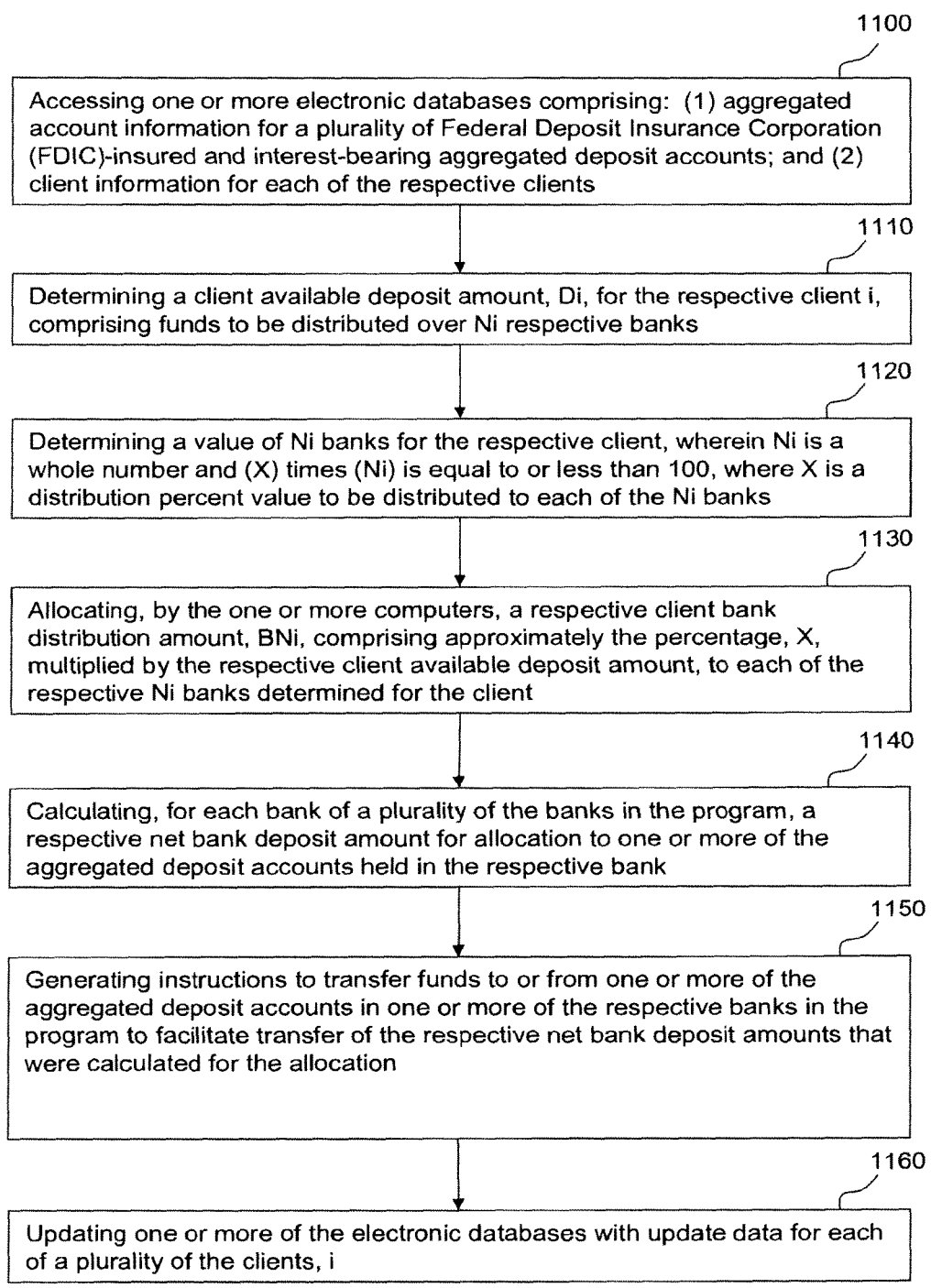
FIG. 11 is schematic block diagram of a further embodiment.

One implementation of this embodiment is illustrated in FIG. 11. In FIG. 11, discloses a method for distributing respective client funds associated with a plurality of respective clients. Block 1100 of FIG. 11 discloses a computer-implemented operation of accessing, by one or more computers, one or more electronic databases, stored on one or more computer-readable media, comprising: (1) aggregated account information for a plurality of Federal Deposit Insurance Corporation (FDIC)-insured and interest-bearing aggregated deposit accounts held in a plurality of banks, N, in a program, wherein funds of a plurality of clients are aggregated with funds of other clients in the aggregated deposit accounts held in the banks in the program; and (2) client information for each of the respective clients comprising: (a) a respective total balance to be distributed for the respective client; (b) a respective balance of funds of the respective client held in each of one or more of the insured and interest-bearing aggregated deposit accounts holding funds of the respective client.

The next set of blocks disclose a sub-set of operations performed for each client, i, of a plurality of clients. In block 1110, the operation is disclosed of determining a client available deposit amount, $D_i$, for the respective client i, comprising funds to be distributed over $N_i$ respective banks in the program for the respective client. As noted previously, this may be computed in a computer-implemented step, or may be received directly or indirectly from a respective client via an online banking portal or Web link or other convenient method, or from a relationship entity, such as a relationship bank or broker dealer for the respective client.

In block 1120, a computer-implemented operation is disclosed of determining, for a client available deposit amount $D_i$, that is less than an FDIC-insured limit multiplied by $N_i$ banks, a value of $N_i$ banks for the respective client, wherein $N_i$ is a whole number and (X) times ($N_i$) is equal to or less than 100, where X is a distribution percent value to be distributed to each of the $N_i$ banks. Examples showing this calculation have been described previously.

In block 1130, a computer-implemented operation is disclosed of allocating, by the one or more computers, a respective client bank distribution amount, $BN_i$, comprising approximately the percentage, X, multiplied by the respective client available deposit amount, to each of the respective $N_i$ banks determined for the client, up to a predetermined amount in each of the respective client $N_i$ banks.

In block 1140, a computer-implemented operation is disclosed of calculating, by the one or more computers, for each bank of a plurality of the banks in the program, a respective net bank deposit amount for allocation to one or more of the FDIC-insured and interest-bearing aggregated deposit accounts held in the respective bank, the respective net bank deposit amount comprising a sum of respective client bank distribution amounts, $BN_i$, from a plurality of the clients, allocated to the respective bank.

In block 1150, the operation, which maybe computer-implemented, is disclosed of generating instructions to transfer funds to or from one or more of the FDIC-insured and interest-bearing aggregated deposit accounts in one or more of the respective banks in the program to cause, for each of a plurality of the banks to facilitate transfer of the respective net bank deposit amounts that were calculated for the allocation. In one embodiment, this transfer may comprise simply transferring the net amount received for a given period of time or netted based on some other parameter. In another embodiments, the instruction may reallocate all of the already deposited funds in various program banks in the program, a respective balance of funds in the respective bank held in the one or more FDIC-insured and interest-bearing aggregated deposit accounts therein to approximately equal the respective net bank deposit amount calculated for the respective bank.

In block 1160, the computer-implemented operation is disclosed of updating, by the one or more computers, one or more of the electronic databases with update data for each of a plurality of the clients, i, with the update data for each of the clients, i, comprising respective client bank distribution amounts, $BN_i$, transferred or to be transferred to the respective client $N_i$ banks for the client in the program.

In one embodiment, the operation is disclosed of maintaining the respective client available amounts, $D_i$, in the one or more FDIC-insured and interest-bearing aggregated deposit accounts held in the plurality of banks, $N_i$, determined for the respective client available amounts, $D_i$.

In a further embodiment, an embodiment is disclosed of performing for each of a plurality of the clients when $N_i$ is a whole number and (X) times ($N_i$) is less than 100, so that there is a remainder amount, $R_i$, the computer-implemented steps: of allocating at least a portion, $PR_i$, of a remainder amount, $R_i$, multiplied by the respective client available deposit amount, $D_i$, where $R_i=(D_i)-D_i(N_i \cdot X)/100$, to one or more of the banks, $M_i$, up to a predetermined amount in each of the respective one or more client $M_i$ banks; with the calculating step (3) comprising calculating, for each bank of a plurality of the banks in the program, a respective net bank deposit amount for allocation to one or more of the FDIC-insured and interest-bearing aggregated deposit accounts held in the respective bank, the respective net bank deposit amount comprising a sum of respective client bank distribution amounts, $BN_i$, and/or portions, $PR_i$, of remainder amounts, $R_i$, from a plurality of the clients, allocated to the respective bank; and with the updating step (5) comprising updating one or more of the electronic databases with update data for each of a plurality of the clients, with the update data for each of the clients comprising portions, $PR_i$, of remainder amounts, $PR_i$, transferred or to be transferred to the respective client $M_i$ banks for the client in the program.

Note that all of the embodiments disclosed herein may be implemented with the operation of administering the client deposits/transfers and withdrawals/transfers to their respective client transaction accounts not included, and the information related to the client transaction accounts, may, but need not be included in the one or more databases.

Note that in variations of the previously described embodiments, one or more of the aggregated interest-bearing accounts held in the program banks may not be FDIC insured, and may alternatively, hold an amount of collateral or exhibit other features to justify a determination that the respective bank is safe.

Also, the above described embodiments may be implemented in some configurations wherein aggregated deposit accounts are not used in the program banks or not used in all of the program banks, but rather individual accounts are set up in the program banks for each respective client to hold the respective client's funds.

Note that in variations of the previously described embodiments, one or more of the aggregated interest-bearing accounts held in the program banks may not be FDIC insured, and may alternatively, hold an amount of collateral or exhibit other features to justify a determination that the respective bank is safe.

In a further variation that can be applied to modify each of the embodiments herein disclosed, the one or more of the electronic databases include client preference and/or exclusion information comprising a client's one or more preferences and/or one or more exclusions of one or more of the program banks to hold its funds. The memory for one or more of the computers stores computer-readable instructions that, when executed, cause the one or more computers to perform the step of determining the banks in the program for allocation of the client available deposit amount, $D_i$, based at least in part, on the client preference and/or exclusion information.

It should be noted that the calculation and determination operations and steps disclosed herein may be performed by one or more computers that perform the functions at one location or at multiple locations. Also, note that a portion or all of a given calculation or determination operation or other operation can be performed by one or more computers owned or controlled by different entities, or at different locations that are directly or indirectly interconnected. The method of performance of the operation or step may, but need not be, controlled, but the step may be performed at the direction of and under limitations (e.g., maintenance of confidentiality, time for performance, etc.) if any, imposed by the entity operating the claimed method, system or program product.

In one embodiment of an account allocation sequence, after the respective purchases and redemptions have been processed, the accounts are grouped by taxpayer identification number (TIN) and sorted in some defined manner, e.g., descending order based on total TIN balance (highest to lowest), or sorted numerically by TIN balance from lowest to highest. Thereafter, the allocation proceeds, client transaction account by client transaction account, to determine which program banks will receive the client transaction account balance (comprising the day's opening balance for the account, plus first sweep purchases, minus first sweep redemptions for each transaction account). The allocation method distributes the account assets to the program banks based on the TIN balance and based on the type of allocation business rules set for that client transaction account. Note that the business rules may be attributed to an account directly at the client transaction account level, or to multiple accounts at the broker or office/branch level. Some example business rules comprise:
1. A client transaction account's balance must be allocated to banks in a specific deposit sequence, e.g., a first amount to program bank 130, a next amount to program bank 132, etc.
2. A client transaction account's roster of available program banks may vary from that of the overall Program due to client bank exclusions, e.g., the client may opt-out of 1 or more banks in a category, but not all banks or a set number of the banks in the program. For example, if there are 10 banks in a program, the client may not be allowed to opt-out of more than 5 banks.
3. A requested deposit limit for a given program bank is less than the maximum FDIC insurance limit for the given account type (currently $250,000 for an individual account).
4. A maximum cap and/or minimum cap associated with the respective program bank must be satisfied.

In one embodiment of business rule priority, client transaction account specific rules may be used first to direct the client transaction account balance allocation. If the client has opted out of a particular program bank, for example, because the client has funds in that bank via an account with another financial entity, or the client has designated that the first amount is to be deposited in a particular bank, then such client transaction account balance allocation will follow those rules in making the allocation of that client's balance. Then financial entity office/branch level allocation business rules may be followed in allocating multiple client transaction accounts of the given financial entity in an order subject to potential amount limits specified by the applicable rule(s). Thus, the client transaction account balance allocation process first allocates non-zero balance accounts according to client transaction account specific rules, then follows office/branch level business rules in a descending account balance order. Finally, the client transaction account balance allocation process allocates non-zero balance accounts not subject to any of the above applicable business rules in descending account balance order. The allocation/reshuffling of client transaction account balances may also follow certain other business rules to minimize the volume of account balance redistributions required to match with the destination program bank amount allocation. Likewise, a rule may be followed that no more than six withdrawals in a particular manner, per Regulation D, may be made from a given program bank during a period such as a month. Other allocation rules may be set by the individual account holder, the broker dealer or other financial entity, and the management system 100.

As noted, in some embodiments one or more safety banks may be designated. The "safety bank" receives the deposits for all of the account balances in excess of the insurance limit provided by the program. The safety bank may be generally one of the larger and/or more stable banks in the program, and so is less likely to experience bank failure, or it may comprise a bank with a certain level of collateral. In one embodiment, the safety bank may be selected at the broker level. In another embodiment, it may be selected at the client level. If that selected bank is opted out for a particular client transaction account, then the bank with the highest available capacity may be used for that account. Note that due to opt-out and other rules, there may be multiple safety banks. The safety bank for a given client may be selected by rule.

Referring again to FIG. 1, the management system 100 may be configured to allocate and manage deposits, withdrawals and other transactions relating to each of the aggregated accounts in each of the program banks 130-140. Thus, in one embodiment, the management system 100 tracks the net activity for the aggregated deposit accounts maintained by the financial entity or the management system 100 itself, at the program banks 130-140, based on information generated by it own computers, e.g., wires, messages, to name a few, and/or received by the management system 100 from the financial entities and/or from other appropriate sources via contract or otherwise. The management system 100 maintains electronic records or has maintained for it, in one or more electronic databases, records on each financial entity and its respective clients with funds in the program banks managed by the management system 100.

As explained more fully below, the management system 100 may automatically generate reports, for example in the form of e-mail messages, text messages, faxes, posting on prescribed web pages, to name a few, advising the financial entities with the client relationship, of the day's net activity for the aggregated accounts in the multiple program banks holding funds for clients of that financial entity, and/or activity in one or more client transaction accounts of that financial entity. If more than one aggregated deposit account is maintained at a program bank, 130-140, each account may be settled separately. The management system 100 maintains or has maintained for it computer software and/or hardware located at a main management system site, or at one or more remote sites that are in communication with the management system 100, that maintain databases and other program functions to track activities in the various aggregated accounts in each of the program banks 130-140. Examples of such computer software and/or hardware will be discussed below.

In yet a further embodiment, an audit trail of allocations and reallocations of client transaction account funds at each of the program banks may be generated. For example, the system may track the allocation among program banks for a client transaction account. In some embodiments, the system may send information that provides an intra day movement among program banks of the funds of individual client transaction accounts and associated financial entities, to the respective individual clients, and/or to the associated financial entity, and/or to any outside party. After the last allocation has run for the day, the process then creates outbound files for the program banks and the broker dealers or other financial entities maintaining the client relationships. The bank deposit file sent to the financial entity may include data for each client transaction account for that financial entity with funds in the program, and the respective balance held at each program bank for that financial entity. A file may also be sent to each program bank, which file includes the client's financial entity account number, a balance for that client at the program bank and the last four digits of the client's tax TIN. Accordingly, the process in one embodiment, creates a transaction audit trail to record all changes in client transaction account bank balances and an identification of the program banks holding those funds and the amounts of client transaction account funds held therein. The transactions are written into an insured deposits transaction history table with transaction type "XFR."

In yet a further embodiment, an on-the-fly report of uninsured funds is generated and communicated by some convenient electronic means. The insurance process detects whether an account's assets cannot be insured as the program processes/re-allocates on a per client transaction account basis. In this manner, uninsured client transaction accounts will be written to the uninsured file to capture such client transaction accounts "on the fly." An uninsured account balance report thus will include all uninsured client transaction accounts with a listing of the account current balance and an aggregated TIN balance per program bank. The report may be used by an operations department as an audit tool. The report may be reviewed daily to ensure that all accounts are properly insured.

The system further includes a message generator that generates one or more electronic messages and settlement wires regarding withdrawal of funds from or deposit of funds to each of the aggregated accounts in the program banks. Messages may, for example, be in the form of e-mail, facsimile, text message or other form of communication, and may be sent electronically, or by messenger, for example. Such messages may be sent to the financial entities and/or the banks for providing notice of an action, or a request for approval of an action, and may include information such as, for example, an amount withdrawn or deposited and the reason for the withdrawal or deposit.

Figure 2:
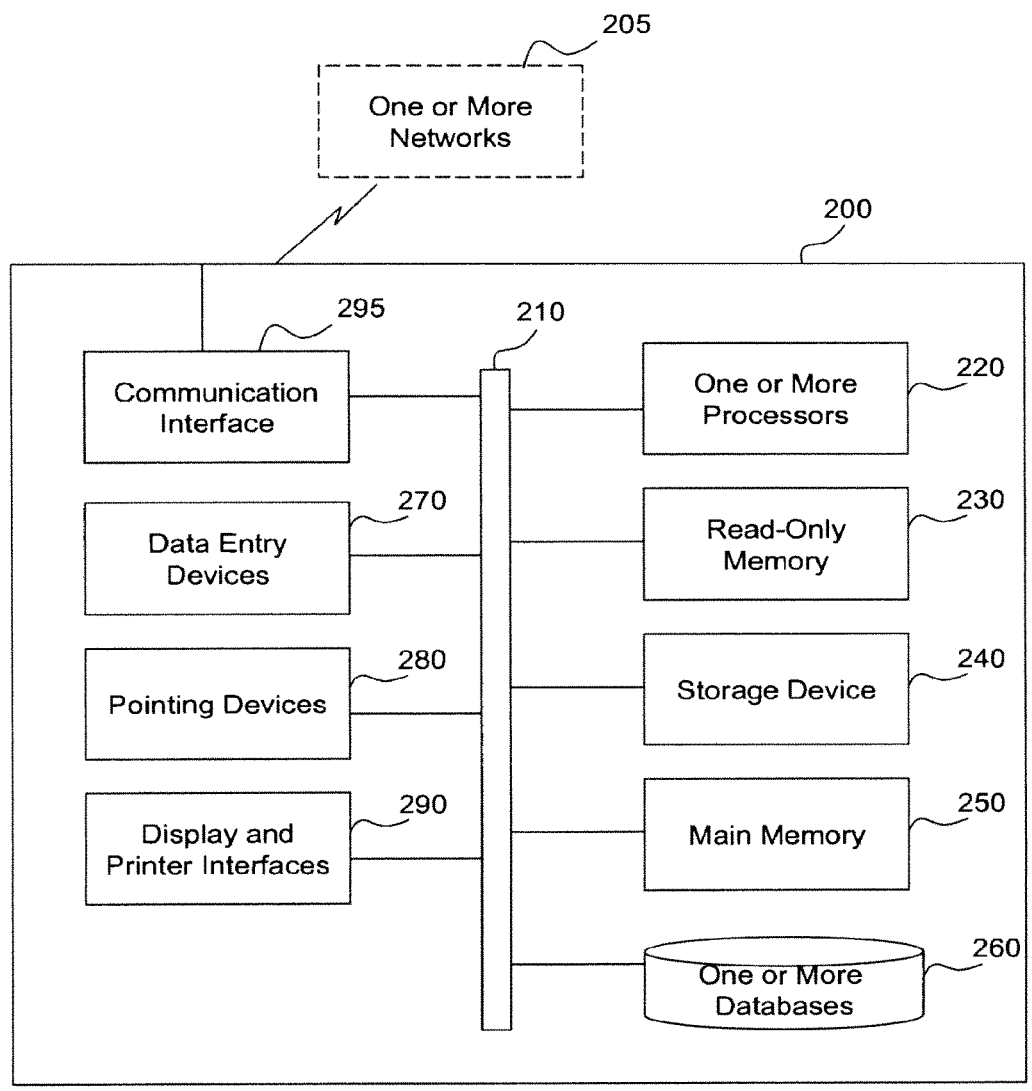
FIG. 2 is a schematic block diagram of an electronic system for implementing one or more of the embodiment of the invention.

FIG. 2 is a block diagram showing an embodiment of an aggregated account management system 100 of FIG. 1, generally designated by reference number 200 in FIG. 2, according to an exemplary embodiment of the present invention. In one embodiment, the aggregated account management system 200 according to the present invention may be communicatively coupled to one or more networks 205 via a communication interface 295. The one or more networks 205 may represent a generic network, which may correspond to a local area network (LAN), a wireless LAN, an Ethernet LAN, a token ring LAN, a wide area network (WAN), the Internet, a proprietary network, an intranet, a telephone network, a wireless network, to name a few, and any combination thereof. Depending on the nature of the network employed for a particular application, the communication interface 295 may be implemented accordingly. The network 205 serves the purpose of delivering information between connected parties.

In one embodiment, the Internet may comprise the network 205. The system 200 may communicate via the Internet bank and financial entity records to interested or authorized parties. The aggregated account management system 200 may also or alternatively be communicatively coupled to a network 205 comprising a closed network (e.g., an intranet), and thereby communicate bank and financial entity records to a limited number of receivers, potentially with an enhanced level of security. The management system 200 may be configured to communicate, via the one or more networks 205, with respective computer systems of the one or more financial entities, the program banks 130-140, and to the one or more control operating accounts 110 in the financial institution or intermediary bank. By way of example, such communication may be used to manage the aggregated accounts held at each program bank, to maximize insurance for the money in the various client transaction accounts, and/or to increase the safety of that money.

The management system 200 may comprise, in some embodiments, a computing platform for performing, controlling, and/or initiating computer-implemented operations, for example, via a server and the one or more networks 205. The computer platform may comprise system computers and other party computers. An exemplary management system 200 may operate under the control of computer-executable instructions to carry out the process steps described herein. Computer-executable instructions comprise, for example, instructions and data which cause a general or special purpose computer system or processing device to perform a certain function or group of functions. Computer software for the management system 200 may comprise, in an embodiment, a set of software objects and/or program elements comprising computer-executable instructions collectively having the ability to execute a thread or logical chain of process steps in a single processor, or independently in a plurality of processors that may be distributed, while permitting a flow of data inputs/outputs between components and systems.

The management system 200 may be include, one or more personal computers, workstations, notebook computers, servers, mobile computing devices, handheld devices, multi-processor systems, networked personal computers, minicomputers, mainframe computers, personal data assistants, Internet appliances (e.g., a computer with minimal memory, disk storage and processing power designed to connect to a network, especially the Internet, etc.), or controllers, to name a few.

The management system 200 may comprise, in one embodiment, a bus 210 or other communication component that couples the various system elements 220-295, and is configured to communicate information between the various system elements 220-295.

As shown in FIG. 2, one or more computer processors 220 may be coupled with the bus 210 and configured to process and handle information and execute instructions. The management system 200 may include a main memory 250, such as a Random Access Memory (RAM) or other dynamic storage device, coupled to the bus 200, for storing information and instructions to be executed by the one or more processors 220. The main memory 250 also may be used for storing temporary variables or other intermediate information during execution of instructions by the one or more processors 220.

The management system 200 further may include a Read-Only Memory (ROM) 230 or other static storage device (e.g., EPROM, EAROM, EEPROM, PROM, flash, and the like) coupled to the bus 210 for storing static information and instructions for the one or more processors 220. Furthermore, a storage device 240, such as a magnetic disk or optical disk, such as a CD-ROM or other optical media may be provided and coupled to the bus 210 for storing information and instructions.

In addition to the ROM 230, one or more databases 260 may be coupled to the bus 210 for storing static information and software instructions. Information stored in or maintained in the database 260 may be provided in conformance with a database management system format such as, but not limited to, the Structured Query Language (SQL) format. Database query and access instructions, for example, in the form of one or more scripts, may be used which, when executed by a processor such as the processor 220, serve to access, store and retrieve data maintained in the database 260 according to the instructions contained in the script.

Furthermore, the management system 200 may comprise application software instructions which may implement a user interface portion for generating interactive pages or display screens by which a user may provide data to and receive information from the management system 200 and the database 260 using a human-machine interface. Interactive pages may include user dialog boxes for accepting user entered information. In particular, the human-machine interface may comprise a Graphical User Interface (GUI) portion for prompting the user to enter data by providing an interactive dialog box or message box instructing the user to enter particular data, or to select from among a multitude of options provided using a pull-down menu. A user may interact with the management system 200 via the graphical user interface by using a pointing device and/or data entry device. The GUI portion may place the output of the management system 200 in a format for presentation to a user via the display. In at least one embodiment, the GUI may be implemented as a sequence of Java instructions.

A data entry device 270, including alphanumeric and other keys, or a pointing device such as a mouse or trackball, or a scanner, to name a few, may be coupled to the bus 210 for communicating information and command selections to the processor 220. The data entry device 270 may be coupled to the bus 210 via an interface (not shown), wherein the interface may be, for example, a serial port, an RS-232 port, or the like. In addition, the interface may be a wireless interface and provide connection-less communication via, for example, Bluetooth communication.

The management system 200 may be coupled via the bus 210 to a display or printer 290 for outputting information to a computer user. In addition, a user may use the display (e.g., touch screen) or printer (e.g., scanner) to provide information to the management system 200.

According to at least one embodiment of the present invention, the various program operations as described herein may be provided by the management system 200 in response to the one or more processors 220 executing one or more sequences of computer-readable instructions contained in the main memory 250. Such instructions may be read into the main memory 250 from another computer-readable medium, such as the ROM 230, the storage device 240, or the database 260. Execution of the sequences of instructions contained in the main memory 250 may cause the one or more processors 220 to perform the process steps described herein. It should be appreciated that an embodiment of the management system 200 may perform fewer or additional processes as compared to those described herein. As noted, the one or more processors 220 may be arranged in a multi-processing arrangement. Alternatively, hard-wired circuitry may be used in place of or in combination with software instructions to implement the invention. Thus, embodiments of the invention are not limited to any specific combination of hardware circuitry and software.

The term "computer-readable medium" or "computer-readable storage medium," as used herein refers to any medium that is computer-readable and participates in providing instructions to the processor 220 for execution. Such a medium may be removable or non-removable and may take many forms, including, but not limited to, non-volatile media and volatile media. Non-volatile media include, for example, optical or magnetic disks, such as the storage device 240. Volatile media include dynamic memory, such as the main memory 250. Common forms of computer-readable media include, for example, floppy disk, a flexible disk, hard disk, magnetic tape, any other magnetic medium, a Compact Disc Read Only Memory (CD ROM), Digital Video Disc (DVD) or any other optical medium, punch cards, paper tape, any other physical medium with patterns of holes, a Random Access Memory (RAM), a Programmable Read Only Memory (PROM), an Erasable Programmable Read Only Memory (EPROM), a Flash EPROM, any other memory chip or cartridge, or any other medium from which a computer can read computer instructions. Combinations of the above are also included within the scope of machine-readable media. Machine-executable instructions comprise, for example, instructions and data which cause a general purpose computer, special purpose computer, or a special purpose processing machine to perform a certain function or group of functions. It should be appreciated that the one or more databases 260, the main memory 250, the storage device 240, and the ROM 230 may, in some embodiments, be described as a "computer-readable medium" or a "computer-readable storage medium."

As previously noted, the management system 200 also comprises a communication interface 295 coupled to the bus 210 for providing one-way, two-way or multi-way data communication with the network 205, or directly with other devices. In one embodiment, the communication interface 295 may comprise a modem, a transceiver Integrated Services Digital Network (ISDN) card, a WAN card, an Ethernet interface, or the like, to provide a data communication connection to a corresponding type of communication medium. As another example, the communication interface 295 may comprise a LAN card to provide a data communication connection to a compatible LAN. Wireless links may also be implemented. In such wireless links, communication interface 295 may communicate with a base station communicatively coupled to a network server. In any such implementation, the communication interface 295 sends and receives electrical, electromagnetic, radio, infrared, laser, or optical signals that carry digital data streams representing various types of information. Any combination of the above interfaces may also be implemented.

In one embodiment, the communication interface 295 may be communicatively coupled to a web server configured to generate and output web content that is suitable for display using a web browser at a computing device. In an embodiment, the server may generate and transmit requested information through the communication interface 295 to a requesting terminal via Hypertext Transfer Markup Language (HTML) formatted pages, eXtensible Markup Language (XML) formatted pages, or the like, which may be provided as World Wide Web pages that may enable navigation by hyperlinks. The server program may be used to receive commands and data from the clients' terminals and financial entity terminals, and program bank terminals, access and process data from various sources, and output computer-executable instructions and data using the network 205. For example, code and data may be communicated to the computers of clients, financial entities, and the program banks. One such downloaded application may, for example, implement client transaction account balance distribution, or reporting, or message generation, as described herein. Interactive pages transmitted and received using the network 205 may conform to necessary protocols.

The web server, in one embodiment, may correspond to a secure web application server behind a web server program that a service provider employs to run one or more web based application programs (e.g., an application program to carry out the methods described above) in a secure fashion. Such a secure web application server may be configured to execute one or more web based application programs, responsive to commands and data received from the clients (via a web page supported by the web server), and providing data and results to the clients. The web server and the web application server may be implemented using a single computing platform. Alternatively, it may also be implemented using multiple separate and distributed computing platforms.

FIG. 9 is a block diagram showing portions of at least one embodiment of a memory configuration 900 storing programs used in the present system. This memory configuration may be applicable to the one or more databases 260, the main memory 250, the storage device 240, and/or the ROM 230, or a combination thereof. The memory configuration may comprise one memory, or distributed memories. In one embodiment, the memory configuration may comprise a reporting program 910 for generating reports on various aspects of the system operation, including allocation activity that identifies each of the program banks holding funds of the client transaction account, the client transaction account balance deposited in each of these program banks, and how much insurance is obtained from each of these identified program banks for the client's transaction account. These reports could then be electronically transmitted or otherwise sent to the financial entities, clients, and the program banks. The memory configuration may further comprise a message generator program 920 for generating messages and instructions to the various banks to initiate the movement of funds.

The memory configuration may further comprise a transaction account balance monitoring program 930 for monitoring the balance in the individual client transaction accounts. The memory configuration may further comprise a deposit/transfer transaction program 940 for processing deposits and transfers received for the individual client transaction accounts. The memory configuration may further comprise a withdrawal/transfer transaction program 950, for processing the withdrawal instructions and transfers received for the individual client transaction accounts. The memory configuration may further comprise an allocation program 960 for allocating amounts to the various program banks as described herein. The memory configuration may further comprise a program bank monitoring program 970, for monitoring the balances maintained in the one or more aggregated accounts held in each of the respective program banks. In one embodiment, the memory configuration may comprise a server program 980. In another embodiment, the server program is external to the system, and/or may be operated by a third party.

These respective application programs include a sequence of programmed instructions which, upon execution, are operable to configure the management system 200 (shown in FIG. 2) to carry out the respective program operations described herein. The application programs may also include sequences of database access instructions, or scripts to effect storage and retrieval of data using the database 250.

As noted above, embodiments of the present invention may be practiced in a networked environment using logical connections to one or more remote computers having processors. Logical connections may include a local area network (LAN) and a wide area network (WAN) that are presented here by way of example and not limitation. Such networked environments are in office-wide or enterprise-wide computer networks, intranets and the Internet, and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Embodiments of the invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular data types. Multi-threaded applications may be used, for example, based on Java or C++. Machine-executable instructions, associated data structures, and program modules represent examples of program code for executing steps of the methods disclosed herein. The particular sequence of such executable instructions or associated data structures represent examples of corresponding acts for implementing the functions described in such steps.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention may be accomplished with programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

We claim:

1. A method, comprising:
    (A) accessing, by one or more automated programmed computers of a deposit management computer system, one or more electronic databases, stored on one or more computer-readable media, comprising:
        (1) aggregated account information for a plurality of Federal Deposit Insurance Corporation (FDIC)-insured and interest-bearing aggregated deposit accounts held in a plurality of banks, N, in a program, wherein funds from client accounts of a plurality of clients are aggregated with funds of other client accounts in the aggregated deposit accounts held in the banks in the program, where each client account represents funds of a respective client held in one or more of the aggregated deposit accounts, wherein the aggregated account information comprises a respective balance of funds held in each of the plurality of the aggregated deposit accounts; and
        (2) client account information for each of the respective client accounts comprising a respective balance of funds from the respective client account held in each of the one or more insured and interest-bearing aggregated deposit accounts holding funds of the respective client account;
        (3) client exclusion information comprising one or more exclusions of banks to hold respective client account funds; and
    (B) providing, by the one or more automated programmed computers, an interface available to a respective one of the clients for receiving an input designating a first percentage $X_i$ of funds, a first number of banks, $N_i$, across which to distribute funds of a client account corresponding to the respective one of the clients, wherein none of the excluded banks are included in the first number of banks, $N_i$, a second percentage $Y_i$, and a second number of banks, $M_i$, across which to distribute funds of a client account corresponding to the respective one of the clients, wherein none of the excluded banks are included in the second number of banks, $M_i$, wherein a sum of the $N_i$ and $M_i$ depository institutions is more than necessary to obtain FDIC insurance for the funds of the client account;
    (C) performing, by the one or more automated programmed computers, one or more first fund amount allocations for each client account, i, of multiple of the client accounts, said one or more first fund amount allocations comprising:
        (1) obtaining, by the one or more automated programmed computers from one or more computers of a client relationship bank computer system, a client available deposit amount, $D_i$, comprising funds to be distributed across the banks in the program and the first percentage $X_i$ for a respective client;
        (2) determining, by the one or more automated programmed computers, the first number of client banks $N_i$ in the program for allocation of the first percentage, $X_i$, of the client available deposit amount, $D_i$, based at least in part on the client exclusion information;
        (3) calculating, by the one or more automated programmed computers, respective client first amounts, $FA_{Ni}$, based at least in part on distribution information selected by the respective client or the client relationship bank, to be distributed among the client $N_i$ banks in the program;
        (4) allocating, using the one or more automated programmed computers, the respective client first amounts, $FA_{Ni}$, to each of the respective client $N_i$ banks in the program;
    (D) performing, by the one or more automated programmed computers, one or more second fund amount allocations for each client account, i, of multiple of the client accounts, said one or more second fund amount allocations comprising:
        (1) obtaining, by the one or more automated programmed computers from one or more computers of a client relationship bank computer system, the second percentage $Y_i$ for the respective client;
        (2) determining, by the one or more automated programmed computers, the second number of client banks $M_i$ in the program for allocation of the second percentage, $Y_i$, of the client available deposit amount, $D_i$, based at least in part on the client exclusion information, wherein a sum of the first and second percentages, $X_i$ and $Y_i$, is less than 100 so that there is a remainder amount, $R_i$;
        (3) calculating, by the one or more automated programmed computers, respective client second amounts, $SA_{Mi}$, based at least in part on distribution information selected by the respective client or the client relationship bank, to be distributed among the client $M_i$ banks in the program;
        (4) allocating, using the one or more automated programmed computers, the respective client second amounts, $SA_{Mi}$, to each of the respective client $M_i$ banks in the program;
    (E) performing, by the one or more automated programmed computers, one or more remainder fund amount allocations for each client account, i, of multiple of the client accounts, said one or more remainder fund amount allocations comprising:
        (1) calculating, by the one or more automated programmed computers, the remainder amount by subtracting the client available deposit amount, $D_i$, multiplied by the sum of the first and second percentages, $X_i$ and $Y_i$, from the client available deposit amount, $D_i$;
        (2) allocating, using the one or more automated programmed computers, the remainder amount $R_i$ to one or more aggregated deposit accounts in one or across multiple safety banks in the program;
(F) performing, by the one or more automated programmed computers, one or more remainder fund transactions, comprising:
  (1) receiving, by the one or more automated programmed computers from the one or more computers of the client relationship bank computer system, data for a net withdrawal/transfer for one of the client accounts;
  (2) selecting for allocation, using the one or more automated programmed computers, one or more of the aggregated deposit accounts held in the one or more respective safety banks for the respective client account and allocating the respective net withdrawal/transfer first to be met with funds of the remainder amount $R_i$ in the one or more respective safety banks for the respective client account;
(G) generating, by the one or more automated programmed computers, data for transferring funds to or from one or more of the FDIC-insured and interest-bearing aggregated deposit accounts in one or more of the respective banks in the program based, at least in part, on the allocations;
(H) administering clients' deposits/transfers to and withdrawals/transfers from each of said client accounts, said administering comprising processing, by the one or more automated programmed computers, transaction data comprising transaction data for one or more deposits/transfers and/or withdrawals/transfers for one or more client accounts, and/or a net of the transaction data for one or more of the client accounts; and
(I) updating, by the one or more automated programmed computers, one or more of the electronic databases with update data for each of more than one of the client accounts, comprising updating the respective balance of funds from the respective client account held in each of one or more of the insured and interest-bearing aggregated deposit accounts holding funds of the respective client account.

2. The method as defined in claim 1, further comprising obtaining, by the one or more automated programmed computers, data on deposits and/or withdrawals and/or nets thereof for one or more of the client accounts.

3. The method as defined in claim 2, wherein the obtaining data step comprises obtaining data on deposits and/or withdrawals for one or more of the client accounts from a non-bank agent.

4. The method as defined in claim 2, wherein the obtaining data step comprises obtaining data on deposits and/or withdrawals and/or nets thereof for one of the client accounts via a direct or indirect communication from the respective client associated with the respective client account.

5. The method as defined in claim 2, wherein the obtaining data step comprises obtaining data on deposits and/or withdrawals and/or nets thereof for one of the client accounts from a relationship bank holding a client transaction account for the respective client associated with the respective client account.

6. The method as defined in claim 1, wherein the client relationship bank is one of the $N_i$ banks.

7. The method as defined in claim 1, wherein the client relationship bank is one of the $M_i$ banks.

8. The method as defined in claim 1, wherein at least one of the respective client first amounts, $FA_{Ni}$, is different from at least one other respective client first amount, $FA_{Ni}$.

9. The method as defined in claim 1, wherein at least one of the respective client second amounts, $SA_{Mi}$, is different from at least one other respective client second amount, $SA_{Mi}$.

10. A computer system, comprising:
one or more automated programmed computers of a deposit management computer system comprising memory wherein the memory stores computer-readable instructions comprising program code that, when executed, cause the one or more automated programmed computers to perform the steps:
(A) accessing:
  (1) aggregated account information for a plurality of Federal Deposit Insurance Corporation (FDIC)-insured and interest-bearing aggregated deposit accounts held in a plurality of banks, N, in a program, wherein funds from client accounts of a plurality of clients are aggregated with funds of other client accounts in the aggregated deposit accounts held in the banks in the program, where each client account represents funds of a respective client held in one or more of the aggregated deposit accounts, wherein the aggregated account information comprises a respective balance of funds held in each of the plurality of the aggregated deposit accounts; and
  (2) client account information for each of the respective client accounts comprising a respective balance of funds from the respective client account held in each of the one or more insured and interest-bearing aggregated deposit accounts holding funds of the respective client account;
  (3) the client exclusion information comprising one or more exclusions of banks to hold respective client account funds; and
(B) providing, by the one or more automated programmed computers, an interface available to a respective one of the clients for receiving an input designating a first percentage $X_i$ of funds, a first number of banks, $N_i$, across which to distribute funds of a client account corresponding to the respective one of the clients, wherein none of the excluded banks are included in the first number of banks, $N_i$, a second percentage $Y_i$, and a second number of banks, $M_i$, across which to distribute funds of a client account corresponding to the respective one of the clients, wherein none of the excluded banks are included in the second number of banks, $M_i$, wherein a sum of the $N_i$ and $M_i$ depository institutions is more than necessary to obtain FDIC insurance for the funds of the client account;
(C) performing, by the one or more automated programmed computers, one or more first fund amount allocations for each client account, i, of multiple of the client accounts, said one or more first fund amount allocations comprising:
  (1) obtaining, by the one or more automated programmed computers from one or more computers of a client relationship bank computer system, a client available deposit amount, $D_i$, comprising funds to be distributed across the banks in the program and the first percentage $X_i$ for a respective client;
  (2) determining, by the one or more automated programmed computers, the first number of client banks $N_i$ in the program for allocation of the first percentage, $X_i$, of the client available deposit amount, $D_i$, based at least in part on the client exclusion information;

(3) calculating, by the one or more automated programmed computers, respective client first amounts, $FA_{Ni}$, based at least in part on distribution information selected by the respective client or the client relationship bank, to be distributed among the client $N_i$ banks in the program;

(4) allocating, using the one or more automated programmed computers, the respective client first amounts, $FA_{Ni}$, to each of the respective client $N_i$ banks in the program;

(D) performing, by the one or more automated programmed computers, one or more second fund amount allocations for each client account, i, of multiple of the client accounts, said one or more second fund amount allocations comprising:

(1) obtaining, by the one or more automated programmed computers from one or more computers of a client relationship bank computer system, the second percentage $Y_i$ for the respective client;

(2) determining, by the one or more automated programmed computers, the second number of client banks $M_i$ in the program for allocation of the second percentage, $Y_i$, of the client available deposit amount, $D_i$, based at least in part on the client exclusion information, wherein a sum of the first and second percentages, $X_i$ and $Y_i$, is less than 100 so that there is a remainder amount, $R_i$;

(3) calculating, by the one or more automated programmed computers, respective client second amounts, $SA_{Mi}$, based at least in part on distribution information selected by the respective client or the client relationship bank, to be distributed among the client $M_i$ banks in the program;

(4) allocating, using the one or more automated programmed computers, the respective client second amounts, $SA_{Mi}$ to each of the respective client $M_i$ banks in the program;

(E) performing, by the one or more automated programmed computers, one or more remainder fund amount allocations for each client account, i, of multiple of the client accounts, said one or more remainder fund amount allocations comprising:

(1) calculating, by the one or more automated programmed computers, the remainder amount by subtracting the client available deposit amount, $D_i$, multiplied by the sum of the first and second percentages, $X_i$ and $Y_i$, from the client available deposit amount, $D_i$;

(2) allocating, using the one or more automated programmed computers, the remainder amount $R_i$ to one or more aggregated deposit accounts in one or across multiple safety banks in the program;

(F) performing, by the one or more automated programmed computers, one or more remainder fund transactions, comprising:

(1) receiving, by the one or more automated programmed computers from the one or more computers of the client relationship bank computer system, data for a net withdrawal/transfer for one of the client accounts;

(2) selecting for allocation, using the one or more automated programmed computers, one or more of the aggregated deposit accounts held in the one or more respective safety banks for the respective client account and allocating the respective net withdrawal/transfer first to be met with funds of the remainder amount $R_i$ in the one or more respective safety banks for the respective client account;

(G) generating, by the one or more automated programmed computers, data for transferring funds to or from one or more of the FDIC-insured and interest-bearing aggregated deposit accounts in one or more of the respective banks in the program based, at least in part, on the allocations;

(H) administering clients' deposits/transfers to and withdrawals/transfers from each of said client accounts, said administering comprising processing, by the one or more automated programmed computers, transaction data comprising transaction data for one or more deposits/transfers and/or withdrawals/transfers for one or more client accounts, and/or a net of the transaction data for one or more of the client accounts; and (I) updating, by the one or more automated programmed computers, one or more of the electronic databases with update data for each of more than one of the client accounts, comprising updating the respective balance of funds from the respective client account held in each of one or more of the insured and interest-bearing aggregated deposit accounts holding funds of the respective client account.

11. The system as defined in claim 10, wherein the memory stores computer-readable instructions comprising program code that, when executed, cause the one or more automated programmed computers to perform obtaining, by the one or more automated programmed computers, data on deposits and/or withdrawals and/or nets thereof for one or more of the client accounts.

12. The system as defined in claim 11, wherein the obtaining data step comprises obtaining data on deposits and/or withdrawals for one or more of the client accounts from a non-bank agent.

13. The system as defined in claim 11, wherein the obtaining data step comprises obtaining data on deposits and/or withdrawals and/or nets thereof for one of the client accounts via a direct or indirect communication from the respective client associated with the respective client account.

14. The system as defined in claim 11, wherein the obtaining data step comprises obtaining data on deposits and/or withdrawals and/or nets thereof for one of the client accounts from a relationship bank holding a client transaction account for the respective client associated with the respective client account.

15. The system as defined in claim 10, wherein the client relationship bank is one of the $N_i$ banks.

16. The system as defined in claim 10, wherein the client relationship bank is one of the $M_i$ banks.

17. The system as defined in claim 10, at least one of the respective client first amounts, $FA_{Ni}$, is different from at least one other respective client first amount, $FA_{Ni}$.

18. The system as defined in claim 10, wherein at least one of the respective client second amounts, $SA_{Mi}$, is different from at least one other respective client second amount, $SA_{Mi}$.

* * * * *